Jan. 31, 1967 J. A. McLAUGHLIN 3,302,176
MESSAGE ROUTING SYSTEM
Filed Dec. 7, 1962 19 Sheets-Sheet 1
FIG. 1
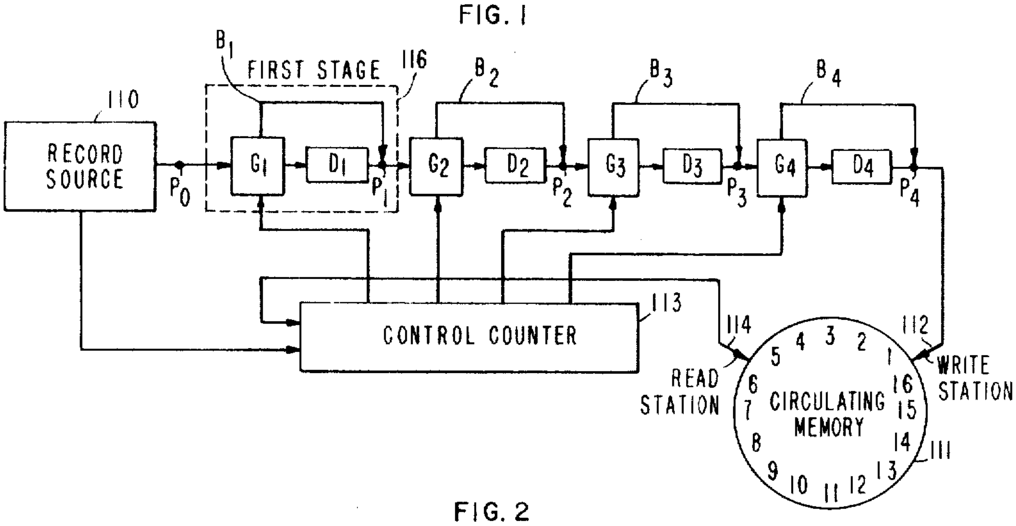
FIG. 2
→ POSITION
TIME ↓
| A·C | C | A | $D_1$ | $D_2$ | | $D_3$ | | | | $D_4$ | $L_0$ | $L_1$ |
|---|---|---|---|---|---|---|---|---|---|---|---|---|
| 6 | 4 | 10 | | | | | | | | | 3 | 4 |
| | 5 | | | 10 | | | | | | | 4 | 5 |
| 5 | 6 | 11 | | | 10 | | | | | | 5 | 6 |
| 5 | 7 | 12 | 11 | | | 10 | | | | | 6 | 7 |
| 5 | 8 | 13 | 12 | | | 11 | 10 | | | | 7 | 8 |
| | 9 | | 13 | | | 12 | 11 | 10 | | | 8 | 9 |
| | 10 | | | | | 13 | 12 | 11 | 10 | | 9 | 10 |
| 3 | 11 | 14 | | | | | 13 | 12 | 11 | | 10 | 11 |
| 3 | 12 | 15 | 14 | | | | | 13 | 12 | | 11 | 12 |
| | 13 | | 15 | 14 | | | | | 13 | | 12 | 13 |
| | 14 | | | 15 | 14 | | | | | | 13 | 14 |
| 1 | 15 | 16 | | | 15 | | | | | | 14 | 15 |
| | 0 | | 16 | | | | | | | | 15 | 16 |
| | 1 | | | | | | | | | | 16 | 1 |
| | 2 | | | | | | | | | | 1 | 2 |
| | 3 | | | | | | | | | | 2 | 3 |
| | 4 | | | | | | | | | | 3 | 4 |
| | 5 | | | | | | | | | | 4 | 5 |
FIG. 3
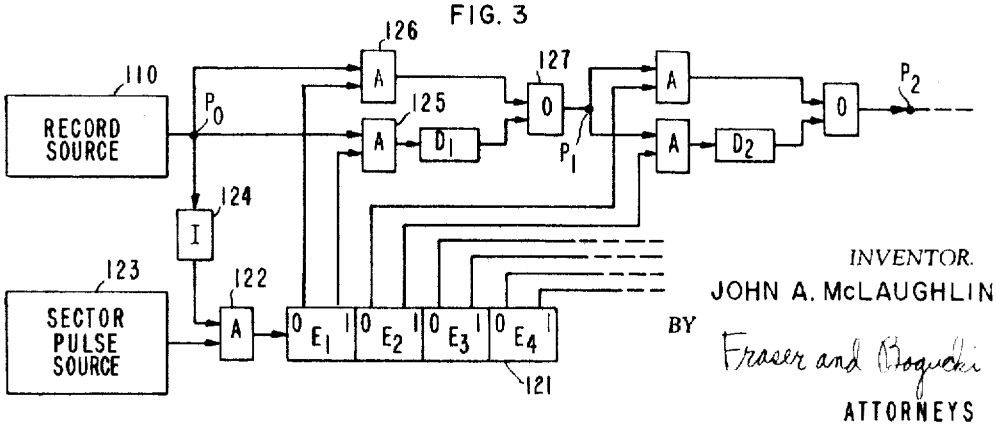
INVENTOR.
JOHN A. McLAUGHLIN
BY *Fraser and Bogucki*
ATTORNEYS

| | | | | S | $P_1$ | | | $P_2$ | | | | $P_3$ | | | | | | | | $P_4$ | |
|---|---|---|---|---|---|---|---|---|---|---|---|---|---|---|---|---|---|---|---|---|---|
| $E_1$ | $E_2$ | $E_3$ | $E_4$ | A | $D_1$ | $D_2$ | | $D_3$ | | | | $D_4$ | | | | | | | | $L_0$ | $L_1$ |
| 1 | 1 | 0 | 1 | 1 | | | | | | | | | | | | | | | | 5 | 6 |
| 0 | 1 | 0 | 1 | | 1 | | | | | | | | | | | | | | | 6 | 7 |
| 0 | 1 | 0 | 1 | 2 | | 1 | | | | | | | | | | | | | | 7 | 8 |
| 0 | 1 | 0 | 1 | 3 | | 2 | 1 | | | | | | | | | | | | | 8 | 9 |
| 1 | 0 | 0 | 1 | | | 3 | 2 | | | | | 1 | | | | | | | | 9 | 10 |
| 0 | 0 | 0 | 1 | | | | 3 | | | | | 2 | 1 | | | | | | | 10 | 11 |
| 1 | 1 | 1 | 0 | | | | | | | | | 3 | 2 | 1 | | | | | | 11 | 12 |
| 0 | 1 | 1 | 0 | | | | | | | | | | 3 | 2 | 1 | | | | | 12 | 13 |
| 0 | 1 | 1 | 0 | 4 | | | | | | | | | | 3 | 2 | 1 | | | | 13 | 14 |
| 1 | 0 | 1 | 0 | | | 4 | | | | | | | | | 3 | 2 | 1 | | | 14 | 15 |
| 1 | 0 | 1 | 0 | 5 | | | 4 | | | | | | | | | 3 | 2 | 1 | | 15 | 16 |
| 1 | 0 | 1 | 0 | 6 | 5 | | | 4 | | | | | | | | | 3 | 2 | 1 | 16 | 1 |
| 1 | 0 | 1 | 0 | 7 | 6 | | | 5 | 4 | | | | | | | | | 3 | 2 | 1 | 2 |
| 1 | 0 | 1 | 0 | 8 | 7 | | | 6 | 5 | 4 | | | | | | | | | 3 | 2 | 3 |
| 0 | 0 | 1 | 0 | | 8 | | | 7 | 6 | 5 | 4 | | | | | | | | | 3 | 4 |
| 1 | 1 | 0 | 0 | | | | | 8 | 7 | 6 | 5 | | | | | | | | | 4 | 5 |
| 1 | 1 | 0 | 0 | 9 | | | | | 8 | 7 | 6 | | | | | | | | | 5 | 6 |
| 0 | 1 | 0 | 0 | | 9 | | | | | 8 | 7 | | | | | | | | | 6 | 7 |
| 1 | 0 | 0 | 0 | | | | | | | | 8 | | | | | | | | | 7 | 8 |
| 1 | 0 | 0 | 0 | 10 | | | | | | | | | | | | | | | | 8 | 9 |

INVENTOR
JOHN A. McLAUGHLIN
BY
Fraser and Bogucki
ATTORNEYS

INVENTOR
JOHN A. McLAUGHLIN
BY
Fraser and Bogucki
ATTORNEYS

| $D_4$ | | | | | | | | $D_3$ | | | | $D_2$ | | $D_1$ | B | C |
|---|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | | 0 |
| 8 | 15 | 14 | 13 | 12 | 11 | 10 | 9 | 4 | 7 | 6 | 5 | 2 | 3 | 1 | | 1 |
| 9 | 8 | 15 | 14 | 13 | 12 | 11 | 10 | 5 | 4 | 7 | 6 | 3 | 2 | (1) | 1 | 2 |
| 10 | 9 | 8 | 15 | 14 | 13 | 12 | 11 | 6 | 5 | 4 | 7 | | 3 | 2 | | 3 |
| 11 | 10 | 9 | 8 | 15 | 14 | 13 | 12 | 7 | 6 | 5 | 4 | 3 | | 2 | | 4 |
| 12 | 11 | 10 | 9 | 8 | 15 | 14 | 13 | | 7 | 6 | 5 | 4 | 3 | (2) | 2 | 5 |
| 13 | 12 | 11 | 10 | 9 | 8 | 15 | 14 | | | 7 | 6 | 5 | 4 | (3) | 3 | 6 |
| 14 | 13 | 12 | 11 | 10 | 9 | 8 | 15 | | | | 7 | 6 | 5 | 4 | | 7 |
| 15 | 14 | 13 | 12 | 11 | 10 | 9 | 8 | 7 | | | | 5 | 6 | (4) | 4 | 0 |
| | 15 | 14 | 13 | 12 | 11 | 10 | 9 | 8 | 7 | | | 6 | (5) | | 5 | 1 |
| | | 15 | 14 | 13 | 12 | 11 | 10 | 9 | 8 | 7 | | | (6) | | 6 | 2 |
| | | | 15 | 14 | 13 | 12 | 11 | 10 | 9 | 8 | (7) | | | | 7 | 3 |
| | | | | 15 | 14 | 13 | 12 | 11 | 10 | 9 | 8 | | | | | 4 |
| | | | | | 15 | 14 | 13 | 12 | 11 | 10 | 9 | | | 8 | | 5 |
| | | | | | | 15 | 14 | 13 | 12 | 11 | 10 | 9 | | (8) | 8 | 6 |
| | | | | | | | 15 | 14 | 13 | 12 | 11 | 10 | 9 | | | 7 |
| | | | | | | | | 15 | 14 | 13 | 12 | 11 | 10 | (9) | 9 | 0 |
| | | | | | | | | | 15 | 14 | 13 | 12 | 11 | (10) | 10 | 1 |
| | | | | | | | | | | 15 | 14 | 13 | 12 | 11 | | 2 |
| | | | | | | | | 14 | | | 15 | 12 | 13 | 11 | | 3 |
| | | | | | | | | 15 | 14 | | | 13 | 12 | (11) | 11 | 4 |

FIG. 8

INVENTOR.
JOHN A. McLAUGHLIN
BY Fraser and Bogucki
ATTORNEYS

INVENTOR
JOHN A. McLAUGHLIN
BY Fraser and Bogucki
ATTORNEYS

Jan. 31, 1967 J. A. McLAUGHLIN 3,302,176

MESSAGE ROUTING SYSTEM

Filed Dec. 7, 1962 19 Sheets-Sheet 6

INVENTOR.
JOHN A. McLAUGHLIN
BY Fraser and Bogucki
ATTORNEYS

| C | A | $D_1$ | $D_2$ | | $D_3$ | | | | $M_4$ | | | | | | | | $M_3$ | | | | $M_2$ | | $M_1$ | B |
|---|---|---|---|---|---|---|---|---|---|---|---|---|---|---|---|---|---|---|---|---|---|---|---|---|
| 6 | 1 | | | | | | | | | | | | | | | | | | | | | | | |
| 7 | | 1 | | | | | | | | | | | | | | | | | | | | | | |
| 0 | 2 | | 1 | | | | | | | | | | | | | | | | | | | | 1 | |
| 1 | 3 | | 2 | 1 | | | | | | | | | | | | | | | | | | | 1 | |
| 2 | 4 | | 3 | 2 | | | | | | | | | | | | | | | | | | | 1 | |
| 3 | 5 | | 4 | 3 | | | | | | | | | | | | | | | | | 2 | | 1 | |
| 4 | | | 5 | 4 | | | | | | | | | | | | | | | | | 3 | 2 | 1 | |
| 5 | 6 | | | 5 | | | | | | | | | | | | | 4 | | | | 2 | 3 | 1 | |
| 6 | | 6 | | | | | | | | | | | | | | | 5 | 4 | | | 3 | 2 | ① | 1 |
| 7 | 7 | | | | | | | | | | | | | | | | 6 | 5 | 4 | | | 3 | 2 | |
| 0 | 8 | | | | | | | | | | | | | | | | 7 | 6 | 5 | 4 | 3 | | 2 | |
| 1 | 9 | | | | | | | | | | | | | | | | 8 | 7 | 6 | 5 | 4 | 3 | 2 | |
| 2 | | | | | | | | | 9 | | | | | | | | 5 | 8 | 7 | 6 | 3 | 4 | ② | 2 |
| 3 | | | | | | | | | | 9 | | | | | | | 6 | 5 | 8 | 7 | 4 | ③ | | 3 |
| 4 | 10 | | | | | | | | | | 9 | | | | | | 7 | 6 | 5 | 8 | | 4 | | |
| 5 | 11 | | 10 | | | | | | | | | 9 | | | | | 8 | 7 | 6 | 5 | | | 4 | |
| 6 | 12 | | 11 | 10 | | | | | | | | | 9 | | | | | 8 | 7 | 6 | 5 | | 4 | |
| 7 | 13 | | 12 | 11 | 10 | | | | | | | | | 9 | | | | | 8 | 7 | 6 | 5 | 4 | |
| 0 | 14 | | 13 | 12 | 11 | 10 | | | | | | | | | 9 | | 7 | | | 8 | 5 | 6 | 4 | |
| 1 | 15 | | 14 | 13 | 12 | 11 | 10 | | | | | | | | | 9 | 8 | 7 | | | 6 | 5 | 4 | |
| 2 | 16 | | 15 | 14 | 13 | 12 | 11 | 10 | | | | | | | | | 9 | 8 | 7 | | 5 | 6 | 4 | |
| 3 | | | 16 | 15 | 14 | 13 | 12 | 11 | | | | | | | | | 10 | 9 | 8 | 7 | 6 | 5 | 4 | |
| 4 | | | | 16 | 15 | 14 | 13 | 12 | 11 | | | | | | | | 7 | 10 | 9 | 8 | 5 | 6 | 4 | |
| 5 | 17 | | | | 16 | 15 | 14 | 13 | 12 | 11 | | | | | | | 8 | 7 | 10 | 9 | 6 | 5 | 4 | |
| 6 | | | | | 17 | 16 | 15 | 14 | 13 | 12 | 11 | | | | | | 9 | 8 | 7 | 10 | 5 | 6 | 4 | |
| 7 | 18 | | | | | 17 | 16 | 15 | 14 | 13 | 12 | 11 | | | | | 10 | 9 | 8 | 7 | 6 | 5 | 4 | |
| 0 | 19 | 18 | | | | | 17 | 16 | 15 | 14 | 13 | 12 | 11 | | | | 7 | 10 | 9 | 8 | 5 | 6 | ④ | 4 |
| 1 | | 19 | 18 | | | | | 17 | 16 | 15 | 14 | 13 | 12 | 11 | | | 8 | 7 | 10 | 9 | 6 | ⑤ | | 5 |
| 2 | | | 19 | 18 | | | | | 17 | 16 | 15 | 14 | 13 | 12 | 11 | | 9 | 8 | 7 | 10 | | ⑥ | | 6 |
| 3 | | | | 19 | | | | | 18 | 17 | 16 | 15 | 14 | 13 | 12 | 11 | 10 | 9 | 8 | ⑦ | | | | 7 |
| 4 | 20 | | | | | | | | 19 | 18 | 17 | 16 | 15 | 14 | 13 | 12 | 11 | 10 | 9 | ⑧ | | | | 8 |
| 5 | | | | | | | | | 20 | 19 | 18 | 17 | 16 | 15 | 14 | 13 | 12 | 11 | 10 | 9 | | | | |
| 6 | | | | | | | | | | 20 | 19 | 18 | 17 | 16 | 15 | 14 | 13 | 12 | 11 | 10 | | | 9 | |
| 7 | | | | | | | | | | | 20 | 19 | 18 | 17 | 16 | 15 | 14 | 13 | 12 | 11 | 10 | | 9 | |
| 0 | 21 | | | | | | | | | | | 20 | 19 | 18 | 17 | 16 | 15 | 14 | 13 | 12 | 11 | 10 | 9 | |
| 1 | | 21 | | | | | | | 16 | | | | 20 | 19 | 18 | 17 | 12 | 15 | 14 | 13 | 10 | 11 | ⑨ | 9 |
| 2 | | | | | 21 | | | | 17 | 16 | | | | 20 | 19 | 18 | 13 | 12 | 15 | 14 | 11 | ⑩ | | 10 |

FIG. 12

INVENTOR.
JOHN A. McLAUGHLIN
BY
Fraser and Bogucki
ATTORNEYS

Jan. 31, 1967 J. A. McLAUGHLIN 3,302,176

MESSAGE ROUTING SYSTEM

Filed Dec. 7, 1962 19 Sheets-Sheet 8

INVENTOR.
JOHN A. McLAUGHLIN
BY
Fraser and Bogucki
ATTORNEYS

INVENTOR.
JOHN A. McLAUGHLIN
BY
Fraser and Bogucki
ATTORNEYS

INVENTOR
JOHN A. McLAUGHLIN
BY
Fraser and Bogucki
ATTORNEYS

INVENTOR
JOHN A. McLAUGHLIN
BY
Fraser and Bogucki
ATTORNEYS

FIG. 20
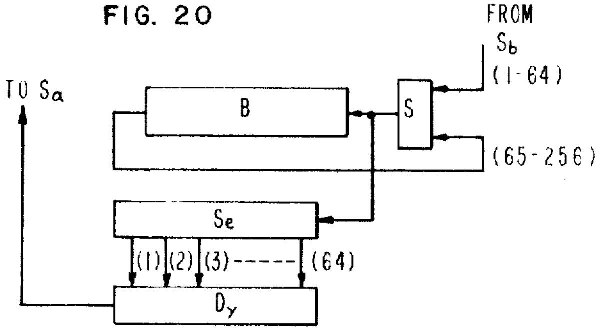
FIG. 21
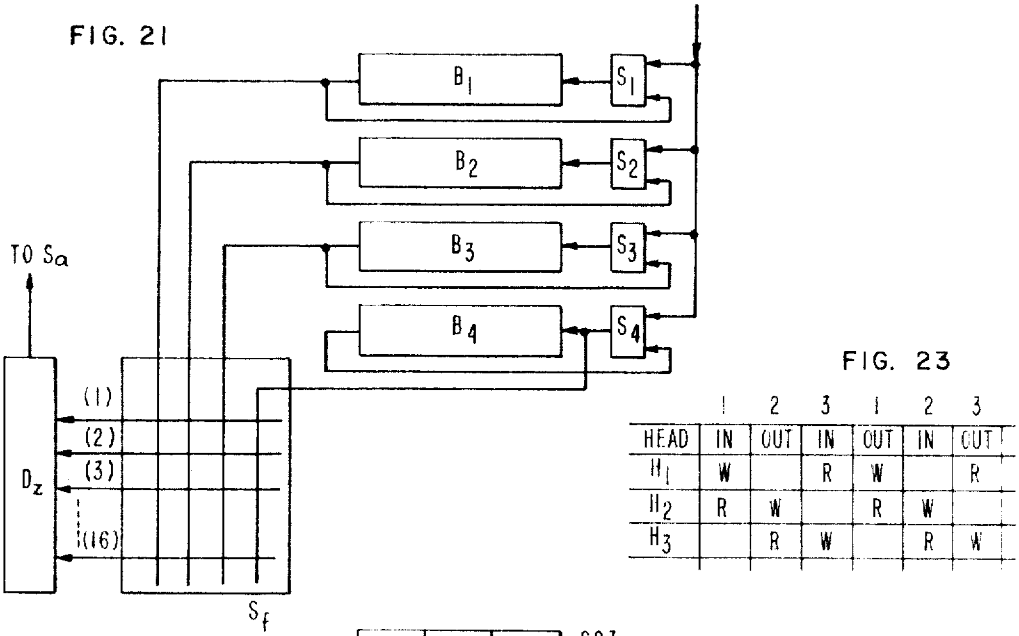
FIG. 23
| HEAD | 1 IN | 2 OUT | 3 IN | 1 OUT | 2 IN | 3 OUT |
|---|---|---|---|---|---|---|
| $H_1$ | W | | R | W | | R |
| $H_2$ | R | W | | R | W | |
| $H_3$ | | R | W | | R | W |
FIG. 22
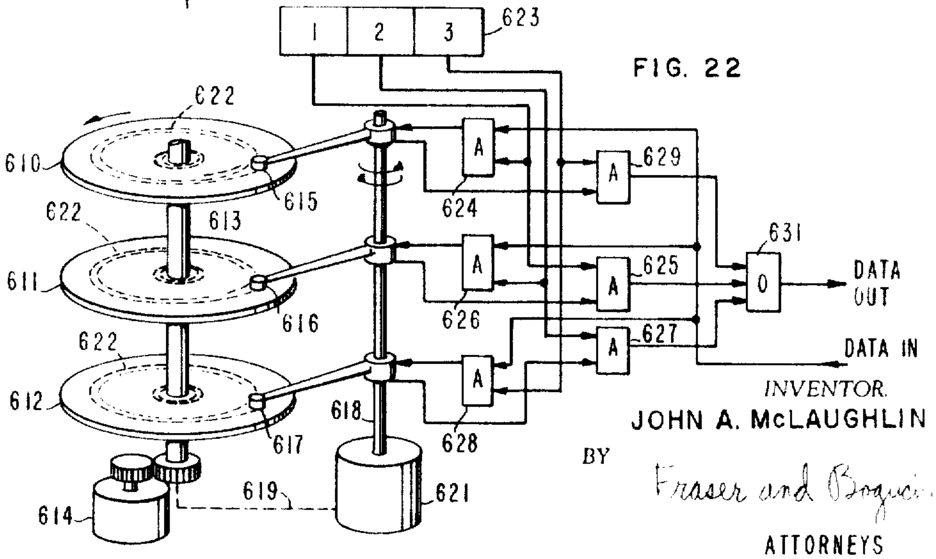
INVENTOR.
JOHN A. McLAUGHLIN
BY
Fraser and Bogucki
ATTORNEYS FIG. 24
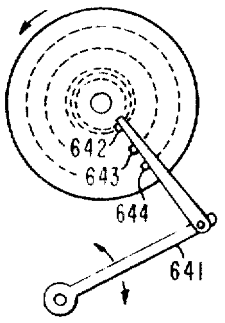
FIG. 25
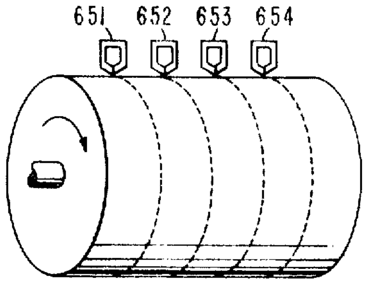
FIG. 26
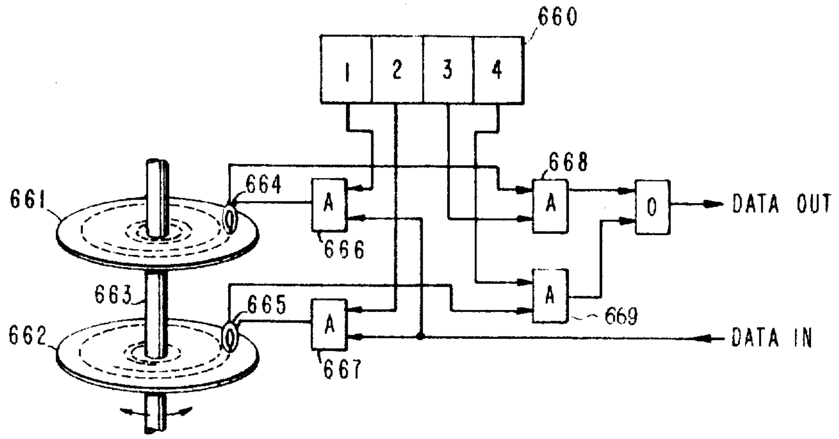
FIG. 27
| HEAD | IN | OUT | IN | OUT | IN | OUT |
|---|---|---|---|---|---|---|
| $H_1$ | W | | R | | W | |
| $H_2$ | | W | | R | | W |
INVENTOR.
JOHN A. McLAUGHLIN
BY
Fraser and Bogucki
ATTORNEYS

| $D_3$ | | | | | | | | | | | | | | | | $D_2$ | | | | $D_1$ | B | C |
|---|---|---|---|---|---|---|---|---|---|---|---|---|---|---|---|---|---|---|---|---|---|---|
| 21 | 20 | 19 | 18 | 17 | 16 | 15 | 14 | 13 | 12 | 11 | 10 | 9 | 8 | 7 | 6 | 5 | 4 | 3 | 2 | 1 | | 6 |
| 6 | 21 | 20 | 19 | 18 | 17 | 16 | 15 | 14 | 13 | 12 | 11 | 10 | 9 | 8 | 7 | 2 | 5 | 4 | 3 | (1) | 1 | 7 |
| 7 | 6 | 21 | 20 | 19 | 18 | 17 | 16 | 15 | 14 | 13 | 12 | 11 | 10 | 9 | 8 | 3 | 2 | 5 | 4 | | | 8 |
| 8 | 7 | 6 | 21 | 20 | 19 | 18 | 17 | 16 | 15 | 14 | 13 | 12 | 11 | 10 | 9 | 4 | 3 | 2 | 5 | | | 9 |
| 9 | 8 | 7 | 6 | 21 | 20 | 19 | 18 | 17 | 16 | 15 | 14 | 13 | 12 | 11 | 10 | 5 | 4 | 3 | (2) | | 2 | 10 |
| 10 | 9 | 8 | 7 | 6 | 21 | 20 | 19 | 18 | 17 | 16 | 15 | 14 | 13 | 12 | 11 | | 5 | 4 | 3 | | | 11 |
| 11 | 10 | 9 | 8 | 7 | 6 | 21 | 20 | 19 | 18 | 17 | 16 | 15 | 14 | 13 | 12 | | | 5 | 4 | 3 | | 12 |
| 12 | 11 | 10 | 9 | 8 | 7 | 6 | 21 | 20 | 19 | 18 | 17 | 16 | 15 | 14 | 13 | 4 | | | 5 | (3) | 3 | 13 |
| 13 | 12 | 11 | 10 | 9 | 8 | 7 | 6 | 21 | 20 | 19 | 18 | 17 | 16 | 15 | 14 | 5 | 4 | | | | | 14 |
| 14 | 13 | 12 | 11 | 10 | 9 | 8 | 7 | 6 | 21 | 20 | 19 | 18 | 17 | 16 | 15 | | 5 | 4 | | | | 15 |
| 15 | 14 | 13 | 12 | 11 | 10 | 9 | 8 | 7 | 6 | 21 | 20 | 19 | 18 | 17 | 16 | | | 5 | (4) | | 4 | 16 |
| 16 | 15 | 14 | 13 | 12 | 11 | 10 | 9 | 8 | 7 | 6 | 21 | 20 | 19 | 18 | 17 | | | | 5 | | | 17 |
| 17 | 16 | 15 | 14 | 13 | 12 | 11 | 10 | 9 | 8 | 7 | 6 | 21 | 20 | 19 | 18 | | | | | 5 | | 18 |
| 18 | 17 | 16 | 15 | 14 | 13 | 12 | 11 | 10 | 9 | 8 | 7 | 6 | 21 | 20 | 19 | | | | | (5) | 5 | 19 |
| 19 | 18 | 17 | 16 | 15 | 14 | 13 | 12 | 11 | 10 | 9 | 8 | 7 | 6 | 21 | 20 | | | | | | | 20 |
| 20 | 19 | 18 | 17 | 16 | 15 | 14 | 13 | 12 | 11 | 10 | 9 | 8 | 7 | 6 | 21 | | | | | | | 21 |
| 21 | 20 | 19 | 18 | 17 | 16 | 15 | 14 | 13 | 12 | 11 | 10 | 9 | 8 | 7 | (6) | | | | | | 6 | 22 |
| | 21 | 20 | 19 | 18 | 17 | 16 | 15 | 14 | 13 | 12 | 11 | 10 | 9 | 8 | 7 | | | | | | | 23 |
| | | 21 | 20 | 19 | 18 | 17 | 16 | 15 | 14 | 13 | 12 | 11 | 10 | 9 | 8 | | | | | 7 | | 24 |
| | | | 21 | 20 | 19 | 18 | 17 | 16 | 15 | 14 | 13 | 12 | 11 | 10 | 9 | 8 | | | | 7 | | 25 |
| | | | | 21 | 20 | 19 | 18 | 17 | 16 | 15 | 14 | 13 | 12 | 11 | 10 | 9 | 8 | | | 7 | | 26 |
| | | | | | 21 | 20 | 19 | 18 | 17 | 16 | 15 | 14 | 13 | 12 | 11 | 10 | 9 | 8 | | (7) | 7 | 27 |
| | | | | | | 21 | 20 | 19 | 18 | 17 | 16 | 15 | 14 | 13 | 12 | 11 | 10 | 9 | 8 | | | 28 |
| | | | | | | | 21 | 20 | 19 | 18 | 17 | 16 | 15 | 14 | 13 | 12 | 11 | 10 | 9 | 8 | | 29 |
| 13 | | | | | | | | 21 | 20 | 19 | 18 | 17 | 16 | 15 | 14 | 9 | 12 | 11 | 10 | (8) | 8 | 30 |
| 14 | 13 | | | | | | | | 21 | 20 | 19 | 18 | 17 | 16 | 15 | 10 | 9 | 12 | 11 | | | 31 |
| 15 | 14 | 13 | | | | | | | | 21 | 20 | 19 | 18 | 17 | 16 | 11 | 10 | 9 | 12 | | | 32 |
| 16 | 15 | 14 | 13 | | | | | | | | 21 | 20 | 19 | 18 | 17 | 12 | 11 | 10 | 9 | | | 33 |
| 17 | 16 | 15 | 14 | 13 | | | | | | | | 21 | 20 | 19 | 18 | | 12 | 11 | 10 | 9 | | 34 |
| 18 | 17 | 16 | 15 | 14 | 13 | | | | | | | | 21 | 20 | 19 | 10 | | 12 | 11 | (9) | 9 | 35 |
| 19 | 18 | 17 | 16 | 15 | 14 | 13 | | | | | | | | 21 | 20 | 11 | 10 | | 12 | | | 30 |
| 20 | 19 | 18 | 17 | 16 | 15 | 14 | 13 | | | | | | | | 21 | 12 | 11 | 10 | | | | 37 |
| 21 | 20 | 19 | 18 | 17 | 16 | 15 | 14 | 13 | | | | | | | | | 12 | 11 | (10) | | 10 | 38 |
| | 21 | 20 | 19 | 18 | 17 | 16 | 15 | 14 | 13 | | | | | | | | | 12 | 11 | | | 39 |
| | | 21 | 20 | 19 | 18 | 17 | 16 | 15 | 14 | 13 | | | | | | | | | 12 | 11 | | 40 |
| | | | 21 | 20 | 19 | 18 | 17 | 16 | 15 | 14 | 13 | | | | | 12 | | | | 11 | | 41 |

FIG. 28

INVENTOR.
JOHN A. McLAUGHLIN
BY
Fraser and Bogucki
ATTORNEYS

| $H_3$ | | | | | | | | | | | | | | | | $H_2$ | | | | $H_1$ | B | C | (C-B) | $G_2$ | $G_1$ |
|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 1 | 2 | 3 | 4 | 1 | 1 | 1 | 0 | 0 | 0 |
| 1 | 2 | 3 | 4 | 5 | 6 | 7 | 8 | 9 | 10 | 11 | 12 | 13 | 14 | 15 | 16 | 1 | 2 | 3 | 4 | 1 | 1 | 2 | 1 | 0 | 1 |
| 1 | 2 | 3 | 4 | 5 | 6 | 7 | 8 | 9 | 10 | 11 | 12 | 13 | 14 | 15 | 16 | 1 | 2 | 3 | 4 | 1 | 2 | 3 | 1 | 0 | 1 |
| 1 | 2 | 3 | 4 | 5 | 6 | 7 | 8 | 9 | 10 | 11 | 12 | 13 | 14 | 15 | 16 | 1 | 2 | 3 | 4 | 1 | 2 | 4 | 2 | 0 | 2 |
| 1 | 2 | 3 | 4 | 5 | 6 | 7 | 8 | 9 | 10 | 11 | 12 | 13 | 14 | 15 | 16 | 5 | 2 | 3 | 4 | 1 | 2 | 5 | 3 | 0 | 3 |
| 1 | 2 | 3 | 4 | 5 | 6 | 7 | 8 | 9 | 10 | 11 | 12 | 13 | 14 | 15 | 16 | 5 | 2 | 3 | 4 | 2 | 2 | 6 | 4 | 1 | 0 |
| 1 | 2 | 3 | 4 | 5 | 6 | 7 | 8 | 9 | 10 | 11 | 12 | 13 | 14 | 15 | 16 | 5 | 2 | 3 | 4 | 3 | 3 | 7 | 4 | 1 | 0 |
| 1 | 2 | 3 | 4 | 5 | 6 | 7 | 8 | 9 | 10 | 11 | 12 | 13 | 14 | 15 | 16 | 5 | 2 | 3 | 4 | 3 | 3 | 8 | 5 | 1 | 1 |
| 1 | 2 | 3 | 4 | 5 | 6 | 7 | 8 | 9 | 10 | 11 | 12 | 13 | 14 | 15 | 16 | 5 | 2 | 3 | 4 | 3 | 3 | 9 | 6 | 1 | 2 |
| 1 | 2 | 3 | 4 | 5 | 6 | 7 | 8 | 9 | 10 | 11 | 12 | 13 | 14 | 15 | 16 | 5 | 2 | 3 | 4 | 3 | 3 | 10 | 7 | 1 | 3 |
| 1 | 2 | 3 | 4 | 5 | 6 | 7 | 8 | 9 | 10 | 11 | 12 | 13 | 14 | 15 | 16 | 5 | 2 | 3 | 4 | 3 | 4 | 11 | 7 | 1 | 3 |
| 1 | 2 | 3 | 4 | 5 | 6 | 7 | 8 | 9 | 10 | 11 | 12 | 13 | 14 | 15 | 16 | 5 | 2 | 3 | 4 | 4 | 4 | 12 | 8 | 2 | 0 |
| 1 | 2 | 3 | 4 | 5 | 6 | 7 | 8 | 9 | 10 | 11 | 12 | 13 | 14 | 15 | 16 | 5 | 2 | 3 | 4 | 4 | 4 | 13 | 9 | 2 | 1 |
| 1 | 2 | 3 | 4 | 5 | 6 | 7 | 8 | 9 | 10 | 11 | 12 | 13 | 14 | 15 | 16 | 5 | 2 | 3 | 4 | 4 | 4 | 14 | 10 | 2 | 2 |
| 1 | 2 | 3 | 4 | 5 | 6 | 7 | 8 | 9 | 10 | 11 | 12 | 13 | 14 | 15 | 16 | 5 | 2 | 3 | 4 | 4 | 5 | 15 | 10 | 2 | 2 |
| 1 | 2 | 3 | 4 | 5 | 6 | 7 | 8 | 9 | 10 | 11 | 12 | 13 | 14 | 15 | 16 | 5 | 2 | 3 | 4 | 4 | 5 | 0 | 11 | 2 | 3 |
| 1 | 2 | 3 | 4 | 5 | 6 | 7 | 8 | 9 | 10 | 11 | 12 | 13 | 14 | 15 | 16 | 5 | 2 | 3 | 4 | 5 | 5 | 1 | 12 | 3 | 0 |
| 1 | 2 | 3 | 4 | 5 | 6 | 7 | 8 | 9 | 10 | 11 | 12 | 13 | 14 | 15 | 16 | 5 | 2 | 3 | 4 | 5 | 5 | 2 | 13 | 3 | 1 |
| 1 | 2 | 3 | 4 | 5 | 6 | 7 | 8 | 9 | 10 | 11 | 12 | 13 | 14 | 15 | 16 | 5 | 2 | 3 | 4 | 5 | 6 | 3 | 13 | 3 | 1 |
| 1 | 2 | 3 | 4 | 5 | 6 | 7 | 8 | 9 | 10 | 11 | 12 | 13 | 14 | 15 | 16 | 5 | 2 | 3 | 4 | 5 | 6 | 4 | 14 | 3 | 2 |
| 1 | 2 | 3 | 4 | 5 | 6 | 7 | 8 | 9 | 10 | 11 | 12 | 13 | 14 | 15 | 16 | 5 | 2 | 3 | 4 | 5 | 6 | 5 | 15 | 3 | 3 |
| 1 | 2 | 3 | 4 | 5 | 6 | 7 | 8 | 9 | 10 | 11 | 12 | 13 | 14 | 15 | 16 | 5 | 6 | 3 | 4 | 6 | 6 | 6 | 0 | 0 | 0 |
| 1 | 2 | 3 | 4 | 5 | 6 | 7 | 8 | 9 | 10 | 11 | 12 | 13 | 14 | 15 | 16 | 5 | 6 | 7 | 4 | 7 | 7 | 7 | 0 | 0 | 0 |
| 1 | 2 | 3 | 4 | 5 | 6 | 7 | 8 | 9 | 10 | 11 | 12 | 13 | 14 | 15 | 16 | 5 | 6 | 7 | 8 | 7 | 7 | 8 | 1 | 0 | 1 |
| 1 | 2 | 3 | 4 | 5 | 6 | 7 | 8 | 9 | 10 | 11 | 12 | 13 | 14 | 15 | 16 | 9 | 6 | 7 | 8 | 7 | 7 | 9 | 2 | 0 | 2 |
| 1 | 2 | 3 | 4 | 5 | 6 | 7 | 8 | 9 | 10 | 11 | 12 | 13 | 14 | 15 | 16 | 9 | 10 | 7 | 8 | 7 | 7 | 10 | 3 | 0 | 3 |
| 1 | 2 | 3 | 4 | 5 | 6 | 7 | 8 | 9 | 10 | 11 | 12 | 13 | 14 | 15 | 16 | 9 | 10 | 7 | 8 | 7 | 7 | 11 | 4 | 1 | 0 |
| 1 | 2 | 3 | 4 | 5 | 6 | 7 | 8 | 9 | 10 | 11 | 12 | 13 | 14 | 15 | 16 | 9 | 10 | 7 | 8 | 7 | 7 | 12 | 5 | 1 | 1 |
| 1 | 2 | 3 | 4 | 5 | 6 | 7 | 8 | 9 | 10 | 11 | 12 | 13 | 14 | 15 | 16 | 9 | 10 | 7 | 8 | 7 | 8 | 13 | 5 | 1 | 1 |
| 1 | 2 | 3 | 4 | 5 | 6 | 7 | 8 | 9 | 10 | 11 | 12 | 13 | 14 | 15 | 16 | 9 | 10 | 7 | 8 | 7 | 8 | 14 | 6 | 1 | 2 |
| 1 | 2 | 3 | 4 | 5 | 6 | 7 | 8 | 9 | 10 | 11 | 12 | 13 | 14 | 15 | 16 | 9 | 10 | 7 | 8 | 7 | 8 | 15 | 7 | 1 | 3 |
| 1 | 2 | 3 | 4 | 5 | 6 | 7 | 8 | 9 | 10 | 11 | 12 | 13 | 14 | 15 | 16 | 9 | 10 | 7 | 8 | 8 | 8 | 0 | 8 | 2 | 0 |
| 1 | 2 | 3 | 4 | 5 | 6 | 7 | 8 | 9 | 10 | 11 | 12 | 13 | 14 | 15 | 16 | 9 | 10 | 7 | 8 | 8 | 8 | 1 | 9 | 2 | 1 |
| 1 | 2 | 3 | 4 | 5 | 6 | 7 | 8 | 9 | 10 | 11 | 12 | 13 | 14 | 15 | 16 | 9 | 10 | 7 | 8 | 8 | 8 | 2 | 10 | 2 | 2 |
| 1 | 2 | 3 | 4 | 5 | 6 | 7 | 8 | 9 | 10 | 11 | 12 | 13 | 14 | 15 | 16 | 9 | 10 | 7 | 8 | 8 | 9 | 3 | 10 | 2 | 2 |
| 1 | 2 | 3 | 4 | 5 | 6 | 7 | 8 | 9 | 10 | 11 | 12 | 13 | 14 | 15 | 16 | 9 | 10 | 7 | 8 | 8 | 9 | 4 | 11 | 2 | 3 |

FIG. 29

INVENTOR
JOHN A. McLAUGHLIN
BY Fraser and Bogucki
ATTORNEYS

MESSAGE ROUTING SYSTEM

Filed Dec. 7, 1962

19 Sheets-Sheet 16

INVENTOR
JOHN A. McLAUGHLIN
BY
Fraser and Bogucki
ATTORNEYS

INVENTOR
JOHN A. McLAUGHLIN
BY Fraser and Bogucki
ATTORNEYS

INVENTOR.
JOHN A. McLAUGHLIN
BY Fraser and Bogucki
ATTORNEYS

INVENTOR.
JOHN A. McLAUGHLIN
BY
Fraser and Bogucki
ATTORNEYS

United States Patent Office 3,302,176
Patented Jan. 31, 1967

3,302,176
MESSAGE ROUTING SYSTEM
John A. McLaughlin, Los Gatos, Calif., assignor to International Business Machines Corporation, New York, N.Y., a corporation of New York
Filed Dec. 7, 1962, Ser. No. 243,063
44 Claims. (Cl. 340—172.5)

This invention relates to data processing systems, and in particular to message routing systems which manipulate data in the time domain to transfer data between an input system and an output system.

The field of data processing concerns, among other things, the conversion of uninterpreted or unorganized data into some form of electrical or mechanical signal and the subsequent transmission and utilization of the signals at higher speeds than would otherwise be possible. The techniques of automatic electronic data processing are being increasingly applied where large amounts of data must be stored, processed or presented, as in keeping commercial records, undertaking scientific testing and performing complex calculations.

The functions used in data processing may be broadly categorized under four different headings. A first of these functions may be termed input or read-in and is concerned with converting initially received data into one of the signal forms which is to be used in the system. Data storage is a second function, by means of which converted information is temporarily or permanently held for later use. The computing or calculating function involves the manipulation and use of the converted information; this function includes various operations, such as, modification of the data according to other information, use of the data to obtain new information, basic arithmetic steps, and even the transmission of the data between different points. The fourth and final function may be termed output or read-out and may be described as involving operations in which the converted and modified data is returned to its original form or some other form which is directly useful to the user of the data processing machine.

Modern data processing systems employ a variety of components and combinations for performing these different functions. The components and combinations seldom have fully compatible characteristics, however. In particular, serious incompatibilities as to time domain characteristics can exist; to illustrate, many processing operations can be carried out at high speed by electronic circuits, whereas other operations are effected by mechanical devices which inherently involve slower speeds. Read-in and read-out operations, for example, depend heavily upon mechanical techniques which are orders of magnitude slower than the purely electronic techniques now used for memory and computation functions. Many operators preparing input data by hand, as by key punch devices, are needed to supply sufficient data to utilize the capacity of a modern data processing system. Furthermore, the stored information within a magnetic core memory may be transmitted therefrom to be read out by a high speed printer, which even though extremely fast compared to conventional printers still relies upon mechanical movement and so operates much slower than the electronic parts of the system.

Differences in the data handling capabilities of different units within a system therefore reduce system efficiency and increase cost. High computing speeds can be achieved by using costlier elements and more complex circuits, but these expenses are unjustified if the speed capabilities of the computing units are not fully utilized. The usual techniques employed are to introduce special buffers or intermediate storages between the different units, or to multiply the number of input and output devices. Such techniques utilize elementary time domain systems to merely compress or expand data on the time scale, or bypass time domain problems simply by adding more equipment.

Differences in the operating rates of different components or combinations involve only one of the time domain problems encountered by data processing systems. Even though two functional units may have like data rates, delays in the transfer of information may be necessary because of incompatibilities between data supply and demand. In other words, the supply of information to a particular unit may be out of phase with the demand from that unit for more information. A common illustration of this problem can be found in a central telegraph station which has incoming lines from many different sending stations. The central receiving station will often be engaged in receiving messages from one or more sending stations at the same time that an additional one of the sending stations is ready to transmit a message. Thus there is a surplus of messages when there is no additional demand from the receiving station.

Another particular illustration of incompatibility between supply and demand rates of different components arises in the storage of randomly occurring messages at the input to a circulating memory. A circulating memory will store the messages in a continuous sequence while maintaining them in the order in which they are received. The time domain problem encountered herein may be simply illustrated by assuming that the circulating memory has a capacity of ten successive messages and that the first three messages are already arranged in order on this memory. Now assume that message number four arrives at the input station for the circulating memory when the input station is adjacent the storage position of message number two. Obviously message number four cannot be immediately recorded upon the circulating memory at that time without interfering with message number two. Suppose, in another instance, that the same message number four arrives at the input station for the circulating memory when the input station is located adjacent to message position number five on the memory. In this position, message number four can be transcribed without interfering with previously recorded messages, but it will not be in the prescribed successive order. The message must then be transcribed in a position which should be reserved for the next incoming message, or must be held almost a full rotation of the circulating memory until position number four is again available to the input station.

A similar situation is obtained when the messages are already transcribed upon a circulating memory in a prescribed order and a read-out device is demanding messages therefrom at random times. In other words, the demand for a particular message, such as number four, may occur when the output device on the circulating memory is adjacent a different numbered message, such as message number seven. Here again the demanding station would be required to wait the rotation of the memory to the correct position before receiving the correct output signal.

The two problems presented above in connection with the circulating memory are both characterized by the fact that either the sending or receiving station is presenting information to the other at a random rate, whereas the other is only capable of receiving this information in a time ordered fashion. This is a very simple problem in message routing, because only a single random source is involved. The problems are greatly multiplied when both sending and receiving stations supply and receive messages in random fashion. For example, a pair of messages, which are to be adjacent in time, such as messages one and two, may issue from the sending station three message units apart in time; however, the demanding station may issue a demand for these same messages at any time after they leave the sending station with much or no time separation between the two demands.

The discussion thus far of time domain problems in data processing systems has been concerned with the example of a single sending and a single receiving station solely for simplicity. Modern data processing and communication systems often in fact may use numbers of either or both sending and receiving stations. One example involves multiplexing systems, in which a number of separate signals share the same time interval. In multiplexing, the sending station sends messages from a number of different sources to the demanding station to be transferred to a number of different receivers. This method of communication separates the signal from each of the transmitters into discrete bits or signal samples which are separated by selected time intervals. One discrete bit from each of the separate transmitters is then inserted into the intervals in a prescribed order relative to the other information bits. Thus complete signals from each of a number of transmitters can be transferred to a receiving station during the same overall time interval. The receiving station will contain equipment which will operate in synchronized fashion to select each of the discrete bits of information from one of the transmitters to reproduce the input signal for the receiving station. The sampling rates must, of course, be high enough to retain all of the information content of the original signal.

It is possible, as previously mentioned, to employ larger numbers of either sending or demanding stations to insure that there will always be an available station to send or receive a message. In a typical case, a message system might employ numerous different receivers to handle incoming messages, provided randomly from a number of different sending stations. This plurality of different receivers may be interconnected and assigned to the incoming messages on a priority basis with the incoming messages being supplied to the first available receiver. The number of different receivers therefore permits handling peak volumes of input messages from the sending stations without overall system delay.

The use of multiplexing arrangements and multiple receivers and senders at the different stations allows high transfer rates. Both techniques require extra equipment, but neither solves problems which may be presented in the time domain. These time domain problems, such as data rate incompatibility and incompatibility between supply and demand are equally applicable to multiplexing and priority message systems.

It is therefore an object of this invention to provide a system for the manipulation of data signals in the time domain between sending and receiving stations having definite different time requirements.

Another object of this invention is to provide a data processing system which may be connected between a sending station and a receiving station to achieve an ordered flow of data signals therebetween.

A further object of this invention is to provide time manipulation circuitry for the orderly control of data flow when the message inputs and outputs of the circuitry are randomly related in time.

Still another object of this invention is to provide sacking circuits for accomplishing the orderly arrangement of incoming data signals, which occur at random time intervals, for subsequent insertion into a circulating memory device.

A still further object of this invention is to provide feeding circuits for producing orderly flow of information signals between a circulating storage device and an output device making random demands for these signals.

An additional object of this invention is to provide a logic controlled variable delay device which will operate as a first-in, first-out device between a sending and demanding circuit, where the sending circuit provides signals to the delay device at random time intervals and the demand device demands these signals from the delay device also at random time intervals.

Other objects of this invention are to provide circuits for the manipulation of data in time domain to maintain an orderly flow of information in data processing systems employing multiplexing, separate channels, and a priority signal routing system.

Yet another object of this invention is to provide a circuit arrangement for effecting the orderly flow of information signals between a sending station of one speed capability and a receiving station having a different speed capability.

Still another object of this invention is to provde a novel circulating memory which is capable of storing large amounts of data and providing long periods of circulation for that data within the memory.

Various other objects and advantages of this invention will become apparent from the detailed description of the invention, and the novel features will be particularly pointed out hereinafter in connection with the appended claims.

Briefly, in accordance with the objects of this invention, unique variable time delay circuits are combined with decision circuitry for determining and establishing precise but variable time delays necessary to an orderly flow of information between two points. Variable time delays are introduced by use of a number of unequal separate delays connected in serial fashion between a sending station and a demanding station which receives the data signals. Gating circuits are provided between each of the different time delay devices to be activated in accordance with appropriate control signals. The gating circuits determine the flow path of a particular information signal relative to the delay devices, which determine the adjustment of the messages in the time domain. The delay devices may be used in series, or in some cases as recirculating elements. Control over these gating circuits is exercised by separate control circuits which are uniquely capable of comparing the time of sending of a particular information singal with a measured possibility of a demand for that signal from the demanding circuit at a particular time. The gating circuits controlling the flow path of information through the variable delays may either be made directly responsive to the signals produced by the control circuit or the control circuit may be used to insert flow information in the form of a control word into the signal itself, which will later be sensed in the gating circuitry to determine its subsequent movement through the variable delay system.

The concepts used in providing the desired time domain manipulation of information input signals between a single sending station and a single demanding station are also applied in a similar fashion to other data processing environments, such as multiplexing, priority routing, and multiple input and output devices to obtain orderly and efficient communication between components. Additional gating and control circuitry is provided and intercoupled with the basic time domain manipulation circuits to provide control of the more complex circuitry.

Also, in accordance with the aspects of this invention a unique system of cyclic recording is provided for use as a time delay device. The cyclic recording member, which in one specific example is a magnetic record disc, employs multiple magnetic heads intercoupled with one another for recording and transferring information to and from the disc and between one another in accordance with the movement of the recording disc. This allows conventional recording techniques to be used to provide very long time delays for large volumes of information, this being necessary to certain practical applications of time domain manipulation devices which are set forth herein.

The invention will be better understood upon consideration of the following detailed description taken together with the accompanying drawings, in which like elements in the various figures have like designation and in which:

FIG. 1 is a schematic block diagram of the essential elements of a stacking system according to the invention;

FIG. 2 is a time diagram of successive record signal intervals illustrating the operation of a stacking system such as that shown in FIG. 1;

FIG. 3 is a schematic circuit diagram using logical symbols of one arrangement of a stacking system according to the invention;

FIG. 8 is a time diagram of the operation of the feeding system of FIG. 7 over successive signal intervals;

FIG. 12 is a flow diagram useful in explaining the operation of the system of FIG. 11;

FIG. 20 illustrates in block diagram form an alternative embodiment of a portion of the time switching arrangement of FIG. 19;

FIG. 21 illustrates by block diagram another arrangement according to the invention for use with the time switching message system of FIG. 19;

FIG. 22 is a schematic illustration of a delay device which may be employed to provide the delays necessary in the preceding embodiment of the invention;

FIG. 23 is a flow diagram illustrating the operation of the delay device of FIG. 22;

FIG. 24 shows an alternative arrangement of the elements of a delay device such as employed in FIG. 22;

FIG. 25 is a partial schematic diagram of a magnetic head and magnetic drum arrangement useful in providing the necessary delays;

FIG. 26 is yet another embodiment in schematic diagram form of a useful delay device applicable to this invention;

FIG. 27 is a time diagram illustrating the operation of the delay device of FIG. 26;

FIG. 28 is a time diagram illustrating the operation of a nonbinary feeding system according to the invention;

FIG. 29 is another time diagram illustrating the operation of a nonbinary feeding system according to the invention wherein the delay devices comprise a magnetic head and a magnetic disc or drum;

Figures 33, 35:
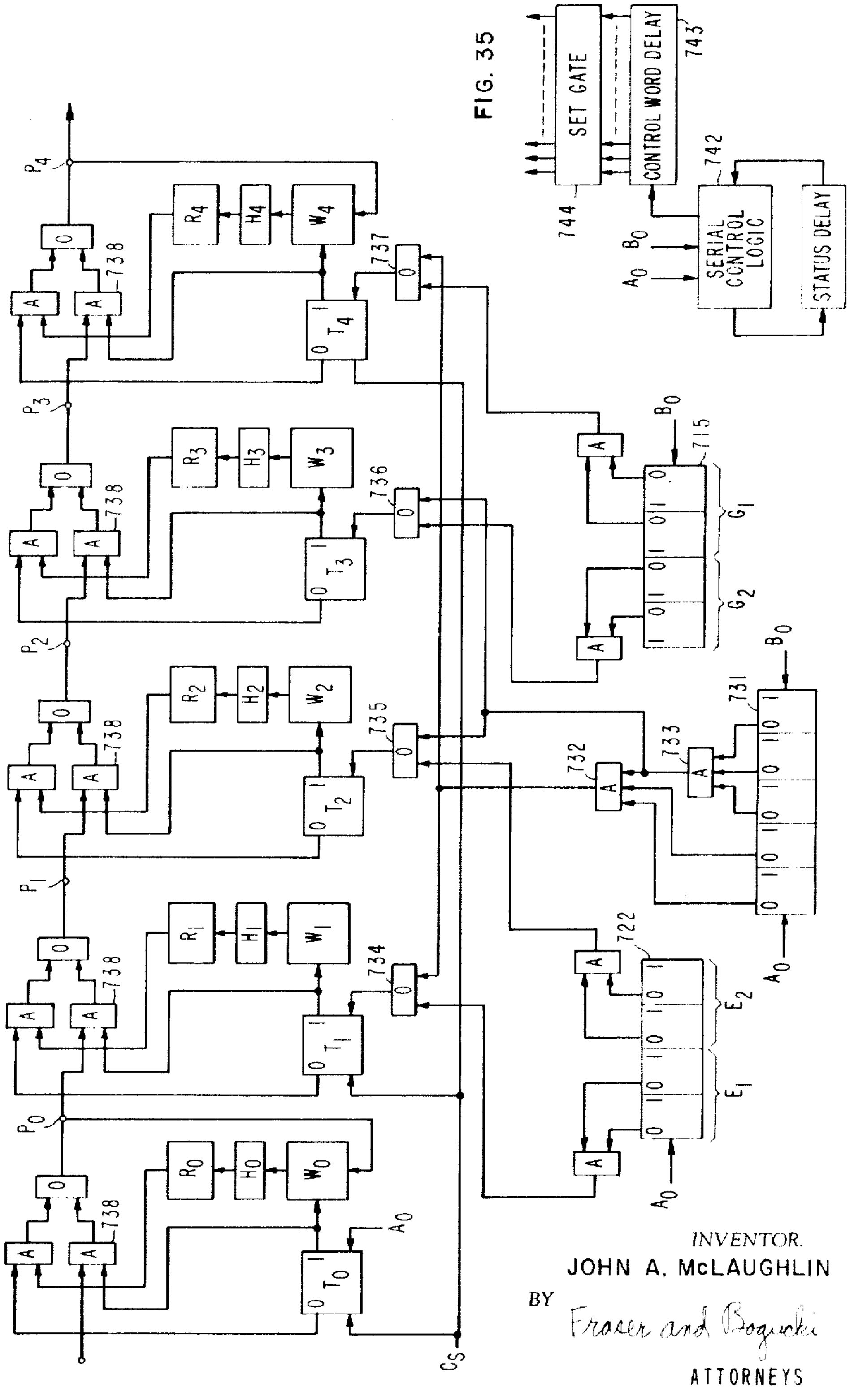
Figure 34:
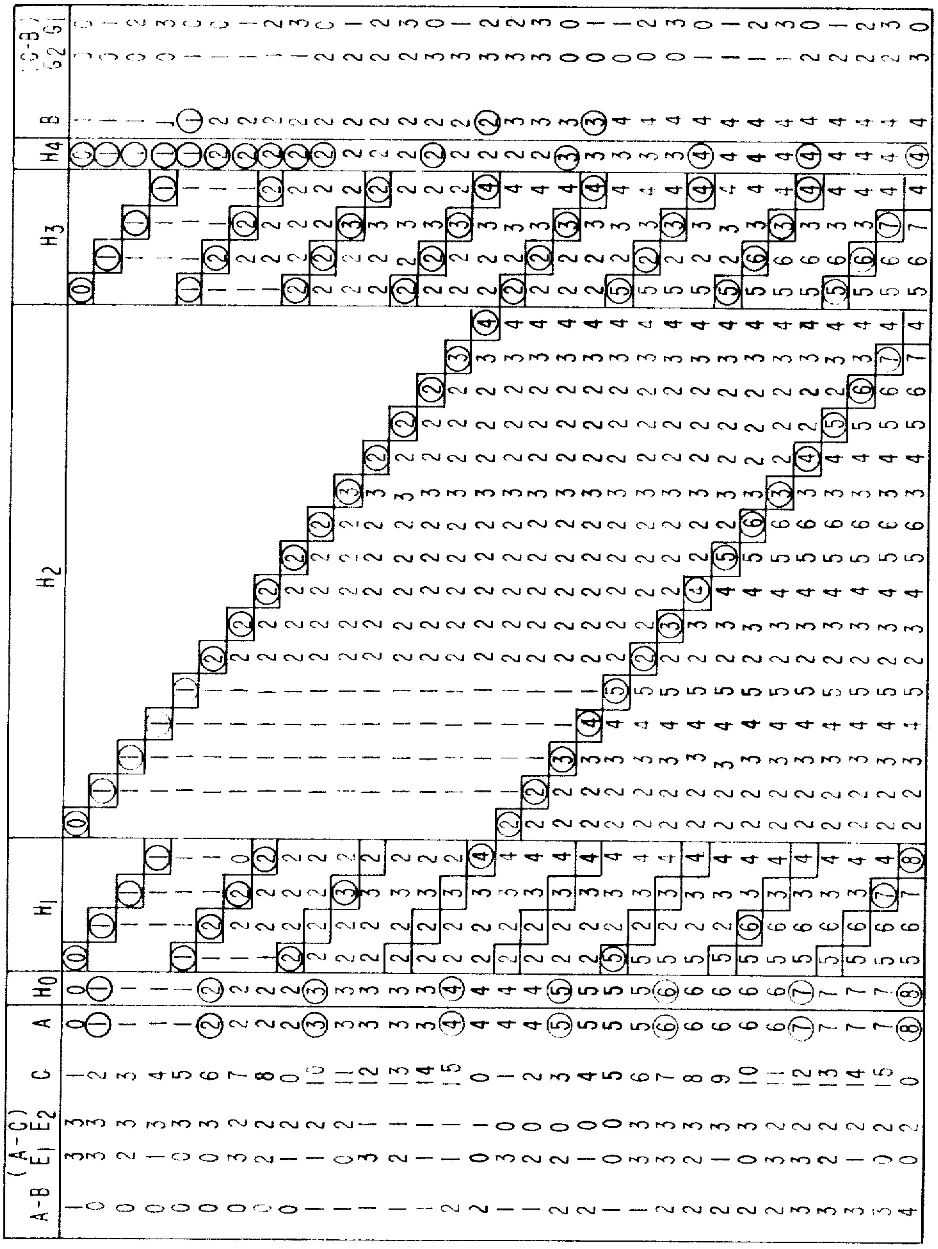

FIG. 33 schematically shows the logical circuitry of a nonbinary queuing memory system according to the invention;

FIG. 34 is a time diagram illustrating the operation of the nonbinary queuing memory structure of FIG. 33; and FIG. 35 illustrates in block diagram form a serial logic network for extending the operation of a nonbinary queuing system to multiple channel applications.

In general, the specification and the associated drawings are so arranged as to include initial simplified descriptions of the various aspects of the invention to aid in the understanding of the specific circuitry involved. For this purpose, simplified block diagrams are included along with a signal flow table or time diagram to illustrate the nature of the problems presented to the systems in accordance with the invention and how these problems are overcome. Specific arrangements for one or more exemplifications are included thereafter to explain the practical implementation of each of the concepts. The detailed block diagrams may include only a portion of the entire system, for simplicity, but the interrelationships of the various units are defined and illustrated as the description proceeds.

*Stacking system*

In FIG. 1 is illustrated a "stacking" system for accepting records in electrical signal form from a source 110 and storing them compactly in a recirculating memory loop 111 in the order of their reception. The term stacking is derived from an analogy to the conventional punch card handling systems in common usage in the data processing field. Considering each card as being a record or message, the cards may be received at random intervals and stacked in the order of their receipt. The stacking in this case consists simply of placing the most recently received card on top of the previously received cards.

In contrast, the data records contemplated for use with systems of the present invention are in the form of electrical pulses received in the time domain and cannot be physaically accumulated in a manner comparable to the card system. To illustrate, suppose that records are arriving intermittently from the source 110 and that it is intended to store them in the circulating storage loop 111 in the order in which they arrive. If all the records must enter the circulating storage loop through a single write station 112 located adjacent the continually circulating storage loop 111, a time domain problem is immediately encountered in that the storage loop 111 may not be in the proper position with relation to the writing station 112 to accept a given record as the record arrives from the source 110. Many records may arrive during one circulation of the circulating storage memory in any high performance system. Therefore, a stacking system between the record source 110 and the circulating memory 111 is arranged to provide a temporary orderly storage of an incoming record until it can properly be positioned on the circulating memory with minimum time loss. Due to the possible high volume of records from the source 110, the stacking system should be capable of storing at least one less record than the capacity of the storage loop.

For simplicity of description, a fixed record length is assumed. When it is considered that there are no inherent lower or upper limits upon the record length, it may be seen that the system may easily be used to stack actual messages of arbitrary length by subdividing the record length into selected incremental parts.

The information contained in the records will be considered as being purely digital in form even though similar systems may be constructed for routing analog signals. Most present day data processing systems are for handling digital information and employ digital logic circuits. Although analog systems are widely used, representation of the concepts of the invention as applied to digital techniques will be more directly and generally useful.

Returning now to FIG. 1, the stacking system includes a series of delay devices D1, D2, D3 and D4 arranged in a serial order between the output terminal of the record source 110 and the input terminal 112 of the circulating memory 111. Each of these delay devices are capable of receiving a record and delaying that record for a period of time equal to an integral number of the standard record lengths. In this particular example, each of the delays provides a delay of an interval which is twice the interval produced by the preceding delay. For example, the delay device D1 has a total delay time equal to a single record interval (assume one millisecond). The succeeding delay devices D2, D3 and D4 have total delay times equal to two milliseconds, four milliseconds and eight milliseconds respectively. The particular form of the delay device depends upon the deviation of the delay interval which is desired, but essentially each of these delay devices will comprise passive delay means such as conventional electronic delay lines and acoustic delay lines for relatively short and long delays respectively. Certain mechanical and magnetic recording techniques have been found to be particularly useful in providing longer delays for more complicated message routing systems, as will later be explained.

The record source 110 is assumed to be synchronized with the rotation of a circulating memory 111 such that the beginning of a particular record from the source will coincide with the positioning of the write station or recording head 112 at the beginning of a record space on the circulating memory 111. The circulating memory 111 can take any practical form, such as a circulating magnetic drum, a magnetic disc, or an endless magnetic tape, all of which are well known in the art. The memory and the write and read stations have been generalized for simplicity.

At the input terminal of each of the delay devices D1 to D4 is connected a corresponding gating circuit $G_1$, $G_2$, $G_3$ and $G_4$, the combinations of delay and gating elements forming successive different delay stages, such as a first stage 116. These gating circuits are responsive to control signals obtained from a control counter 113 so as to pass the incoming record in one of two directions in the manner of a two position switch. In the first of these directions, a particular record will be directed into the delay (such as D1) associated therewith, and in the other direction the record will be directed to a bypass line (such as B1) which will apply the data record, without a delay interval, at the input of the succeeding gating circuit (such as $G_2$). Therefore a record can then travel through the stacking circuit from a first points (such as $P_0$) at the input to $G_1$ to a second point (such as $P_2$) at the input to $G_3$ and be delayed in time by one or both of the delay circuits, or bypass them both, depending upon the control signals delivered to the gates $G_1$ and $G_2$ by the control counter 113.

The control counter 113 receives signals from the record source 110 which are representative of the order number of the incoming signal. The control counter 113 also receives signals through a read station or pick-up head 114, located adjacent the circulating memory 111, which signals continually represent the rotational positon thereof with respect to the stationary write station 112. The two signals are then used by the control counter 113 to generate control signals for each of the gating devices $G_1$, $G_2$, $G_3$ and $G_4$ to govern the switching positions of the gating devices. Thus the stacking system may broadly be regarded as producing control signals from the control counter 113 which depend upon the order of an incoming signal from the source 110 and the position of the circulating memory 111 at the time of arrival of a particular record.

The operation of the stacking system may best be described in connection with the timing diagram of FIG. 2, which defines the paths of a typical series of records through the stacking system. The numbers in horizontal lines across the diagram of FIG. 2 represent the state of the system at the beginning of each record cycle. The vertical columns give the condition of specific parts of the stacking system during each of the succeeding record intervals. In particular, column $L_0$ gives what may be called "present position" of the memory in terms of the contents of the storage loop sector immediately behind the write station 112, which is the same as the number of the record space on the circulating memory 11 which has just passed the write station 112. Column $L_1$ represents the record space immediately ahead of the write station 112. Each of the columns beneath $D_1$, $D_2$, $D_3$ and $D_4$ represent a record cycle or interval within the respective delay devices.

Now assume that the circulating storage loop 111 has a capacity of sixteen records, that records 1 through 9 have already been stored in their proper places, and that the storage loop is in such position that record number 4 is about to pass the writing station 112. At the same time assume that record number 10 is emerging from the record source 110. It is obvious that this record number 10 must be delayed exactly six record intervals before being fed to the writing station 112 so that it will be correctly recorded in the number 10 position on the circulating memory storage loop. This desired delay of 6 record intervals can be obtained by passing the incoming record through the two cycle delay $D_2$ and the four cycle delay $D_3$ before applying the record to the writing station 112. The delay amount is determined by using the serial number (A) of the record emerging from the source 110 and the cycle count (C), which represents the present position of the writing station 112 on the circulating memory 111. In this example, the serial number is 10 and the cycle count is 4, and the desired delay interval is equal to the serial number minus the cycle count ($A-C$). Should this result be a negative number it is simply necessary to add 16 to the negative result (complement) to give the proper delay count.

Each of the aforementioned quantities A, C and $A-C$ are represented in the table of FIG. 2. The quantity $A-C$, which determines the total delay of an incoming record, is generated by the input control counter 113, which in turn produces appropriate output signals to operate each of the gates which control selection of the different delay devices in the various stages.

Record number 10 arrives at point $P_0$ (the input to the first gate $G_1$) at the record cycle interval designated by the first line in the time diagram of FIG. 2. At that same time, the cycle count C is 4 ($L_1$ is also 4) thus making the control count ($A-C$) held by the control counter 113 equal to 6. Now the number 6 registered in the control counter activates the gate $G_1$ to bypass the first delay $D_1$, thus routing the record to point $P_1$ at the input of the gate $G_2$ without delay. The control counter 113 controls the gate $G_2$, to close off the bypass line $B_2$ and deliver the signal into the delay device $D_2$ to receive a two interval delay. During the next record interval the entire record 10 has been deliverd to the delay $D_2$ and is contained therein in the first half of the delay, as indicated by the numeral 10 in the first $D_2$ column corresponding to the second record interval. After passing through the delay $D_2$ in two record intervals, the record 10 is then delivered to the gate $G_3$, which has likewise received a signal from the control counter 113 closing off the bypass ($B_3$) and delivering the signal to the delay $D_3$. The record 10 then progresses through the four record intervals of the delay $D_3$, as shown in the time diagram, to emerge at the point $P_3$ at the input to the gate $G_4$. The gate $G_4$, however, is controlled by the control counter 113, to deliver the record 10 to the bypass $B_4$ so that it is applied directly to the write station 112 to be recorded on the circulating memory 111 in its proper position.

Notice that the next succeeding record number 11 is received during the third record interval, as shown by the diagram, at which time the cycle count C is 6. The control counter 113 registers the value $A-C$ value of 5. The output signal from the control counter 113 delivers this record number (number 11) through the first gate $G_1$ to the first delay $D_1$, bypasses the second delay $D_2$, is delivered to the third delay $D_3$ to be delayed for the 4 cycle interval, and bypasses the last delay $D_4$, where it is finally recorded upon the circulating memory 111 through the write station 112. The arrival of subsequent records is shown in the time diagram to further illustrate the operation of the stacking system. Thus it may be seen that the incoming records are effectively shifted in the time domain between the record source 110 and the circulating memory 111 so that they are recorded in their proper order without slowing the rate at which input data is supplied.

The delay devices employed in this stacking system must be arranged in an ascending order of total time delay from the record source 110 to the circulating memory 111 in order to insure that no interference between records will arise from the arrival of two signals at the same point in the system at the same time. By simple analysis it may be shown that when the delays are arranged in the foregoing order the possibility of interference between two signals is nonexistent.

The following will illustrate three basic forms for implementing the control logic circuitry of the stacking system. A first of these logical circuits as illustrated in FIG. 3 requires the simplest equipment and is preferred when only the simple function of stacking discussed above is contemplated. A binary control counter 121 is used to maintain the current value of the control function $A-C$. The control counter actually counts in binary fashion in the reverse direction; in other words, when a pulse is applied at its input the value of the binary count contained therein is decreased by one. The pulses delivered to the control counter 121 are obtained through an AND gate 122, which effectively determines the absence or presence of a record from the source 110 appearing at the point $P_0$. There are two input signals to the AND gate 122. The first of these input signals is obtained from a cycle pulse source 123 which delivers an enabling pulse to the AND gate at the beginning of each record interval. This enabling pulse can be obtained in any practical manner, such as by the use of an oscillatlor and frequency dividing combination which is synchronized with the rotation of the circulating memory 111, or by separate synchronizing index pulses recorded on the circulating memory 111 to signify the beginning of each record interval. These index pulses may be sensed at a read station 114.

The second input signal for the AND gate 122 is derived from the incoming record itself and corresponds to the first bit interval contained in the data record. A single pulse can be inserted at the front end of an incoming record by the record source 110 such that every record will have a pulse in this first bit position. This first pulse is passed through an inverter circuit 124, so that the AND gate 122 is inhibited when input signals from the record source 110 are present. Thus the AND gate 122 produces a pulse to be counted upon the occurrence of each pulse from the sector pulse source 123 if no pulse from the source 110 appears to coincide with the sector pulse. The count of the control counter 121 is thereby reduced by a single count when there is no record being delivered by the source 110 to the stacking circuit. When there is a record from the source 110, the inverter circuit 124 provides a low level signal to the AND circuit 122 and blocks the delivery of a sector pulse to the counter 121, so that the count remains the same.

A brief description of the well known logical elements employed in the stacking system of FIG. 3 will prove helpful to an understanding of the operation of this exemplification as well as other forms of the invention presented hereinafter. This description will present only the logical function of each element because many circuits are available in the art for these purposes.

Each of the different logical gating elements is identified as to type and function by a letter designation. For example, the gates designated by A are AND or coincidence gates, which function to produce a binary output pulse at such time that binary input pulses are received coincidentally on each of the inputs thereto. The OR gates, represented by an O, perform the common logical function of producing a binary output at any time that a binary input is received on at least one of the input lines. An inverter circuit, which is represented by an I is so called because the output is inverted with respect to the input; thus, an inverter circuit may be used to provide an output signal at such times that no input pulse is being delivered thereto. The designations D (for delay circuit) and G (for gating circuit) are also used hereafter in a manner corresponding to that of FIG. 1.

The binary counter 121 comprises a number of bistable circuits $E_1$–$E_4$ connected in a series transfer arrangement. Because this counter is to provide a reverse count rather than the normal forward binary count, the counter input and interconnections between stages are arranged in known fashion to provide operation in a reverse direction. The bistable stages within the counter produce a pair of outputs, one from each half of a stage. An output signal will appear on one of these outputs when the stage is in a one or "set" state, and on the other output when the stage is in the zero or "reset" state.

The two outputs from one of the stages of the reverse counter 121 are used to control two AND gates, which perform the gating function for a respective one of the delay lines. One of the AND gates in each pair is effective when enabled to switch an incoming record through the associated delay device, while the other of the pair of AND gates when enabled bypasses the record around the delay device to the input of the next delay device. To this end, the first stage $E_1$ of the reverse counter 121 has the output from its two halves connected to the pair of AND gates 125 and 126 located at the input to the first delay $D_1$. The one output indication of the first stage $E_1$ is connected to the delay AND gate 125 to thereby enable it to pass signals into the delay device $D_1$ so that the record will be delayed for a single record interval before being delivered to the OR gate 127 at the output of the delay device. The other or zero output of the first stage $E_1$ is connected to enable the bypass AND gate 126 to divert an incoming record directly and without delay to an OR gate 127.

Each of the subsequent stages $E_2$, $E_3$ and $E_4$ of the reverse counter 121 control a corresponding pair of associated AND gates in similar fashion at each of the succeeding delays $D_2$, $D_3$ and $D_4$. In this manner the count within the reverse counter 121 effectively controls the flow of signals either around or through the respective delays of the stacking system.

Figures 4, 5:
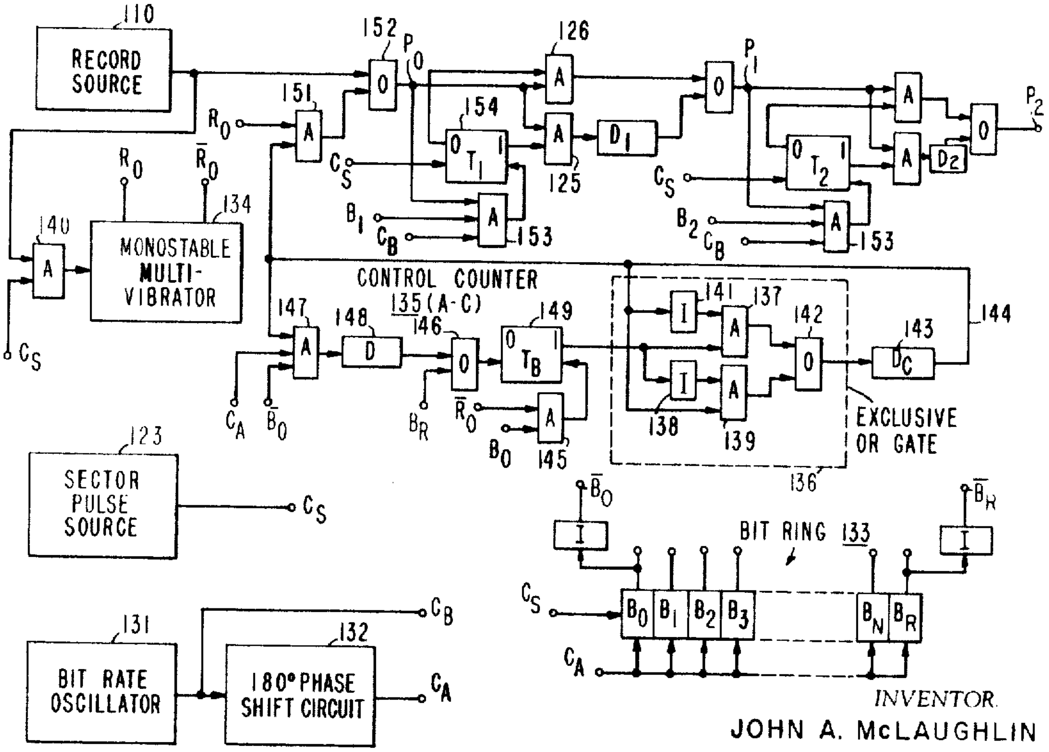
FIG. 4 is a time diagram of successive signal intervals illustrating the operation of the stacking system shown in FIG. 3.
FIG. 5 illustrates in logical diagram form another example of a stacking system according to the invention.

FIG. 4 is a time diagram in which the count maintained in the reverse counter 121 is shown for each record interval during a typical operation of the stacking system. As mentioned above this reverse counter 121 maintains the current binary count of the switching function $(A-C)$. To illustrate, record number 1 arrives during the first time period at such time as the writing station 112 is beginning to pass the area reserved for the cycle count number 6 on the circulating memory 111, as shown in the corresponding position of the $L_1$ column. At this time the switching function $(A-C)$ would be equal to minus five since A is one and C is six; by the addition of 16 to the minus quantity, the true value of the switching function is obtained and is equal to 11. The number 11 is registered in binary form in the reverse counter stages $E_1$, $E_2$, $E_3$ and $E_4$ as 1101. The first stage $(E_1)$ opens the AND gate 125 and the signal is fed to the delay device $D_1$ where it is delayed for one record interval. After the record has passed completely through the gate 125 into the delay $D_1$, a sector pulse from the sector pulse source 123 appears at the AND gate 122 to indicate the beginning of another record interval. Since record number 2 has not arrived at point $P_0$ from the source 110 and thus there is no leading pulse to the inverter 124, the inverter 124 delivers a pulse indication to the AND gate 122, which is fully actuated to pass the sector pulse to change the count in the reverse counter 121. In record interval number 3, according to the time diagram of FIG. 4, a record number 2 is received from the source 110; therefore, a pulse is delivered to the inverter 124, thus causing the inverter 124 to disable the AND gate 122 and block a sector pulse from the source 123 to the reverse counter 121. In this case, the single count change produced during the second record interval has reduced the indication of the first stage $E_1$ from a one state to a zero state. Accordingly, when record number two arrives during the third record interval, the gate 125 is held closed by the stage $E_1$ and the AND gate 126 is opened to bypass the first delay $D_1$. Therefore, the logical circuitry is effective to reduce the count in the reverse counter 121 by a single count only when no record is being received from the record source 110. Correspondingly, the counter 121 insures that the first record is correctly diverted through the second and fourth delays to insure proper entry into the memory. For the sake of brevity, the remainder of the time diagram will not be described herein, as it is consistent with the operation previously discussed in conjunction with FIG. 2.

It should be noted from FIG. 4 that when a record first arrives from the source 110 its subsequent path through the delay devices is determined by the count then existing in the reverse counter 121, but that this count may change while a record is still within the stacking system delays. Such changes, however, do not alter the path which it is intended that a record should take. Because of the arrangement of delay devices in an increasing order and the decrease in control count, proper control is maintained even while values are changing. This is made possible because change of the count in a particular stage after a record has arrived requires an amount of time at least equal to the amount of time for that particular record to completely pass through that particular delay stage. The particular switching logic used in the exemple of FIG. 3 closely coincides with the general organization of a stacking system as expressed in conjunction with FIG. 1.

FIG. 5 illustrates another stacking system in which the routing of the record through the stacking system delays is accomplished in a different manner while inserting a control word at the front of each record. As the record reaches each of the delays in the stacking system, the control word is sampled to determine whether the record should be introduced into the delay or bypassed.

The stacking system of FIG. 5 is considerably more complicated than the preceding stacking system of FIG. 3, both in logical circuitry and various additional timing circuits. To aid in the understanding of the operation, FIG. 6 presents a time base diagram of the various timing pulses and their relation to one another.

Figure 6:
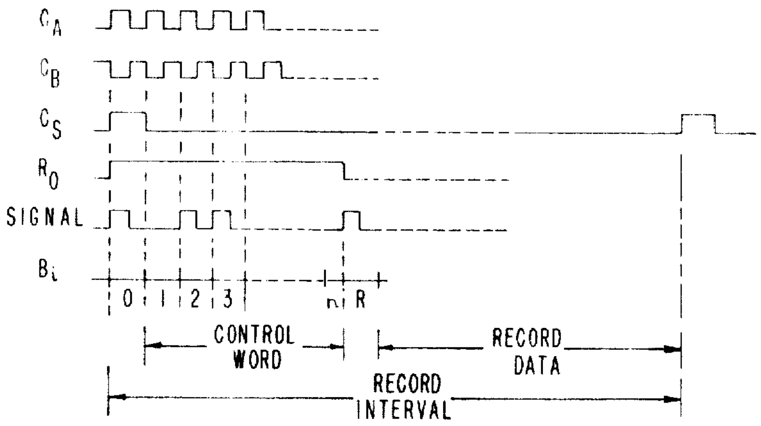
FIG. 6 is a waveform diagram illustrating the time relation of various signals employed in the operation of the stacking system example of FIG. 5.

Referring to FIGS. 5 and 6, the sector timing pulse $C_S$ is obtained as before and is a relatively short duration pulse occurring at the beginning of each record interval. The short duration, rectangular pulses $C_A$ and $C_B$ are both obtained from a bit rate oscillator 131 and are 180° out of phase with respect to one another. The bit rate oscillator 131 provides a continuous stream of rectangular pulses $C_B$ at a rate which coincides with the bit rate of the binary information contained in the control word, the control word being composed of separate binary bits as will later be explained. A phase shift circuit 132 is connected to the output of the bit rate oscillator 131 to provide the second series $C_A$ of pulses occurring at the same bit rate, but 180° out of phase with the first pulses $C_B$.

A bit ring 133 is also provided for the purpose of providing separate timed pulses to coincide with each separate bit contained in the control word, which is attached to the beginning of each record. The bit ring is simply a multistage shift register having a total number of stages equal to the total number of bits in the control word, plus two. These two additional bits, designated $B_O$ and $B_R$, are located at either end of the control word bits, and are used to designate the beginning and end of the control word. During operation, a pulse is inserted from the sector pulse source 123 at the beginning of the record interval into the bit ring 133 to change the state of the first stage $B_O$, and this bit of information is then shifted in sequence down the stages of the bit ring by $C_A$ pulses from the bit rate oscillator 131, which $C_A$ pulses occur at the bit rate of the control word. In this manner, a pulse will appear on the output of a particular stage of the bit ring, such as $B_2$, at a point in time corresponding to the passage of a particular bit in the control word, such as the second bit in the case of $B_2$. This allows the correct bit to be chosen from the control word to operate the correct gating circuit as a record arrives at that gating circuit preceding a particular delay device of the stacking system.

An additional timing pulse $R_0$ is generated which has a pulse width covering the entire interval of the control word. To generate $R_0$ the sector pulses $C_S$ from the sector pulse source 123 are fed to the input of an AND gate 140 to enable it at the beginning of each record interval. The other input to the AND gate 140 is obtained from the record source 110 and may be the single pulse inserted at the front end of each record to indicate impending arrival of a record. The coincidence of the sector pulse and the inserted pulse from the record source 110 delivers a short duration pulse from the AND gate 140 to a monostable multivibrator timing circuit 134 causing it to change state to the one condition. The monostable multivibrator circuit 134 will then remain in the one condition for a selected length of time, as determined by its time constants, which time is here equal to the interval of the control word, that is $B_O$ to $B_N$ bit intervals, following which it returns to its original zero state. The monostable circuit 134 produces an output pulse $R_0$ on one output terminal during the time that it is in the one state and a second output signal on a second terminal during the remainder of the time that it is in the zero state, this second output signal here being designated $\overline{R_0}$. The monostable circuit 134 is thus effective to separate a record interval into the part containing the control word and the remainder containing the record information.

The control counter 135 of the exemplification shown in FIG. 5 is substantially different from the previous example of FIG. 3. Instead of a static registration of the control count $(A-C)$, the counter here circulates a series of binary pulses which represent the control count. As shown by the diagram of FIG. 6, the series of binary pulses which make up the control word are recorded in the circulating control counter 135 in a return-to-zero type representation. The period of circulation of the control word in the counter 135 is equal to a full record interval so that the same parts of the control word will be available during corresponding periods of each later record interval. As before, the count represented by the circulating control word must be modified in accordance with the operation of the stacking system; the the count represented by the circulating word is therefore reduced by a single count for each record period in which a record is not received from the source 110. By doing this, as heretofore explained, the values of the control count (*A*—*C*) are maintained current.

An "exclusive OR" gate 136 is employed as one of the principal elements in the control counter for the subtraction of a binary one from the circulating control word. Here, the exclusive OR gate 136, a variety of which are known in the art, is advantageously composed of several gating elements of conventional nature. The exclusive OR gate 136 receives a plurality of inputs, in this case only two, and provides an output only when a single one, but no more than one, of these inputs contains a signal. This logical function is accomplished in terms of the more familar logical circuitry by applying a first of the inputs both directly to a first AND gate and indirectly through an inverter circuit 138 to a second AND gate 139. The second input is connected in like fashion through another inverter circuit 141 indirectly to the first AND gate 137 and also directly to the second AND gate 139. Thus, it may be seen that the pair of AND gates 137 and 139 receive both inputs, one in inverted form and the other directly, the inverted input to one being the direct input to the other. When a signal appears on both inputs, the inverters 141 and 138 inactivate each of the AND circuits 137, 139; similarly, when no input signal is applied the direct lines to both AND gates 137, 139 will be inactive, thus keeping both gates closed. Only when there is a signal on one and only one input will one of the AND gates 137, 139 be opened to deliver the output signal through the OR gate 142 to provide an output signal from the exclusive OR gate 136. In subsequent figures, exclusive OR gates will be represented as the other gates, but with the designation $O_E$.

The path of circulation of the control word includes a delay element 143 ($D_C$), which produces a delay time equal to one record interval. From the delay element $D_C$, the control word is fed back by the line 144 to one of the inputs of the exclusive OR circuit 136, and also back into the input of the delay element $D_C$, so that a closed but controllable circulating path for the control word is established. The exclusive OR gate 136 operates in a manner to be later described to alter the circulating control word in accordance with the previously described principle.

The other input signal to the exclusive OR gate 136 is obtained from the one state output terminal of a bistable circuit 149, designated $T_B$. The $T_B$ bistable circuit 149 is set into its one state by signals from an AND gate 145 which receives the two inputs $\overline{R_0}$ (from the monostable circuit 134 indicating that no record is being received from the record source 110) and $B_O$ (from the first stage of the bit ring 133 indicating the beginning of a control word). Thus the bistable circuit $T_B$ delivers an output signal to the exclusive OR gate 136 when no signal is being received at the beginning of a record interval. The bistable circuit $T_B$ remains stably in its one state until an input signal is applied from the OR gate 146 to return it to its zero state. A signal is received during each record interval through the OR gate 146 from the last stage $B_R$ of the bit ring 133, at the end of a control word. Thus the bistable circuit $T_B$ is always returned to its zero state at the end of the control word.

Now the circulating control word is also being fed back to perform what is known as an inverse carry function, in order to subtract a value of one from the control word when no record is being received during a particular record interval. This control word is fed back to the AND gate 147, which also received input signals $C_A$ and $\overline{B_O}$ (indicating any time during the record interval after the first bit $B_0$ from the bit ring 133). Thus the AND gate 147 delivers an output signal during the $C_A$ portion of a bit interval whenever the binary bit of the control word being circulated is a binary one. The output signal from the AND gate 147 is fed through a delay element 148 for a delay of a single bit interval and then delivered to the input terminal of the OR gate 146.

In operation, assume a four bit binary word 0–1–1–1 (decimal fourteen) is being circulated by the control counter 135. Also assume that there is no indication that a record is being received from the source 110 during the first bit interval $B_0$ of the bit ring 133, so that the $\overline{R_0}$ signal is also applied. The AND gate 145 therefore delivers a pulse to set the bistable circuit $T_B$, switching it to its one state. During the next bit interval, the first bit of the binary word, which is in this case a 0, is being recirculated to one input terminal of the exclusive OR gate 136 and also to the input of the AND gate 147 of the control counter 135. Because the exclusive OR gate 136 is receiving a one signal from the bistable circuit $T_B$ and a binary zero is being recirculated, the exclusive OR gate 136 produces an output pulse indicating a binary one. This output pulse is then inserted into the record interval delay element $D_C$ as the first binary bit of the control word. At the same time the AND gate 147 fails to deliver an output pulse at the $C_B$ half of the bit interval because the first bit was a binary zero, which acts to disable this AND gate 147. The second bit of the binary word received on the line 144 from the delay $D_C$ is a binary one, which is delivered to the other input of the exclusive OR gate 136. Because the bistable circuit $T_B$ is still in its one state, both input signals for the exclusive OR gate are present and there is no output signal to the delay element $D_C$ so that the second bit upon recirculation becomes a 0 or binary zero. Concurrently, however, the binary one of the second bit is fed back to activate the AND gate 147, the output pulse from which is to be delayed one bit interval by the delay element 148 and then delivered through the OR gate 146 to reset the bistable $T_B$ to its zero state for the next bit interval. Therefore, upon occurrence of the next binary one at the third bit of the control word, in this example, the bistable circuit $T_B$ is not delivering an output signal to the exclusive OR gate 136, and thus the binary one is delivered therethrough unchanged to the delay element $D_C$, as is the fourth and last binary bit of the control word. The control word now in the delay element $D_C$ is 1–0–1–1, which is the binary indication of the decimal control count 13, and properly one less than the previous indication.

The control word is also delivered on each recirculation to the input of another AND gate 151 which receives the additional input signal $R_0$ (indicating the portion of a record interval containing the control word). Thus the AND gate 151 is enabled for the duration of the control word only when a record is received from the source 110. The AND gate 151 controls insertion of the entire control word through an OR gate 152 at the beginning of the record interval. The record from the record source 110 along with its prefixed control word is delivered through the OR gate 152 to the associated gating circuitry of the stacking system.

The gating circuits of the stacking system act to sample the appropriate bit of the control word to determine whether the signal should be delayed or bypassed. To illustrate, as the first bit $B_1$ of the control word arrives at the input point $P_0$, the value of the bit is sampled at an AND gate 153. The AND gate 153 receives the bit timing pulse $B_1$ from the bit ring 133 and also a $C_B$ pulse from the bit ring oscillator 131. If the first bit of the control word is a binary one, the AND gate 153 will deliver an actuating pulse to a bistable circuit 154, designated $T_1$, to switch it to its one state. The one output signal from the bistable circuit $T_1$ enables the delay AND gate 125, thereby allowing the incoming record with its prefixed control word to be delayed a full record interval by the first delay element $D_1$. However, the bistable circuit $T_1$ is switched into a zero state by an initial sector pulse $C_S$ from the source 123 at the beginning of each cycle; therefore, unless the first binary bit being sampled is a binary one, the bistable circuit $T_1$ will remain in the zero state. The zero output signal holds the bypass AND gate 126 open so that the incoming record will be bypassed to the next stage of the stacking system without delay.

The remaining stages of the stacking system sample the appropriate bits of the control word in similar fashion by choosing the respective bit timing pulses from the bit ring 133 to operate the sampling AND gates 153 at the appropriate time. Thus at the second stage of the stacking system the second bit of the binary word will be sampled by a $B_2$ pulse from the bit ring 133 and the bypass and delay gates for this stage opened and closed accordingly.

Other forms of stacking systems in accordance with the present invention will suggest themselves to those skilled in the art. Systems similar to that of FIG. 5 may use a single set of control logic to make the switching decisions for each of the stages in turn so that a duplication of the control circuitry for each of the stages is not necessary. Such systems may insert a binary representation of the record number at the front of each incoming record. As a particular record approaches the gating circuit to one of the delay stages, the record number A may be compared by a subtraction unit with the cycle count C from the circulating member, and a switching decision may then be made for this particular stage from the results of this comparison. Immediately after the decision has been made for one stage, a similar operation may be carried out for the next succeeding stage for the record arriving at that point, and so on for the rest of the succeeding stages. The record interval must be at least as long as the number of stages times the length of the control word if all stages are to be served in the appropriate time interval by one set of control logic.

*Feeding system*

Although they have the disadvantage of requiring long random access times in some instances, long recirculating memory loops offer distinct advantages for economical storage of information data at high flow rates. When requests for data records contained in a long recirculating memory loop are made at random times or out of the order in which they appear on the storage loop, the disadvantage of the long random access times can be substantially decreased by use of a time domain buffer or feeding system inserted between the recirculating memory loop and the demanding station. Such feeding systems will in some respects be similar to the stacking system employed and described heretofore.

The essential differences between the stacking and feeding systems result from the fact that the randomness in the time domain occurs at the output side. This requires that the records be actually recirculated and retained within the delay devices of the feeding system rather than simply being variably delayed.

Figure 7:
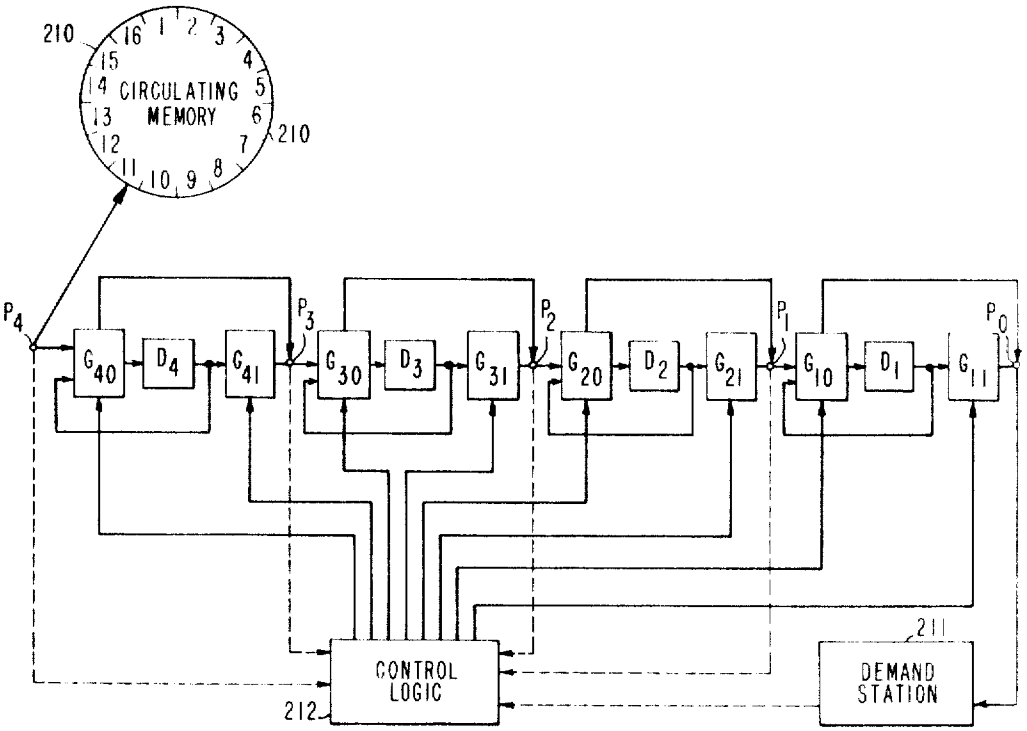
FIG. 7 is a block diagram illustration of a feeding system according to the invention.

In FIG. 7, a feeding system according to the present invention is placed between a circulating memory 210, which retains a series of records in sequential order, and a demand station 211, which may be in the nature of a message receiving center which demands records from the circulating memory at random times. The feeding system makes use of a series of delay devices $D_1$, $D_2$, $D_3$ and $D_4$, each of which has a total delay interval equal to an integral number of the delay intervals of the smaller delays. For simplicity, the records containing the information are considered (as before) to have a standard record interval length and each of the delay devices ($D_1$, $D_2$, $D_3$ and $D_4$) is considered to have a delay interval equal to an integral number of record intervals. The feeding system is to be contrasted with the stacking system, in that the order of the different delays is reversed along the path of information flow. Thus the records first pass through or bypass the largest delay $D_4$ providing a total delay equal to eight record intervals, then in succession through $D_3$ (four intervals), $D_2$ (two intervals), and $D_1$ (one interval).

The input data path in each of the delay stages is controlled by associated gating circuits $G_{10}$, $G_{20}$, $G_{30}$ and $G_{40}$ respectively, and $G_{11}$, $G_{21}$, $G_{31}$ and $G_{41}$ respectively. These gating circuits are similar to the gating circuits employed in the stacking system in that they either apply an incoming record from the circulating memory 210 to the associated delay device or bypass the delay device. The additional gating circuits $G_{11}$, $G_{21}$, $G_{31}$ and $G_{41}$ assist in a further gating function which is used in recirculating a record within a delay device. By opening the input gate ($G_{40}$, for example) while closing the output gate ($G_{41}$) at a given stage, a record emerging from the output terminal of the delay device is recirculated to the input terminal without being passed to the succeeding stage. The one of the three available paths which a particular record will take upon emerging from a delay device is thus determined by the condition of the gating circuits, and these in turn are operated by a control logic device 212. Control signals for the gating circuits from the control logic device 212 are determined by status signals received from different points in the feeding system and the demand station 211. These status signals are current indications of the conditions of the system and the then stored records.

The operation of feeding systems according to this invention may be broadly understood by reference to the time diagram of FIG. 8, which shows the operation of the system in a typical feeding situation. It will be helpful to first state the basic rules employed in making the decisions which are used in routing of the records. When a record arrives at a switching point (such as $P_3$) between the separate stages of the feeding system, the first step is to obtain a quantity F (which is defined as the difference between the record number R and the number B of the last record demanded by the demand station 211). If this quantity F ($R-B$) is less than the delay, measured in record intervals, of the next succeeding delay device (in this case $D_3$ equals four record intervals), the record will be routed to bypass that delay device and be delivered to the next switching point ($P_2$). If the quantity F is equal to or grater than the delay interval of the next succeeding delay device, the record will be routed to that succeeding delay device. More precisely stated, a record appearing at any switching point is routed into a designated delay in accordance with the following:

$$D_1 \text{ if } 1 \leq F < 2$$
$$D_2 \text{ if } 2 \leq F < 4$$
$$D_3 \text{ if } 4 \leq F < 8$$
$$D_4 \text{ if } 8 \leq F$$

For the purposes of this general discussion, the records emerging from a particular delay device are considered as also being present at the switching point of the delay device from which they came and will be governed by the same switching rules. These rules satisfy the condition that the records be available to supply any random potential demands of the demanding station 211. For example, a particular record will be routed into delay device $D_3$ unless there are three records ahead of it to supply demand that might occur before it would be available at the output of $D_3$.

FIG. 8 illustrates typical routing of records through a feeding system. Each horizontal line on the diagram shows the status of the system at the beginning of a record interval, in conformity with preceding time diagrams dealing with the stacking system. The first eight vertical columns of the diagram are used to indicate the position of records in the delay device $D_4$. The next four columns show the position of records in $D_3$, the next two apply to $D_2$, and the single column applies to $D_1$. The numbers which appear in these columns are the serial numbers of the records stored in the location corresponding to the position of the numbers. The number appearing in column B indicates a demand for the next record, and column C given the cycle count, which in this case is limited to numbers 0 to 7 for simplicity, even though there are sixteen intervals in the circulating memory.

The first line of the time diagram of FIG. 8 shows the condition of the feeding system immediately after loading. Loading is accomplished by supplying all of the records from the circulating memory in order through the delays of the feeding system. This procedure will store fifteen records in the delays in serial number order with the first record in $D_1$ the next two in $D_2$ the next four in $D_3$ and the remaining eight in $D_4$. In the absence of a demand, as in line 1, the records will continue to circulate in their respective delay devices. It should be noted that the first record is in the shortest delay device and is therefore always readily available to the demand station 211. In studying the diagram, it will be apparent that the records can be routed so that each record can be made available soon ennough to meet any demand within the restrictions that have been stated that the demand station cannot request more than one record per record interval and the records requested must be in serial number order.

Line 2 of the diagrams shows no demand during that record interval, therefore record number 1 is recirculated in the delay $D_1$, and the record groups beginning with records 2, 4 and 8 are recirculated to the input terminals of the $D_2$, $D_3$ and $D_4$ delay devices. In the third record interval a demand is made and record 1 is read out from the delay $D_1$ to the demand station 211, record 2 is introduced into the delay $D_1$ for the next record interval, and the rest of the records continue to recirculate in the delay devices $D_3$ and $D_4$. The records have therefore been shifted in time by one interval, and record 2 is now available for read out upon demand. The remainder of FIG. 8 need not be discussed in detail, inasmuch as it illustrates by other examples that the flow of the records from one delay device to the other is governed by the basic decision rules employing quantity F. It should also be noted that in the application of the switching rules no two records will be caused to be routed to the same point during the same record interval.

It will be helpful to the understanding of this aspect of the invention, and to the appreciation that there will be no interference between different records, to review the relation between record numbers and the cycle count (C). Notice that during record intervals where C is equal to 0 (refer to FIG. 8), only records numbered 2, 4, 6, etc., can be emitted from the delay $D_2$, only records numbered 4, 8, 12, etc., can be emitted from the delay $D_3$, only records numbered 8, 16, 24, etc., can be emitted from the delay $D_4$, and so on. Similar situations exist for other values of C.

Figures 9, 11:
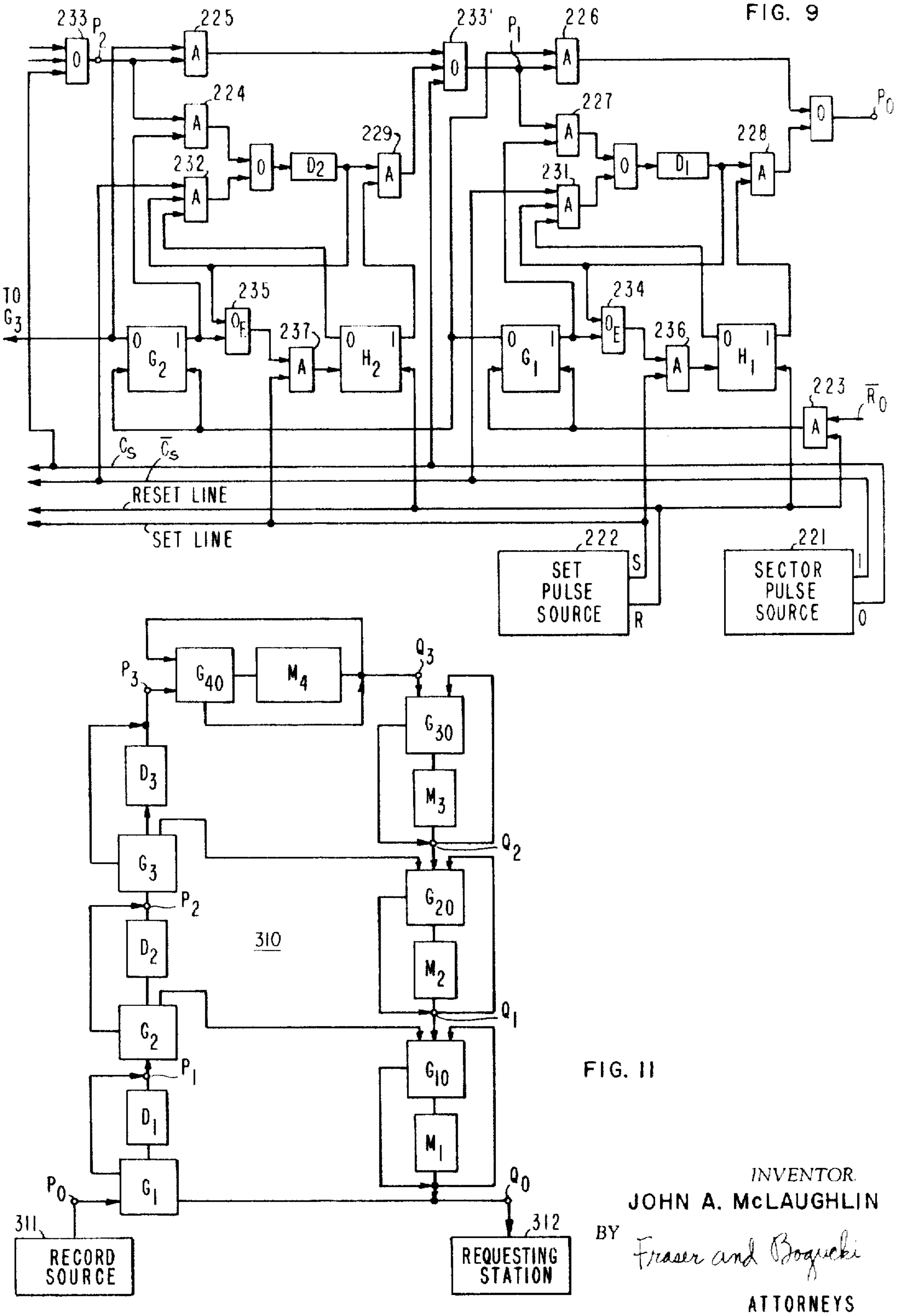
FIG. 9 is a logical circuit diagram illustrating another arrangement of a feeding system according to the invention.
FIG. 11 illustrates in block diagram form a queuing system according to the invention.

In FIG. 9, the feeding system stages containing the delays $D_1$ and $D_2$ are included with their associated logical circuitry to explain one example of a feeding system according to the present invention. This example employs comparatively simple logic and utilizes the storage space within the delays with particular efficiency. However, the conceptual aspects are sufficiently complex to warrant a general discussion of the nature and development of the logical equations which are used.

This feeding system employs a binary control counter which maintains the current value of a variable G which is equal to the cycle count C minus the number B of the last record demanded. The binary count within the binary control counter may be expressed by the equation:

$$G=C-B=G_1+2G_2+4G_3+8G_4 \qquad (1)$$

where $G_1$, $G_2$, $G_3$ and $G_4$ are 0 or 1, depending on the binary state of the corresponding counter stage. The number contained in this counter is then used to control the switching within the feeding system. For example, suppose that a record R arrives at point $P_3$. The record R can be represented in binary form such that:

$$R=R_1+2R_2+4R_3+8R_4 \qquad (2)$$

where $R_1$, $R_2$, etc. represent the separate digits of the binary number expressing this record count. Similarly, the cycle count (C) and the last record demanded (B) can be represented by these two equations:

$$C=C_1+2C_2+4C_3+8C_4 \qquad (3)$$

and $$B=B_1+2B_2+4B_3+8B_4 \qquad (4)$$

Because of the relationship between the record number R and the cycle count C, it is known that for any record at the point $P_3$, $R_1=C_1$, $R_2=C_2$, and $R_3=C_3$. To apply the basic switching rules as aforementioned, it is necessary to determine the value of:

$$F=R-B=F_1+2F_2+4F_3+8F_4 \qquad (5)$$

Because of the switching rules, it is known that for $D_3$, F is less than eight and therefore $F_4$ would be equal to zero. It should also be evident that because $R_1$ equals $C_1$, etc., $F_1$ will equal $G_1$, $F_2$ will equal $G_2$, and $F_3$ will equal $G_3$. Therefore, $$F=G_1+2G_2+4G_3 \qquad (6)$$

Now, if F is less than fuor, the record will be routed to $P_2$. Otherwise the record will be routed into the delay device $D_3$, this decision depending upon the value of $G_3$. The above reasoning can also be extended to the other switching points, so that a rule may be stated in general form that a record arriving at point $P_i$ (where *i* represents the number of a stage 1, 2, 3 or 4), will be routed to $P_i$–1 if $G_i$ is zero. If $G_i$ is one, the record will be routed into the delay $D_i$ instead of being bypassed.

For the records coming from a delay, the current value of the control count (G) will not contain sufficient information to make a switching decision. For example, when record R is emitted from $D_3$, $R_3$ is not necessarily equal to $C_3$. To resolve this difficulty, the current value of $G_i$ is entered into the delay $D_i$ at the beginning of every record interval. When emitted from $D_i$, the stored bit will be identified as the symbol $G_i^*$ to distinguish it from the current value of $G_i$. This quantity $G_i^*$ is then used together with the current value $G_i$ to make a decision in case of a record emitted from a delay.

A record emitted from $D_i$ will be routed to $P_i$–1 if $H_i$ is equal to one, where $H_i$ is defined by the logical equation:

$$H_i=G_iG_i^*+\overline{G_iG_i^*} \qquad (7)$$

If this quantity $H_i$ is equal to zero, then the record will be routed back into the input of the delay device $D_i$.

For example, if a record is emitted from $D_3$, it is known from the previous discussion that $F_1$ will be equal to $G_1$ and $F_2$ will be equal to $G_2$. It is also known that at the time the record entered $D_3$ the value of $F_3$ must have been one or the record would not have entered the delay $D_3$. Since that time, the value of the cycle count C (at $C_3$) must have changed value (that is, $C_3$ has been changed from zero to one or one to zero). The value of $R_3$ would not change because record numbers remain the same. At the time that the record R entered $D_3$ from the point $P_3$, $R_3$ was equal to $C_3$. On each cycle of recirculation in the delay $D_3$, the relationship between $R_3$ and $C_3$ alternates between equality and inequality. Because the quantity F is equal to R minus B, and the quantity G is equal to C minus B, it must be expected that $G_3$ will not be equal to $G_3$* if $F_3$ remains equal to one. Therefore, if $G_3$ is in fact equal to $G_3$*, $F_3$ must have changed value and is therefore now zero. In this case, the record R is routed to the point $P_2$ when $F_3$ is now zero. This example can be generalized and applied to the other delays with equal validity. It should be apparent from the general analysis that the quantity $H_1$ is the complement of $F_1$ for the output of the delay device $D_1$.

In FIG. 9, an example of a feeding system is shown which operates in accordance with the previously discussed principles. For simplicity, only the first two stages of a feeding system have been shown but the basic arrangements may readily be extended to the stages which are not shown. A sector pulse source 221 (previously described in connection with the stacking system) and a set pulse source 222 supply the principal timing signals. The sector pulse source 221 provides an actuating output voltage on its one output terminal at the beginning of each record interval and remains in this state until the end of the first bit interval of the record interval. Thereafter, the sector pulse source 221 delivers an actuating output voltage on its zero output terminal for the remainder of the record interval. The set pulse source 222 produces a set and a reset pulse at the beginning of each record interval. Set pulse source 222 may take any convenient form (such as, a pulse controlled shift register, as was used for the bit ring in FIG. 6) which will provide a short duration reset pulse on one output terminal at the beginning of a record interval and a short set pulse approximately in the center of the first bit interval.

Bistable circuits $G_1$ and $G_2$ (as well as those following in the remaining stages) are connected between the different stages to form a binary counter for binary pulses received from an AND gate 223. This AND gate 223 delivers a pulse to the first stage $G_1$ of the binary counter at the beginning of each record interval in which the demand station 211 does not request a record; as shown, this AND gate 223 is responsive to the pulse $\overline{R_0}$ (indicating that no record is being received) and to a reset pulse from the set pulse source 222.

Signals from the one output terminal of the bistable circuit $G_2$ enable the delay AND gate 224 to pass the incoming record into the delay $D_2$, while signals from the zero output terminal of the bistable circuit $G_2$ are used to enable the bypass AND gate 225 to pass the record without delay to the point $P_1$. Similarly, the bistable circuit $G_1$ of the first feeding stage controls the flow of records at stage one from the point $P_1$ through the bypass and delay AND gates 226 and 227 respectively.

Additional bistable circuits $H_1$ and $H_2$ are connected to control the flow of records from the respective delay devices $D_1$ or $D_2$ to either the following stage or back into the delay from which they have just emerged. At the beginning of a record interval, each of the bistable circuits $H_1$ and $H_2$ receives a reset pulse from the set pulse source 222 to place it in its one condition. In this condition, the bistable circuits $H_1$ and $H_2$ supply enabling output signals to the AND gates 228 and 229 so that signals are passed therethrough to the next succeeding stage. If the bistable circuits $H_1$ and $H_2$ are returned to their zero state before a record is emitted from the delay device $D_1$ or $D_2$ associated therewith, an enabling pulse is delivered to a recirculating AND gate 231 or 232 respectively, so that the record emitted from that delay is reinserted at the input terminal thereof through an associated OR gate.

The control line $C_s$ contains an actuating signal during the first bit time of a record interval as was previously described. This signal appears at point $P_2$ through the OR gate 233 and at point $P_1$ through the OR gate 233' and may be routed into $B_1$ if $G_1$ is in the one state or into $B_2$ if $G_2$ is in the one state. In this way the current binary control word values of $G_1$ and $G_2$ are inserted at the beginning of each record interval to be carried with the record.

When a particular record is emitted from a delay device ($D_1$ or $D_2$) the attached value of $G_1$ or $G_2$ (now referred to as $G_1$* and $G_2$*) appears during the first bit interval and is compared with the current value of $G_1$ or $G_2$ respectively by the exclusive OR gates 234 and 235 respectively. For example, if $G_1$* emitted from the delay device $D_1$ and the current value of $G_1$ are both one, the exclusive OR gate 234 will produce no output signal; likewise, no output signal will be produced if both are zero. If the two values are dissimilar, an output signal is produced by the exclusive OR gate 234 to enable the AND gate 236 to pass a set pulse during the first bit interval to place the bistable circuit $H_1$ in its one state. The exclusive OR gate 235 operates in a similar manner to pass a set pulse through the AND gate 237 to the bistable circuit $H_2$. Thus, the current value of $H_i$ is determined in each stage during the first bit interval in order to control the record being emitted from the delay device $D_i$ in that stage for either recirculation therein or passage to the next succeeding stage.

When a record is recirculated through one of the recirculation AND gates 231 and 232, a current value of $G_1$ or $G_2$ is inserted as the first bit in place of the old value $G_1$* or $G_2$*, which was used for comparison purposes. The pulse on $\overline{C}_s$ is necessary to prevent the entry of this $G_1$* into the delay device on the subsequent recirculation; the $\overline{C}_s$ pulse designates any time during the record interval after the first bit interval and is applied as one of the inputs to the recirculation AND gates 231 and 232 so that they are only enabled to pass the record therethrough after the first bit interval has passed. The new value of $G_i$ is, however, inserted through the AND gate 224 or 227 during this first bit interval.

It should be appreciated that except for the first bit interval the remaining time in each record interval is available to contain the binary information of the record. Thus, only one bit time per record interval is reserved for control purposes, allowing greater efficiency in the storage characteristics of the feeder system. It is also to be noted that the values of the cycle count (C), the number of the highest record demanded (B), and the record number (R) are not explicitly required nor are they maintained in this system.

Figure 10:
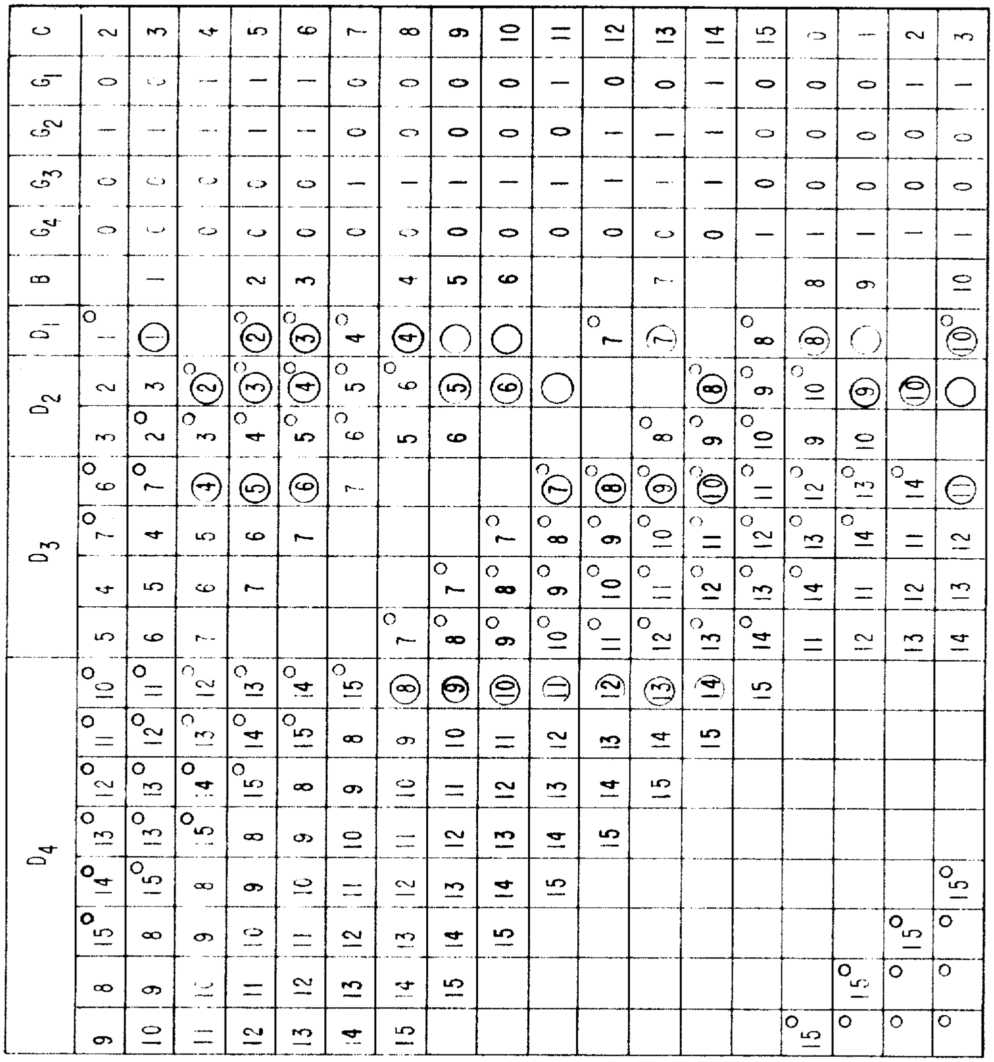
FIG. 10 is a time diagram useful in describing the operation of the system of FIG. 9.

FIG. 10 provides a time diagram illustrating the operation of the feeding system of FIG. 9 over several typical record intervals. The interpretation of this diagram is the same as that of FIG. 8 with the exception that columns $G_1$, $G_2$, $G_3$ and $G_4$ have been added to show the status of the control counters. Where the stored value of $G_i$ is a one, a dot is placed in the corner of the corresponding record space. In the last column of each of the delays a circle is drawn to indicate the cases in which the current value $G_i$ is equal to the $G_i$*, which is emerging from the delay. Description of the time diagram would merely be repetitious of the self-explanatory relationships set out in the diagram, and has been omitted for brevity.

As with the stacking systems previously mentioned, feeding systems may be arranged to use a control word containing the binary serial number of the record which is inserted at the front end of each record. The control word may also contain an appended status bit for additional control purposes. Common control circuits may then sample in turn the control words appearing at the inputs to each of the different stages. From each sample, a switching decision may be made in the common control circuits and the resultant commands can then be transferred to gating apparatus to control the flow of the records.

*Queuing system*

The previously described stacking and feeding systems can be combined, with relatively few additional circuits, to form what may be termed a "Class A queuing memory." A queuing memory accepts records intermittently and feeds them upon demand on a first-in, first-out basis. The ideal queuing memory would satisfy a record demand substantially immediately, if records were contained within the memory. With a Class A queuing memory the maximum output rate is equal to the maximum input rate. The queuing system described below has both its input and output rates equal to the flow rate in the delay devices with which it is employed.

In FIG. 11, a four stage Class A queuing memory 310 is connected between an intermittent record source 311 and an intermittent requesting station 312. The records arriving from the record source 311 are entered and retained in the queuing memory 310 until a request is made by the requesting station 312. At such time as a request is made, the records stored in the queuing memory 310 are substantially immediately available to the requesting station 312 in the order of their receipt.

The queuing memory 310 is roughly equally divided between stacking system and feeding system parts, with appropriate cross-connections between the two parts. The stacking portion of the memory comprises three stacking stages arranged in series; each of these stacking stages includes an appropriate delay device $D_1$, $D_2$ or $D_3$, and associated gating circuitry, $G_1$, $G_2$ or $G_3$ respectively. As was previously explained in connection with the stacking system, the delay $D_1$ has a total delay interval equal to one record interval whereas the succeeding delays $D_2$ and $D_3$ have delay intervals of two record intervals and four record intervals respectively, each delay interval being twice the delay interval of the previous stage.

The respective gating circuits operate as described above, to either bypass the respective delay or to feed a record into that delay, and alternatively feed records to a cross-connecting path. Conceptually, the delay $M_4$ and its associated gating circuitry $G_{40}$ serve both as the last stage of the stacking system and the first stage of the feeding system. In the four stage queuing memory herein described, the delay $M_4$ has a total delay interval equal to eight record intervals and the gating circuitry $G_{40}$ is capable of causing bypass, delay or recirculation of the records. Combining the stacking and the feeding operations into one stage not only reduces the number of components needed but also does away with the need for cross-connections between the stacking and feeding system stages which are replaced.

The remaining stages at the feeding system side of the memory are composed of the delays $M_3$, $M_2$, and $M_1$ with their associated gating circuitry $G_{30}$, $G_{20}$, and $G_{10}$ respectively, each of these gating circuits being capable of performing the aforementioned bypass, delay, and recirculation functions in addition to receiving records fed through the cross-connections from the corresponding stages in the stacking system portion. When the memory is relatively empty the lower cross-connections are used to avoid the routing of the records through the longer delays.

The four stage system shown in FIG. 12 has an effective storage capacity of fifteen records; a system with $n$ stages will have a storage capacity equal to $2^n-1$ records.

An initial appreciation of the operation of such a queuing memory structure can be gained by reference to the record flow diagram of FIG. 12, which is consistent in its organization with the previous record flow or time diagrams presented. The columns are identified and the numbers used therein are the same as in the previous diagrams. Thus, the lines of the diagram give the status of the system at the beginning of different record intervals. A number of consecutive record intervals are shown, with Column C giving the cycle count. A number in Column A represents the arrival of a record with that serial number. A number in Column $D_1$ indicates that the corresponding record is stored in $D_1$; and similarly, the Columns $D_2$, $D_3$, $M_4$, $M_3$, $M_2$ and $M_1$ describe the contents of the corresponding delays. A number in Column B indicates a demand made for the record with that serial number.

As will be seen from inspection of FIG. 12, the delays $D_1$, $D_2$ and $D_3$ within the stacking system half of the memory make it possible to store records in delays $M_1$, $M_2$, $M_3$ and $M_4$ in an efficient, systematic manner. Whenever a demand is made the requested record is substantially immediately available, so that the memory system accomplishes the basic objective of satisfying demands promptly on the first-in and the first-out basis. A brief review of the switching rules for the stacking and feeding systems (which were developed previously) as applied to a queuing system is convenient here. A serial number R is associated with each record. This number, as well as the others which follow, may be represented in binary form, that is, by separate binary digits, such as, $R_1$, $R_2$, $R_3$ and $R_4$, each representing a binary digit. The number of the last record demanded is represented by B, the cycle count by C, and the number of the last record arriving is given by A. In representing any of these numbers in binary form, the binary count repeats itself after reaching a sufficiently large value, this value being in principle equal to twice the record capacity of the longest delay, in this case sixteen. Most of the logical equations and circuits herein included will be based upon a minimum number of counter stages, but one exception (to be later discussed) is made to simplify certain portions of the logic.

The basic switching functions which are developed in the control circuitry are the function E (equal to $A-C$), F (equal to $R-B$), G (equal to $C-B$) and $H_i$ (equal to the logical equation $G_iG_i^*+\overline{G}_i^*\overline{G}_i^*$, where $G_i$ is the current value of the function, and $G_i^*$ represents the value of $G_i$ stored in a delay with a record).

On the stacking side of the system, a record appearing at the input terminal to one of the stacking stages would be routed to the next succeeding stacking stage if the binary bit $E_i$ corresponding to that stage were zero or would be routed into the delay $D_i$ if $E_i$ were one. In accordance with this stacking procedure, a record $R_a$ arriving at the point $P_i$ satisfies the condition:

$$R_a-C=2^iE_{i+1}+2^{i+1}E_{i+2}+\ldots+2^{n-1}E_n \quad (8)$$

On the feeding side of the system, a record appearing at the point $Q_i$ is routed to the stage $Q_{i-1}$ if $G_i$ is zero or to $M_i$ if $G_i$ is one. This rule is based on the fact that F is less than $2^{i-1}$ if, and only if, $G_i$ is zero. In recirculating records on the feeding side of the system, a record emitted from $M_i$ is routed into $M_i$ if $H_i$ is zero, or to $Q_{i-1}$ if $H_i$ is one.

A record $R_b$ appearing at $Q_i$ will satisfy the condition given by the equation:

$$R_b-B=F_1+2F_2+\ldots+2^{i-1}F_i$$
$$=G_1+2G_2+\ldots+2^{i-1}G_i \quad (9)$$

On reference to Equations 7 and 8 it may be seen that:

$$R_a-R_b=2^i(E_{i+1}+G_{i+1})+\ldots+2^{n-1}(E^n+G^n) \quad (10)$$

All the numbers obtained from the above equations should be positive integers less than $2^n$. If a subtraction gives a negative number, $2^n$ should be added to give a positive number. Similarly, if an addition gives a number greater than $2^n$, subtraction of $2^n$ is implied. In the case of the four stage memory, $2^n$ equals $2^4$, which is 16.

When a record is to be routed by the cross-connection from the stacking side of the system to the feeding side ($P_i$ to $Q_i$) it is obvious that $R_a$ will be equal to $R_b$. Therefore, this cross-connection can only be made if $R_a-R_b$ is equal to zero. From the previous Equation 10, this condition for a cross-connection can be represented by the equation:

$$2^i(E_{i+1}+G_{i+1})+2^{i+1}(E_{i+2}+G_{i+2}) + \ldots +2^{n-1}(E_n+G_n)=0 \quad (11)$$

The terms of this equation (each embodying the stacking function term E and the feeding function term G) relate only to the stages of both the stacking and feeding system which are above the cross-connection. Thus, when the above equation is equal to zero, the stages above the cross-connection will be empty and the record may be promptly entered into one of the feeding stages below the point of cross-connection.

Now let a new switching variable Y be defined by the logical equation:

$$Y_{j-1}=(E_j\overline{G}_j+\overline{E}_jG_j)Y_j \quad (12)$$

where $Y_n$ would always be equal to one. Note that the term in parentheses of this equation describes an exclusive OR function applied to the E and G terms of Equation 11. Using the new switching function Y, it may be seen that Equation 11 is satisfied if:

$$E_{i+1}G_{i+1}Y_{i+1}=1 \quad (13)$$

This equation requires that $E_{i+1}$ and $G_{i+1}$ both be equal to one, and because of Equation 12 $E_{i+2}$ or $G_{i+2}$ must be exclusively equal to one, and so on, so that the binary one carried from the first binary term will propagate through all the rest of the terms, turning all of the digits of the sum to zero.

Equation 12 is used as the criterion for routing the record through the cross-connection from all points $P_i$ except the point $P_{n-1}$ ($P_3$ in the case of the four stage memory of FIG. 11), but other conditions will satisfy the Equation 12. For example, if $E_{i+1}$ and $G_{i+1}$ are zero and $E_{i+2}$, $G_{i+2}$ and $Y_{i+2}$ are one, the Equation 12 will be satisfied even though the Equation 14 is not. However, where the conditions for a cross-connection from $P_{i+1}$ to $Q_{i+1}$ are satisfied, $P_i$ will be connected to $P_{i+1}$ ($E_{i+1}$ equals zero), and $Q_{i+1}$ is connected to $Q_i$ ($G_{i+1}$ equals zero) so that $P_i$ is connected to $Q_i$ through $P_{i+1}$ and $Q_{i+1}$. Similar conditions obtain for other special combinations, an extreme case occurring when $E_i$ and $G_i$ are zero for all values of *i*. A cross-connection is allowable from all $P_i$, but any one cross-connection is sufficient. In this last instance, the cross-connection is made from $P_{n-1}$ to $Q_{n-1}$. For that status of E and G, the system is empty, and the record traveling from the source 311 to the requesting station 312 without a delay will pass through all of the points $P_0$, $P_1$, . . ., $Q_2$, $Q_1$ and $Q_0$. Thus it may be seen that any valid cross-connection will be sufficient to satisfy all need for cross-connections.

For the point $P_{n-1}$, the Equation 12 for cross-connection reduces to:

$$2^{n-1}(E_n+G_n)=0 \quad (14)$$

This equation is satisfied and the connection may thus be made to $Q_{n-1}$ when $E_n$ and $G_n$ are both zero or both one (remembering that $2^n$ may be subtracted without invalidating the equation). A criterion for routing a record from $P_{n-1}$ to $M_n$ must also be established. A record $R_b$ entering at $M_n$ must satisfy the condition:

$$R_b-B=F_1+2F_2+ \ldots 2^{n-2}F_{n-1}+2^{n+1} =G_1+2G_2+ \ldots +2^{n-2}G_{n+1}+2^{n-1} \quad (15)$$

A record $R_a$ at $P_{n-1}$ must satisfy the condition:

$$R_a-C=2^{n-1}E_n+2^nE_{n+1} \quad (16)$$

Therefore, it may be seen that an additional counter stage $E_{n+1}$ is necessary because the total storage of all the delays in both the stacking and the feeding side of the queuing system is greater than $2^n$. This stage was not required for the previous decisions because the delay $M_n$ was not involved and the storage capacity was therefore less than $2^n$. Also it will be necessary to add another stage to the counter for G, thus giving the equation:

$$C-B=G_n+2G_2+ \ldots +2^nG_{n+1} \quad (17)$$

By combining the Equations 15, 16 and 17 we see that:

$$R_a-R_b=2^{n-1}(E_n+G_{n-1})+2^n(E_{n+1}+G_{n+1}) \quad (18)$$

This shows that a connection should be made from $P_{n-1}$ to $M_n$ if $R_a$ is equal to $R_b$ at these two points. The connection should therefore be made if the following logical equation is satisfied:

$$(E_n\overline{G}_n+\overline{E}_nG_n)(E_{n+1}G_{n+1}+\overline{E}_{n+1}+\overline{G}_{n+1})=1 \quad (19)$$

In the Equation 18, $2^{n+1}$ may be subtracted from the sum if the value of the right-hand side is greater than or equal to $2^{n+1}$, for example, when $E_{n+1}$ and $G_{n+1}$ are both equal to one.

A necessary qualification is that $Y_0$ is equal to one only when:

$$E+G=1+2+4+ \ldots +2^{n-1}=2^n-1 \quad (20)$$

It should be apparent that:

$$E+G=A-B \quad (21)$$

Therefore, $Y_0$ is one only when the system is full to its effective capacity.

It will now be helpful to summarize the switching rules in the form of logical equations, which may be related to the logical circuitry hereafter presented. For the purposes of these equations, the input term for the delay $D_i$ is represented by the symbol $D_i$ and the output therefrom is represented by $D_i^*$. Similarly, $M_i$ represents the input term for the delay $M_i$ and the output term is represented by $M_i^*$. For all values of *i* except *n*, that is, all stages but the last, the following logical equations will apply:

$$P_i=\overline{E}_iP_{i-1}+D_i^* \quad (22)$$

$$D_i=E_iP_{i-1} \quad (23)$$

$$Y_{i-1}=(E_i\overline{G}_i+\overline{E}_iG_i)Y_i \quad (24)$$

$$Q_{i-1}=\overline{G}_iQ_i+H_iM_i^*+E_iG_iY_iP_{i-1}+C_s \quad (25)$$

$$M_i=G_iQ_i+\overline{H}_i\overline{C}_sM_i^* \quad (26)$$

Now Equations 22 and 23 are the basic equations of the binary stacking system. The Equation 24 is simply a repetition of Equation 12. Except for its third term, which is based on the Equation 13, Equation 25 is a basic equation for a binary feeding system. With Equation 26 is represented the other basic equation for the binary feeding system. Each of the variables $E_i$, $G_i$ and $H_i$ is generated in the same way as it was in the stacking and feeding systems previously described.

The basic switching rules for stage *n*, the last stage, may be summarized by the following equations:

$$Y_{n-1}=E_n\overline{G}_n+\overline{E}_nG_n \quad (27)$$

$$Q_{n-1}=(E_nG_n+\overline{E}_n\overline{G}_n)P_{n-1}+H_nM_n^*+C_s \quad (28)$$

$$M_n=(E_n\overline{G}_n+\overline{E}_nG_n)(E_{n+1}G_{n+1}+\overline{E}_{n+1}\overline{G}_{n+1}) P_{n-1}+\overline{H}_n\overline{C}_sM_n^*+G_nC_s \quad (29)$$

Equation 27 is obtained directly from the Equation 12 when considering that $Y_n$ equals one. The first term of the Equation 28 is obtained from Equation 14, and the last two terms correspond to the switching rules for the other stages. The first term of Equation 29 is based upon Equation 19, the second term on the Equation 26, and the third term provides for the storage of the current value of $G_n$.

Figure 13:
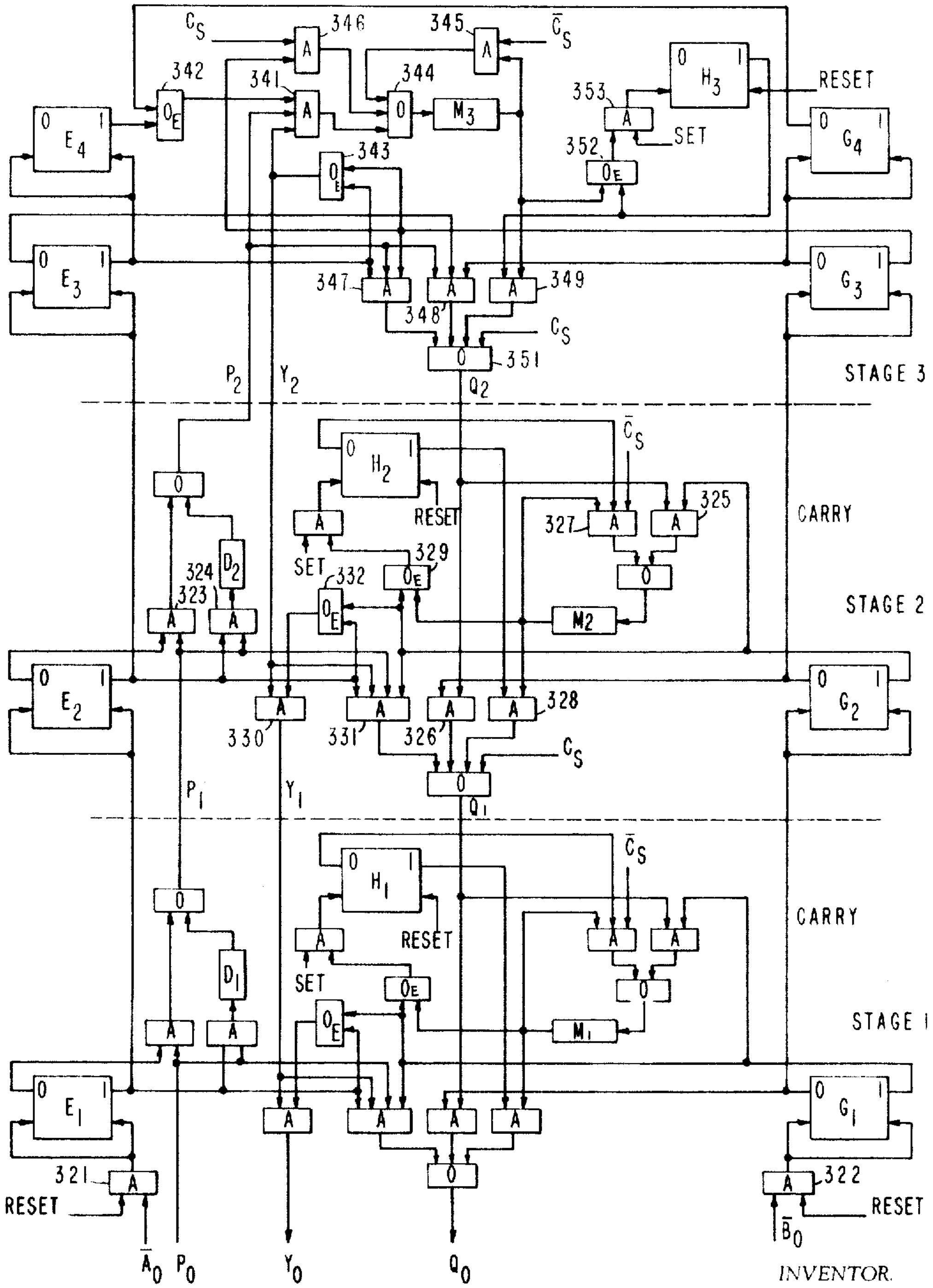
FIG. 13 is a logical circuit illustration of a portion of a queuing memory system according to the invention.

A complete three stage queuing system is shown in FIG. 13 which exemplifies the logical analysis presented above. The three stage system illustrates the manner of realizing the logical analysis in a system of moderate scope which provides all the essential elements of much larger queuing systems of the Class A type. For brevity, the timing circuits producing the set and reset pulses and the $C_s$ and $\overline{C}_s$ pulses have been omitted; the set pulse source and the sector pulse source have previously been described in connection with FIG. 9 and need not be repeated. The stages are separated by dashed lines and the various inter-stage points $P_1$, $Q_2$ etc. are indicated for convenience.

The arrival of a record from the record source 311 (FIG. 11) is indicated when $A_0$ is equal to one; and a demand by the requesting station 312 is indicated when $B_0$ is equal to one. The quantities $\overline{A}_0$ and $\overline{B}_0$ thus indicate (in common logical notation) the commencement of a record interval when no record is being received or demanded respectively from the queuing memory. An arriving record enters the queuing memory system at point $P_0$ and a demanded record leaves the system at the point $Q_0$.

The bistable circuits $E_1$, $E_2$, $E_3$ and $E_4$ are connected to form a reverse binary counter (as described in connection with the stacking system of FIG. 3), and the retained count is reduced by a binary one by each reset pulse delivered through an AND gate 321, this occurring at the beginning of each record interval in which $A_0$ is zero. The bistable circuits $G_1$, $G_2$ $G_3$ and $G_4$ are also connected to form a binary counter (as explained in connection with the feeding system of FIG. 9) and the count therein is increased by a binary one for each reset pulse delivered through an AND gate 322 when $B_0$ is zero. Thus, the counter on the stacking side of the system counts down one for each record interval in which a record is not received from the source 311; and the counter on the feeding side of the system counts up one for each record interval in which no record is demanded by the requesting station 312.

The second stage of the queuing memory structure may be reviewed in detail with the understanding that the principles discussed generally apply both to the first stage and any additional stages used in a larger queuing memory structure. Besides the "borrow" and "carry" lines interconnecting the stages of the two binary counters E and G, there are three principal interconnections between the stages which are labeled as P, Y, and Q. In particular, the point $P_1$ indicates the transfer point of records from the first stage of the queuing memory into the second stage, and the point $P_2$ is the transfer point for records from the second stage to the third stage. $Q_2$ indicates the point at which records contained in the third stage are transferred into the second stage from the third stage on the feeding side of the system, and the point $Q_1$ indicates a point in the transfer of the records in the second stage to the first stage. The transfer points $Q_1$ and $Q_2$ also form part of the cross-connection path between the points $P_1$ and $P_2$ respectively. The line $Y_2$ transfers the switching value generated in the third stage into the second stage for control of logical circuitry. Values generated in the second stage are transferred by the line $Y_1$ to the first stage.

A record appearing at the stacking transfer point $P_1$ is routed either through a bypass AND gate 323 or through a delay AND gate 324 depending upon the state of the bistable circuit $E_2$ of the counter. The record is thus transferred from $P_1$ to the point $P_2$ either with or without passing through the delay $D_2$ to the second stage. The stacking function of this second stage can thus be seen to be essentially identical to that employed in the stacking system of FIG. 3.

Likewise a record appearing at the point $Q_2$ is fed through either a delay AND gate 325 or a bypass AND gate 326 to the point $Q_1$ leading to the first stage. These two gates are controlled by the state of the bistable circuit $G_2$. Now a record emerging from the feeder delay $M_2$ of the second stage will either be routed back into the input of the delay $M_2$ through an AND gate 327 or routed forward to the point $Q_1$ through an AND gate 328. These AND gates 327 and 328 are separately enabled by the bistable circuit $H_2$ zero and one output signals, respectively. An exclusive OR gate 329 makes the comparison between the current value of $G_2$ and the attached value $G_2$*, which is necessary to properly control the value of $H_2$ at the commencement of each record interval.

The cross-connection functions have not previously been described in conjunction with the stacking or the feeding systems. Note that a record appearing at the point $P_1$ can also be routed through a cross-connection AND gate 331 to the point $Q_1$. The AND gate 331 will only be open to a record appearing at the point $P_1$ when both the bistable circuits $E_2$ and $G_2$ of the second stage are in their one states and also a binary one indication is being obtained on the line $Y_2$. This is in accordance with the Equation 13, which establishes the conditions for the cross-connections. Now a one output on the line $Y_2$ is also used to enable an AND gate 330, the other inputs to the AND gate 330 being obtained through an exclusive OR gate 332 from the one outputs of the $G_2$ and the $E_2$ bistable circuits. Therefore, the output appearing at the point $Y_1$ is in accordance with requirements of the Equation 12 for generating the Y function. The organization of the elements within the second stage is readily extended to the first stage of the queuing memory structure.

The third stage of the queuing memory structure is comparable in many respects to the preceding stages but contains certain additional circuitry. A delay AND gate 341 of the third stage is activated by coincident output signals from an exclusive OR gate 342 and from an exclusive OR gate 343. The exclusive OR gate 342 has its input terminals connected to the one output of the bistable circuit $E_4$ and the zero output of the bistable circuit $G_4$, this corresponding to the second term of the logical Equation 19. The exclusive OR gate 343, on the other hand, receives input signals from the bistable circuits $E_3$ and $G_3$ in their one conditions, the output therefrom corresponding to the first term of the Equation 19. Thus, the delay AND gate 341 is enabled when output signals are obtained from both exclusive OR gates 342 and 343, and the signal is passed through an input OR gate 344 into the delay $M_3$. The output signal of the exclusive OR gate 343 defines the switching function $Y_2$, which is delivered to the AND gates 331 and 330 of the second stage.

A recirculation AND gate 345 receives its enabling input from the zero output of the bistable circuit $H_3$ and is effective when enabled to pass the data portion of the record interval ($\overline{C}_S$) being emitted from the delay device $M_3$ back to the input thereof through the OR gate 344. This recirculating function corresponds to the second term of the logical Equation 29, which in part employs logical Equation 19 as its first term. The third term of this Equation 29 corresponds to the logic of an AND gate 346, which receives an enabling input signal from the one output condition of the $G_3$ bistable circuit to be enabled to pass a sector pulse $C_s$, this pulse being inserted at the beginning of a record interval to indicate the value of $G_3$.

Three AND gates 347, 348 and 349 are arranged to deliver records through a connecting OR gate 351 to the point $Q_2$ into the second stage. The bypass AND gate 347 is enabled by the concurrent one condition of both bistable circuits $E_3$ and $G_3$; the cross-connection AND gate 348 is enabled by the zero condition of the same two bistable circuits $E_3$ and $G_3$. These two AND gates are effective to pass a record appearing at point $P_2$ directly to the point $Q_2$ without receiving a delay in $M_3$, this corresponding to the first term of the logical Equation 28.

The third AND gate 349 passes a record from the output terminal of the delay device $M_3$ to the point $Q_2$ when the bistable circuit $H_3$ is in its one condition, this corresponding to the second term of the Equation 28. In addition to receiving output signals from the three AND gates 347, 348 and 349, the OR gate 351 also conducts a sector pulse $C_s$ at the beginning of each record interval into the second stage where it will either be blocked or passed by the AND gate 325 to indicate the current value of $G_2$ to be attached to a record at that point.

The bistable circuit $H_3$ is controlled, as before, by using a reset pulse at the beginning of each record interval to place it in its one condition, which can later be changed by a set pulse if the current value of $G_3$ and the recorded value $G_3^*$ are unlike. This comparison of $G_3$ and $G_3^*$ is made in an exclusive OR gate 352; and, if found unlike, a set pulse is delivered through an AND gate 353 to place $H_3$ in its zero condition. This is similar to the handling of the $H_1$ switching function in each of the other stages.

The three-stage queuing memory system illustrated in FIG. 13 is somewhat restricted in application because of the small storage capacity of the system; however, this three-stage system is a practical system which contains all the essential elements of a more complex system and may easily be expanded to a larger number of stages. The Class A queuing memory structure of FIG. 13 is a combination of the type of binary stacking system of FIG. 3 and the feeding system of FIG. 9, further embodying cross-connections and the additional logic required therefor. Those skilled in the art will also appreciate that a Class A queuing memory system may readily be provided which is based upon a combination of the binary stacking system of FIG. 5 and the related type of feeding system, with one set of control logic to serve both the stacking and the feeding stages. In this instance no cross-connections would be required, because there is sufficient information in the attached control word to allow every record to go through all stages without ambiguity at the decision points. Also, other logic systems will suggest themselves from the foregoing description, but the system described in connection with FIG. 13 appears to approach the least complex construction for queuing memory systems based on binary combinations of delays. This system allows additional stages to be inserted with comparative ease to meet the demands of any practical operation.

*Multiple channel Class A queuing memory*

Certain data communication systems, such as those employing multiplexing techniques, will require many queuing channels of slower speed. The single channel Class A queuing memories, as heretofore discussed, provide the basic techniques for extending the use of the queuing memory to multichannel communication systems.

Figure 14:
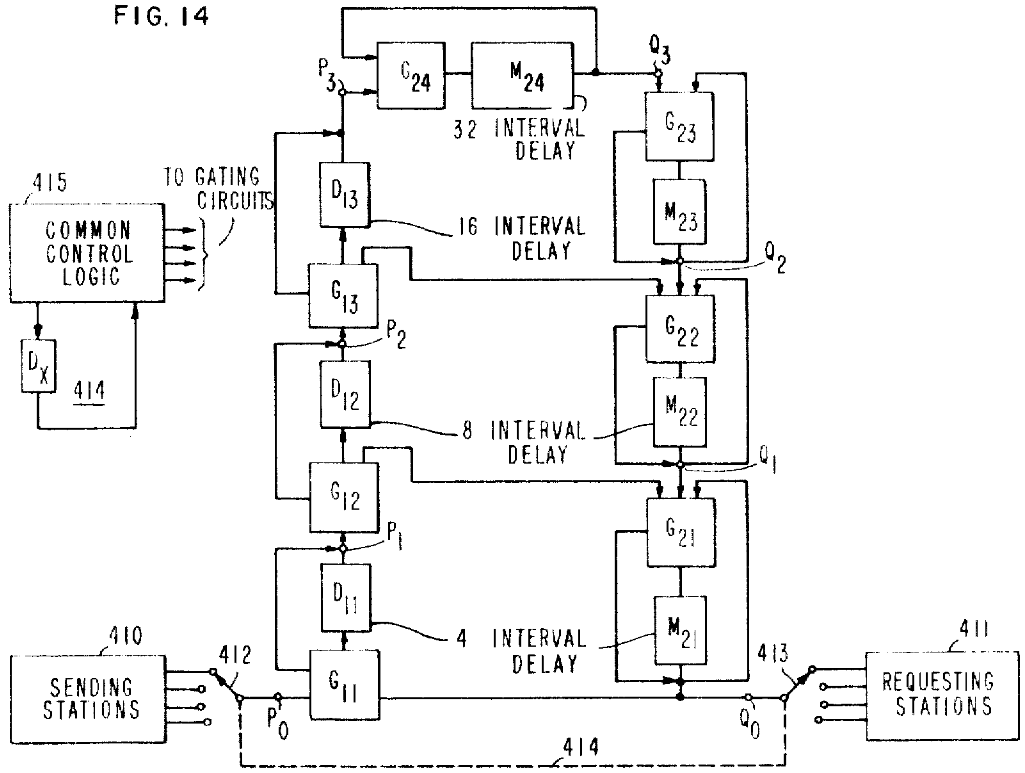
FIG. 14 illustrates a multi-channel queuing memory structure using common control logic.

In FIG. 14, a single queing memory structure is shown connected between a multichannel sending station 410 and a multichannel requesting station 411. The sending station 410 has a selection switch 412 for connecting each of the four sending channels in turn to the input of the queuing memory structure. The requesting station 411 likewise has four receiving channels which are sequentially connected by another selection switch 413 to the output terminal of the queuing memory structure. The selection switches 412 and 413 are shown connected with a mechanical connection 414 to produce a common multiplexing arrangement, in which one of the channels of the sending station 410 will be connected in turn through its associated selection switch 412 to a selected one of the channels of the requesting station 411 through its selection switch 413 during the period of one record interval. During the next record interval the selection switch 412 will be moved to the next channel of the sending station 410 as the selection switch 413 moves to the next channel of the requesting station 411. This is a simplified illustration of a multiplexing arrangement and will suffice for the purposes of explaining this invention since the particular form of the multiplexing circuitry forms no part of this invention. Thus, between sending station 410 and the requesting station 411 a four channel multiplexing arrangement is provided.

Each of the delays $D_{11}$ and $D_{12}$, $D_{13}$, $M_{24}$, $M_{23}$, $M_{22}$ and $M_{21}$ each employ total delay intervals four times longer than the delay intervals which were employed in the single channel queuing memory described above. This arrangement allows the smallest delays $D_{11}$ and $M_{21}$, to each store one record from each of the four channels of the multiplexing arrangement. All of the delays are thus shared by the channels of the multiplexing system on a time-division basis. During the first record interval, only records from the first channel may enter or leave the delays; whereas, during the second record interval, records are serviced for the second channel, and so on for all the channels. The total time required to service each of the four multiplexing channels may be called a queuing cycle, and in this case, one queuing cycle is equal to four record intervals. As before, a cycle count (C) is used to identify the record intervals, this cycle count being repeated for each record interval during a single queuing cycle, such that it is always equal to the number of the channel being served.

At the beginning of each record interval, it is necessary to have the switching variables E and G for the corresponding channel available for making switching decisions. Because the switching variables E and G for each of the channels are independent of the other channels, a separate count of these variables for each channel must be maintained. Rather than having a pair of counters for each separate channel, which would be most inconvenient in the case of large numbers of channels, the values of E and G for all of the channels are stored in a single recirculating loop 414, which has a total delay length equal to the total delay length of the first delay $D_{11}$. The values of E and G for a particular channel are synchronized with the cycle count of that channel so that these variables are available as that particular channel is being serviced. To illustrate, as a record from channel one appears at the output terminal of the first delay device $D_{11}$, the information contained in the switching variables E and G for the first channel is retained within a common control logic circuit 415 which is operative to deliver appropriate gating signals to each of the gating devices within the queuing memory structure. The remaining E and G switching variables for the other three channels are at this time contained within the delay device $d_x$. On the next cycle the second channel is to be serviced, and the variables E and G for the first cycle have been recirculated into the input of the delay $d_x$, while the switching variables E and G for the second channel have been emitted from the output of $d_x$ into the common control logic 415 to deliver appropriate control signals for this second channel to each of the gates in the queuing memory structure.

Obviously any given channel can accept only one record and furnish only one record during an entire queuing cycle. Thus the maximum input-output rate for each of the channels is only equal to the flow rate of the delays divided by the number of channels. Therefore, an arriving record must be stored within the sending station 410 unitl the cycle count corresponding to the required channel is reached. It will be assumed for the purposes of this illustration that the arriving records have already been synchronized so that records arriving for a channel *j* always arrive during the correct record cycle *j*.

Figure 15:
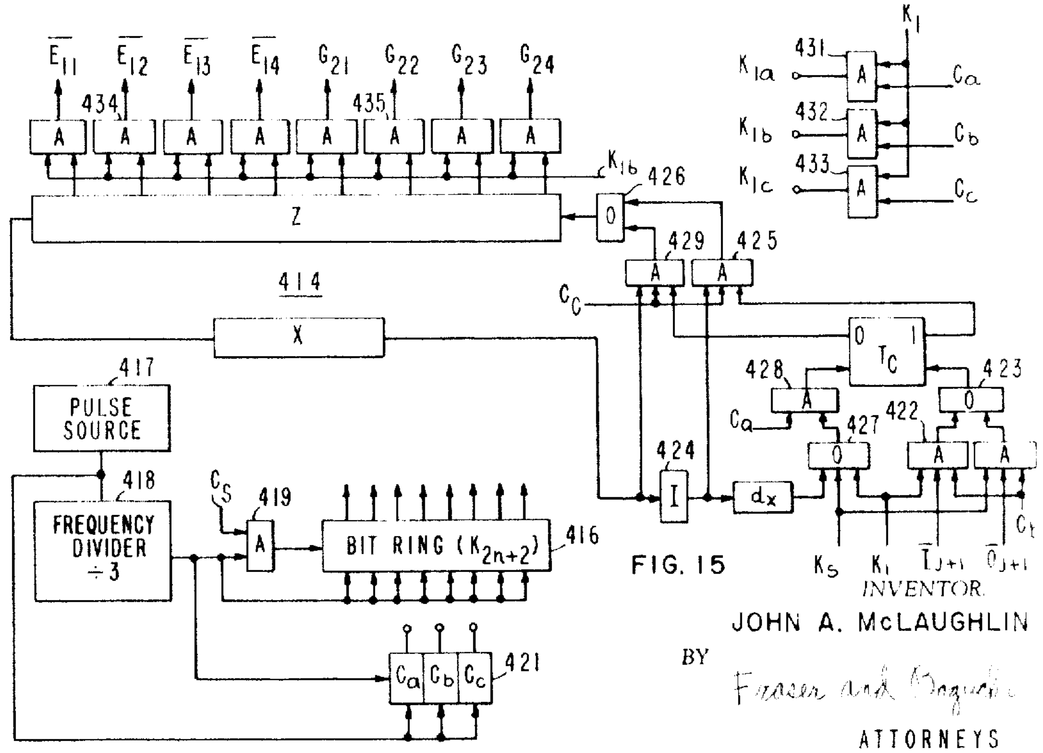
FIG. 15 is a logical circuit diagram of the common control logical circuitry employed in the multichannel queuing memory system of FIG. 14.

FIG. 15 illustrates a recirculating loop 414 in detail along with certain timing circuits which are used in the operation of the recirculation loop 414 and the common control logic 415. Essentially, the recirculating loop 414 consists of a large delay X (which is three record intervals long), a short delay Z with various intermediate taps thereon (which is only a single record interval long), and a count modifying circuit for changing the control counts contained in the recirculating loop 414. The values of E and G are maintained for each channel according to the previously stated principles. The count G is carried within the recirculating loop 414 in its standard form (the count being increased by one for each queuing cycle in which a record is not demanded from that channel); but the switching variable E is carried in complemented form $\overline{E}$ so that both of the variables can be modified by the same circuitry, as explained below. This stacking function variable E should be decreased by one for each queuing cycle in which a record is not received from the sending station 410 over that particular channel. By carrying the value of the variable E in its complemented form $\overline{E}$, the value of the complement $\overline{E}$ may be increased by one during each such queuing cycle thus having the same effect as a count decrease of one from the uncomplemented value of the switching function E.

A circulating control word (containing both the complemented E function and the G function) passes through the count modifying circuitry to the input of the tapped delay Z. When the control word has reached the proper position in the delay Z (so that the appropriate binary bits thereof are adjacent the correct taps), the value of each of the binary bits is then read out to the appropriate gating circuitry within the queuing memory structure.

Timing the occurrence of various operations in the circuitry is accomplished essentially by a bit ring 416, having a separate stage for each binary bit contained in an entire record interval. To simplify this illustration, it is assumed that each record interval has a length of $2n+2$ bit periods, where $n$ is the number of stages in the queuing system. Each switching variable E and G will have a control word equal to $n+1$ bits, thus leaving no unused space in the recirculating loop. The bit intervals, as well as the corresponding stages of the bit ring, will be identified by the symbols $K_1$, $K_2$ . . . , and $K_{2n+2}$ ($K_1$ through $K_8$ in the case of the three stage system here under discussion). To obtain the separate bit intervals $K_1$ through $K_8$, a pulse source 417 is provided having a frequency three times the bit rate within the recirculating loop 414. A frequency divider 418 reduces the frequency from the pulse source 417 by a factor of three to exactly the bit rate within the recirculating loop in order to provide shifting pulses for the shift register type bit ring 416. At the beginning of each record interval a sector pulse $C_S$ is delivered through an AND gate 419 to set the first stage $K_1$ of the bit ring 416. The sector pulse is then shifted from one stage to the next stage of the bit ring upon the occurrence of each of the shifting pulses occurring at the bit rate frequency from the frequency divider 418. Also provided for timing purposes is a smaller shift register 421 having only three stages so that any bit interval may be divided into three nonoverlapping intervals identified by the symbols $C_a$, $C_b$ and $C_c$. The three stage shift register 421 receives its initial pulse from the frequency divider 418, this pulse then being shifted from stage to stage by the higher frequency pulses from the pulse source 417. Thus, the bit ring 416 and the small shift register 421 may be used to divide a record interval into separate bits and each of the bits into three separate divisions as will later be explained in detail.

A record emerging from the longer delay X passes through the count modifying circuitry before reaching the shorter delay Z. The modifying circuitry includes a serial counter provided for the purpose of updating the values of E and G before they enter the smaller delay Z. While channel $j$ is being serviced, the switching variables E and G for the channel $j+1$ are being updated and fed into Z. As stated above, the complement $\overline{E}$ of each bit of the E switching function is stored so that the counter will count up for both variables.

At the beginning of each record interval $j$, $I_{j+1}$ is one if a new record will arrive for the channel $j+1$ during the next interval, and $O_{j+1}$ is one if a record will depart during the next interval. During the first bit period $K_1$ of each record interval, a borrow bistable circuit $T_C$ is switched to its one condition if $I_{j+1}$ is zero by a $C_b$ pulse being delivered through an AND gate 422 and then through an OR gate 423. At the same time that the bistable circuit $T_C$ is switched to its one condition, the first complemented bit of the switching variable E is being emitted from the delay device X. This complemented bit is both fed directly to an AND gate 429 and inverted by an inverter circuit 424. The inverted bit is fed to another AND gate 425. With the bistable circuit $T_C$ in its one condition, the AND gate 425 is enabled while the AND gate 429 is disabled; thus upon the occurrence of a $C_c$ pulse, the inverted bit is passed through the AND gate 425 to an OR gate 426 to be stored in the delay Z. Now if the bistable circuit $T_C$ is in its zero condition, this first bit is passed through the other AND gate 429 and stored in the delay Z without change, the AND gate 425 being disabled.

Once the bistable circuit $T_C$ is switched, it will remain in the one condition until a zero bit is emitted from the delay device X, or until the bit period $K_5$. When a zero is emitted from the delay device X it is changed to a one by the inverter 424 and fed through the delay $d_x$ wherein it receives a slight delay equal to approximately one-half of a bit interval; the slightly delayed bit is then fed through an OR gate 427 to the input of an AND gate 428 which is thereby enabled to pass the next $C_a$ pulse to bistable circuit $T_C$ thus setting it to the zero condition. If no zero is emitted from the delay X there is no one signal to enable the AND gate 428 until the occurrence of the $K_5$ bit interval, at which time, the bistable circuit $T_C$ is switched back to zero. When the bistable circuit $T_C$ is zero, bits of the delay device X are stored in the delay device Z without change. By this procedure the stored number $\overline{E}$ (complement of E) can be increased by one.

A similar procedure is carried out during the last half of the record interval for the variable G. In this instance the bistable circuit $T_C$ is switched to one during the $C_b$ interval of the $K_5$ bit interval only when $O_{j+1}$ is zero. $T_C$ remains in the one condition until a zero is emitted from the X delay. When the entire updated values of the E and G switching variables have been modified as necessary and stored in the delay device Z, the activated taps on the Z delay are so located that the individual bits of the two variables may be read out on their appropriate taps during the interval $T_{1b}$.

It is helpful for the purposes of providing gating pulses to the gating circuitry of the queuing memory to break up the first bit interval $K_1$ into its three fractional nonoverlapping intervals $C_a$, $C_b$, $C_c$ so that these fractional bit intervals are readily available. Each of three AND gates 431, 432 and 433 receives the first bit $K_1$ output from the bit ring 416 so as to be enabled during that bit interval. Then each of the AND gates receives in turn one of the outputs from the $C_a$, $C_b$ and $C_c$ stages of the fractional register 421. The $C_a$, $C_b$ and $C_c$ pulses are passed through the respective AND gates to the separate outputs designated $K_{1a}$, $K_{1b}$ and $K_{1c}$.

Figure 16:
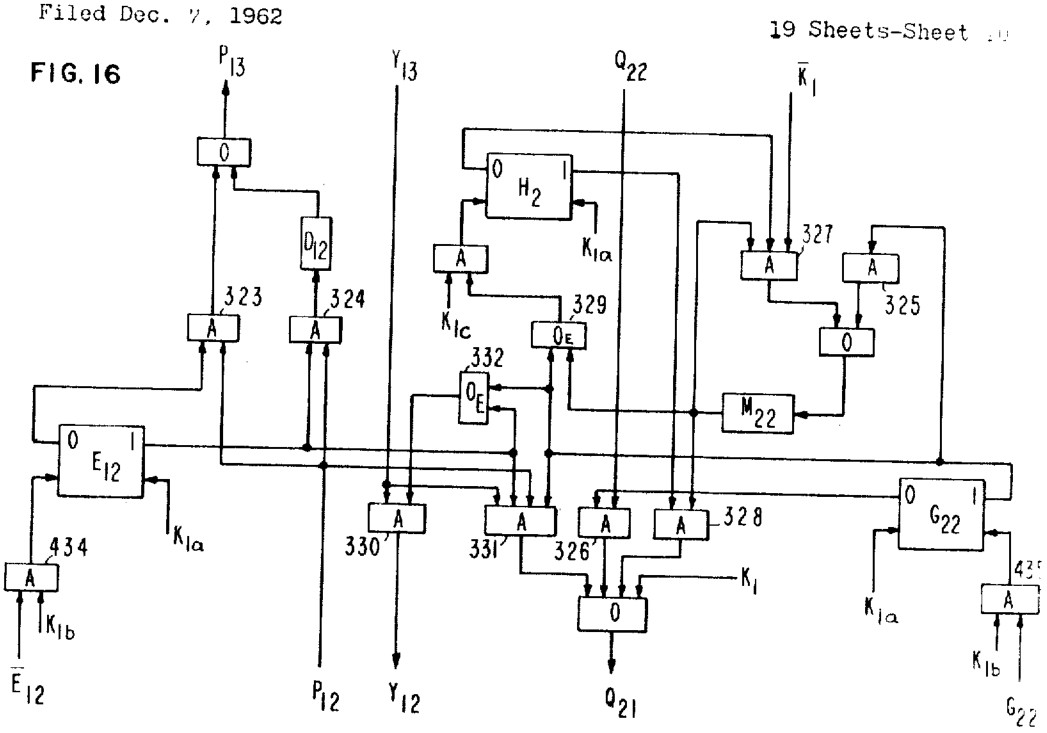
FIG. 16 is a logical circuit diagram illustrating a single stage of a multi-channel queuing memory structure.

FIG. 16 shows the second stage of a three stage multiple channel queuing memory structure. This second stage is exemplary of the other stages contained within the queuing memory, and it will be appreciated that the gating elements contained therein operate in exactly the same manner as those described in conjunction with the second stage of the single channel queuing memory of FIG. 13. The delay, bypass, and recirculation functions are similar in every respect to those of FIG. 13. Only those differences arising from multiple channel operation are explained hereinafter. The delays $D_{12}$ and $M_{22}$ employed in the second stage of the multiple channel queuing memory have a total storage capacity equal to eight record intervals rather than the two record interval delay devices employed in the single channel device. At the beginning of each record interval, the control bistable circuits $E_{12}$, $H_2$ and $G_{22}$ are set to their correct states by the output signals from the appropriate taps on the Z delay line. The bistable circuit $E_{12}$ is first set into its one condition by a $K_{1a}$ pulse occurring during the beginning of the first bit interval. During $K_{1b}$, the next portion of the first bit interval, an AND gate 435 is enabled to pass the complement of the second bit $E_{12}$ of the control count E. If this complement is a one, the bistable circuit $E_{12}$ is set to its zero state; and, if the complement is a zero, the bistable circuit $E_{12}$ remains in its one state; thus the bistable circuit $E_{12}$ is made to register the uncomplemented value of $E_{12}$.

The bistable circuit $G_2$ on the other hand, is set to its zero condition by the $K_{1a}$ pulse and then is placed in its one condition during the $K_{1b}$ portion of the interval if the binary bit $G_{22}$ from the tap on the delay line Z delivers a binary one through the AND gate 435 at that time. The settings of the bistable circuits $E_{12}$ and $G_{22}$ are therefore adjusted for each record interval during a queuing cycle according to the current values of the E and G switching functions for the channel being serviced.

The $K_{1a}$ pulses are also used at the beginning of each record interval to set the $H_2$ bistable circuit to its one condition. The results of the comparison of $G_{22}$ and $G_{22}$* in the exclusive OR gate 329 are then passed through an AND gate by a $K_{1c}$ pulse to the zero side of the bistable circuit $H_2$. The timing pulses indicating the first bit interval $K_1$ and the remainder of the record interval $\overline{K}_1$ are used at the output OR gate to $Q_{21}$ and the AND gate 327 respectively in place of the $C_s$ and $\overline{C}_s$ functions employed in the single channel memory of FIG. 13.

It should be noted that in this multiple channel queuing memory the connections between the separate stages of the E and G bistable circuits are not present because each is served independently during each record interval. The modifications required in the second stage to convert from the one channel memory shown in FIG. 13 to the multichannel operation are similar to those required for the other stages. For example, in the last stage (the third stage), the bistable circuits $E_3$ and $G_3$ are reset during the interval $K_{1a}$, and set during interval $K_{1b}$ according to the status bits available from Z for those stages.

In the simplified system described above, each record interval has a length of $2n+2$ bits, giving a record length of $2n+1$ bits (the additional bit in the record interval being required for control). If a longer record length is selected, unused space can be left between the status words in the status loop or in certain cases the recirculation loop can be folded to give the desired storage capacity in a loop shorter than a queuing cycle. If a shorter record length is desired, the flow rate in the status loop must be increased, either by increasing the bit frequency of the single channel or by increasing the number of status loops.

A practical multichannel queuing memory can be visualized by considering a specific example in the context of a communication system. The record length in this practical system might be thirty-five bits (five characters of seven bits each), giving a record interval which is thirty-six bits long. A system of this nature might consist of fourteen separate stages with a flow rate for each of the delays of 500,000 bits per second, and with five hundred system channels. In this case, the maximum input-output rate for each channel is effectively almost 1000 bits per second. The length of the shortest delay is 18,000 bits or thirty-six milliseconds, with the length of the shortest delay being 147,456,000 bits (4,096,000 records or 20,480,000 characters) or approximately two hundred and ninety-five seconds. The effective storage capacity of this practical system is 16,383 records or 81,915 characters in each channel. These parameters for a practical system are reasonably consistent with the characteristics of practical disc type memory structures, for example.

The multi-channel queuing memory can easily be adapted to include both high and low speed channels. Modification of the previously discussed multichannel system to provide a high speed channel from the low speed channel may be accomplished by either of two techniques.

The first of these techniques supposes that a queuing memory has a set of identical low-speed channels from which it is desired to convert the system to a single high-speed channel. For example, the four channel queuing memory system illustrated in FIG. 14 can be converted to a single high speed channel having four times the speed of one of the lower speed channels. In this way, the high speed channels can be simulated by feeding the first record arriving into channel A, the next record into B, the third into C and the fourth into D (channels A, B, C and D representing the four different channels). Thus, the first record will enter channel A, the second will enter channel B, and so on. At the output end, the first record will be demanded from channel A, the next from B, and so on. These rules will apply regardless of the arrival and departure time of the records from the queuing memory structure. It can easily be seen that up to four records can be accepted during each queuing cycle and up to four records delivered, hence making the speed four times faster. Additional storage circuitry and logic circuitry may be used to synchronize the arrivals and departures in the various channels, but will not be discussed herein.

The other method of producing both high and low speed channels is accomplished by splitting the capacity of the system equally between the high and low speeds. For example, in the four channel system, the system may be easily converted to two low speed channels and a single high speed channel having twice the former speed by simply servicing the high speed channel on record intervals A and C and the low speed channels on record intervals B and D. In this arrangement the shorter delays $D_{11}$ and $M_{21}$ which are required by the high speed channels are not used by the low speed channels. This is due to the fact that the lower speed channels are serviced only once each queuing cycle, whereas the high speed channel is serviced twice during the same time. Also, one status storage loop may be maintained for the high speed channel, with a separate recirculating loop twice as long being maintained for the low speed channels. The switching logic for each stage would be identical to the logic for a system with all channels identical.

The basic techniques described above can also be extended to systems with more than two speed ratings and to many other combinations of speed and numbers of channels. In this way, a flexible arrangement can be built to allow selection of the desired combination by programming.

In some operating situations, one channel of the queuing memory may be full while other channels are relatively empty. In such a case, some flexibility of space assignment is desirable if the memory is to be used efficiently. One obvious solution is to build spare queuing channels into the memory, such that, if one channel is filled, a spare channel may be connected in series with the first, to double the capacity of the queuing memory structure for that channel. This series connection may be extended to provide several channels in series for the one queuing memory structure. This procedure would only necessitate the use of a small delay device between the channels to correctly phase the records which overflow into the spare channel.

Another technique is to allow flexible assignment of the space in the longest delay in the queuing memory.

In effect, a busy channel may borrow space from the other queuing channels through proper phasing by delays. Other arrangements to achieve this degree of flexibility, and the specific circuit arrangements by which they may be accomplished in accordance with the invention will suggest themselves to those skilled in the art, but have not been shown here for simplicity.

The queuing memories heretofore discussed have particular application to message exchange systems such as might be employed in teletype data processing systems. A message exchange employing a queuing system is able to accept incoming messages from a number of different sending stations and transfer them to the appropriate receiving stations on a priority basis without having to wait for an open line directly to the receiving station. The messages are transmitted at any time to be stored within the exchange and later the receiving station at such time that a line of the proper priorities to that station becomes available. This results in each incoming message being transferred to the receiving stations with the greatest possible efficiency both as to time utilization and as to relative importance.

A simple example is offered to clarify the operation and explain the essential utility of such a system. Assume that a series of messages is to be received over a first incoming line, and that the first message is to be delivered to a first outgoing line, while the second message is to be delivered to a second outgoing line. Assume now that the second outgoing line is free but that the first outgoing line is already occupied by a long message from some other source. In such a case, it is desirable to receive and store the first message from the first incoming line so that the second message may be allowed to proceed over the second outgoing line without waiting overly long until the first outgoing line becomes free. In another case, a message on a first incoming line might be destined for first, second, and third outgoing lines. Rather than waiting for all three outgoing lines to be free, it is preferable to store the message and transmit it over each line at the time that that line becomes available.

An additional advantage may be seen in the use of the queuing memory structures where the messages are assigned priorites according to the urgency of transmitting these messages to the particular receiving station. Assume that each message is assigned one of three priorities, priority one being of highest urgency, priority two next, and priority three being of least urgency. Now if the message exchange is sufficiently saturated with the incoming messages, a later received priority one message would have to be placed after a lower priority message resulting in the priority one message being blocked until all lower priority messages preceding it have been transmitted to the receiving station. In the past, it was possible to resolve these difficulties by sufficiently sophisticated and very expensive terminal and transmission equipment. By use of the queuing memory structures, however, it will be seen that the difficulties may be resolved at the exchange itself.

*Message exchange systems*

Figure 17:
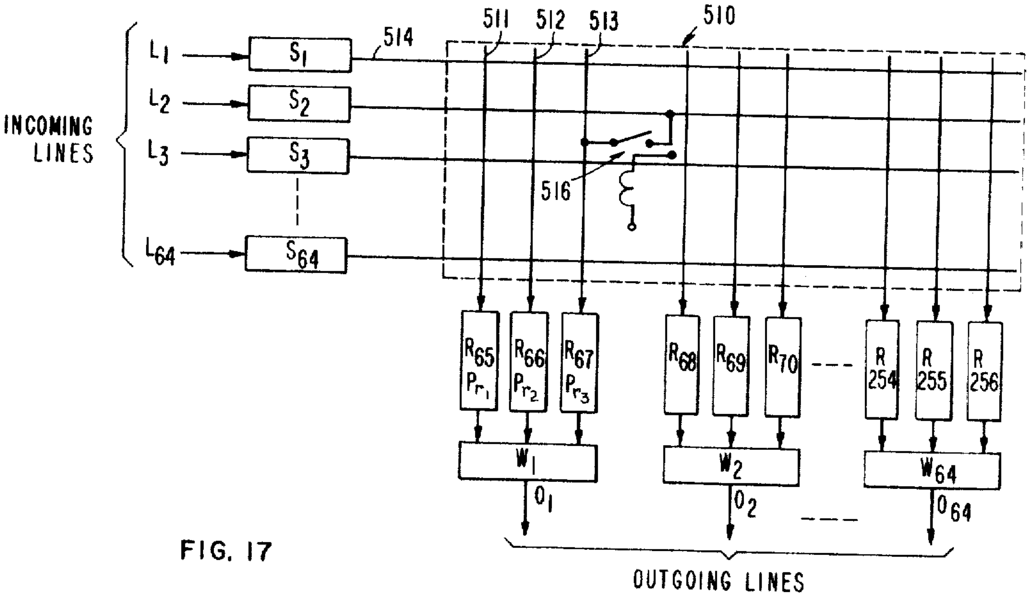
FIG. 17 illustrates a message exchange system employing queuing memory structures for manipulation of signals in the time domain.

FIG. 17 shows the application of queuing memory structures to a space switching type message exchange 510 such as is employed in telephone systems. While the time domain message switching system described below is of wider application, the space switching system provides a good example of the utility of queuing systems.

The space switching system has sixty-four incoming lines ($L_1$ to $L_{64}$) for receiving messages from different remote sending stations (not shown) and transferring them to sixty-four outgoing lines ($O_1$ to $O_{64}$) coupled to separate receiving stations (also not shown). Connected in series with each of the incoming lines is a separate queuing memory structure ($S_1$ through $S_{64}$) for storing the incoming messages in the order of their receipt until an appropriate connection may be made to one of the outgoing transfer lines. The space switching exchange 510 is of the well-known matrix type which can provide selected connections between any of the incoming transfer lines (such as, horizontal line 514) and any of the outgoing transfer lines contained therein (such as vertical line 511). Since these types of message exchanges are well-known, it suffices to state that at each intersection of a horizontal incoming transfer line and a vertical outgoing transfer line there is included a device (e.g., a simple solenoid switch 516) for selectively connecting the two lines so that a message may be transferred from one to the other. Each of the sixty-four outgoing lines is connected through a priority switch ($W_1$ to $W_{64}$) to three of the outgoing transfer lines contained within the message exchange. Each of the outgoing transfer lines (such as, lines 511, 512 and 513) is connected through a separate queuing memory structure, such as $R_{65}$, $R_{66}$, and $R_{67}$, to the input of a priority switch.

As an example, assume that an incoming record on the second incoming line is to be routed to the first outgoing line and has been assigned a priority of three. The record exchange, as in the case of the common telephone system, tests the outgoing transfer line 513 to determine whether that line is already being used to transfer a message from one of the other incoming lines. If the line is busy, the incoming record is stored in the queuing memory structure $S_2$ until the outgoing transfer line 513 becomes available. When the line 513 becomes available, the message exchange 510 closes the switch 516 thereby connecting the output of the queuing memory $S_2$ to the outgoing transfer line 513. The record is then transferred along the line 513 to the input of the associated output queuing memory structure $R_{67}$. If there are other messages of higher priority contained in the other output queuing memory structures $R_{65}$ and $R_{66}$ associated with the priority switch $W_1$, the record is stored in the queuing memory $R_{67}$ until the higher messages have been transmitted through the switch $W_1$ to the first outgoing line. At the time that the queues $R_{65}$ and $R_{66}$ are empty, the queue $R_{67}$ is connected through the switch $W_1$ to the outgoing line, and the record is transmitted therethrough on the next demand from that receiving station (not shown).

Figure 18:
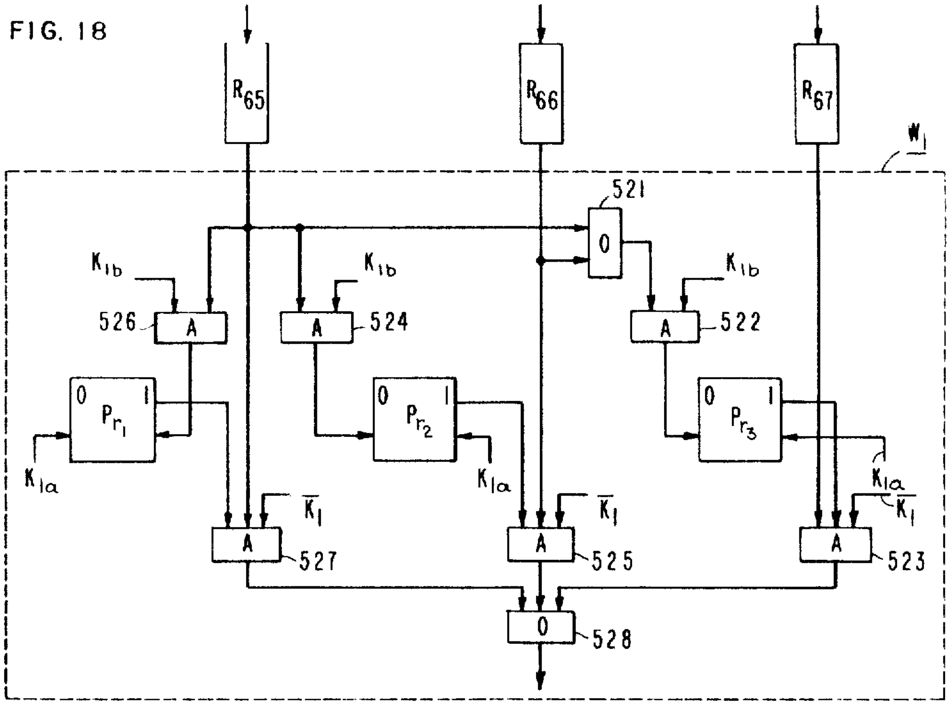
FIG. 18 illustrates logical circuitry employed in the priority switches of FIG. 17.

FIG. 18 illustrates one arrangement of logical circuitry which may be employed in the priority switches $W_1$ through $W_{64}$. It will be understood that any other convenient form of priority switch may be used. The timing pulses $\overline{K}_1$, $K_{1a}$ and $K_{1b}$ used therein can be obtained from a central timing source, such as was illustrated in FIG. 15, associated with the operation of the queuing memory structure. As above, $K_{1a}$ represents the first portion of the first bit interval of a record, $K_{1b}$ the second portion, and $\overline{K}_1$ represents any portion of the record interval past the first bit interval. It will be remembered that the first bit interval of a record contains a pulse to indicate the presence of a record. Each of the bistable circuits $Pr_1$, $Pr_2$ and $Pr_3$ are placed in an initial condition during the $K_{1a}$ pulse time. A pulse appearing during the first bit interval from the output of either $R_{65}$ or $R_{66}$ is transmitted through an OR gate 521 to be passed through AND gate 522 during the interval $K_{1b}$ to switch the bistable circuit $Pr_3$ from its initial "one" condition into its zero condition. Once the bistable circuit $Pr_3$ has been placed in its zero condition, it remains in this condition until the next record interval, thereby disabling the AND gate 523. Thus, when a record appears on either one of the higher priority lines, a demand through the AND gate 523 is not made for a record from the queuing structure $R_{67}$.

A record indicating pulse appearing on the output of the queue $R_{65}$ also passes through an AND gate 524 which concurrently receives an enabling $K_{1b}$ pulse to place the bistable circuit $Pr_2$ in its zero condition, thereby also disabling the AND gate 525. This same record indicating pulse is also delivered through AND gate 526 to place the bistable circuit $Pr_1$ in its one condition ($Pr_1$ having previously been switched by the $K_{1a}$ pulse to its zero condition), thereby enabling an AND gate 527 so as to pass a demanded record from the queue $R_{65}$. The records received at whichever AND gate is enabled will then be passed through an OR gate 528 to the appropriate output line. Thus, it may be seen that records from the queue $R_{67}$ will only be delivered through the priority switch $W_1$ when there are no records within either $R_{65}$ or $R_{66}$; likewise, no record from $R_{66}$ will pass as long as there are records in $R_{65}$.

It should be noted that because demands will always be made upon the priority one queue first this queue need not be as long as the priority two queue. Similarly, the priority two queue need not be as long as the priority three queue. If demands are made constantly on the outgoing lines, a queuing memory structure need not be provided for the priority one line because the records will be demanded therefrom at any time that a record is present if the output rate is equal to both the input rate and the flow rate within the queuing memory structure. However, the exemplification shown in FIGS. 17 and 18 (which includes a queue for priority one) assumes that demands from the outgoing lines will be intermittent in character.

The basic functions of message exchange systems can advantageously be performed on a time domain basis. Systems of this type may use a multichannel queuing memory of the type previously described in configurations similar to those described in conjunction with FIG. 17. One such example is given in FIG. 19, but it should be recognized that this is merely an illustration provided for ease of reference, and that such systems may be utilized in a wide variety of other contexts and situations as well.

Figure 19:
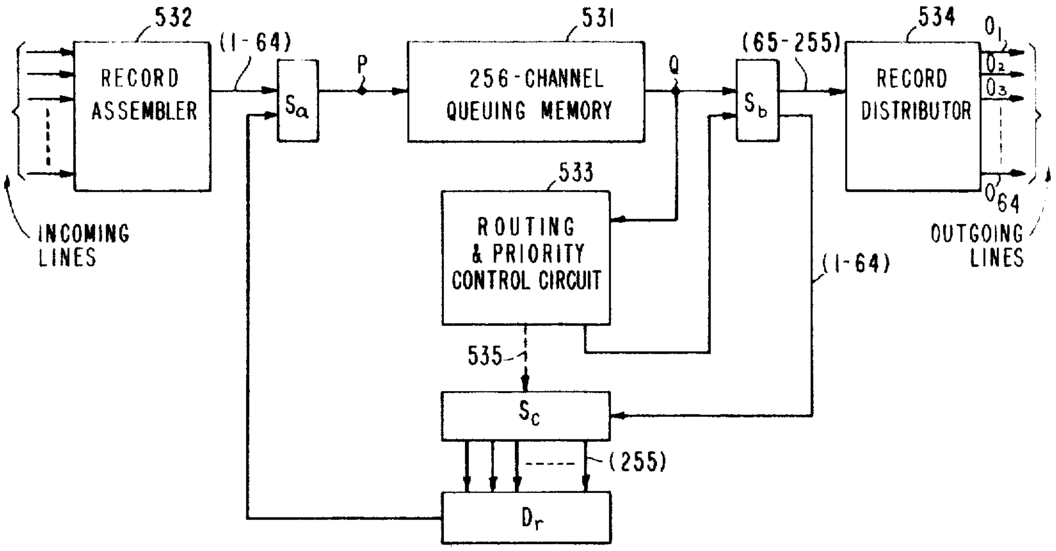
FIG. 19 is a block diagram illustration of a message exchange system employing time switching.

In FIG. 19, the main element of the message exchange system for transferring incoming messages between sixty-four incoming lines ($L_1$ to $L_{64}$) and sixty-four outgoing lines ($O_1$ to $O_{64}$) on a three priority basis is a two hundred fifty-six channel queuing memory structure 531. Each of the incoming records is placed by a record assembler 432 into a corresponding one of the first sixty-four channels of the queuing memory 531; for example, a record arriving on the line $L_2$ will originally be placed in the second channel. The record assembly 532 is simply a multiplexing device, such as is well-known in the art, for registering the incoming message on each of the different lines, and later reading them out one at a time in turn onto the single output line during the time reserved therefor. It should be understood that any other convenient method of assembling the incoming records into proper order may be employed.

The serially arranged records from the record assembler 532 are next inserted through a switch $S_a$ into the first sixty-four channels of the queuing memory 531. This switch $S_a$ is connected to the record assembler input point P only during the first sixty-four record intervals of a queuing cycle, following which the switch $S_a$ is connected to the output of a selective delay $D_r$ for the remainder of the queuing cycles. After passing through the queuing memory in their respective channels, the records appear at the output point Q. At this point Q a routing and priority control circuit 533 is provided to sample the routing and priority information (called the "heading") contained at the beginning of each message in the channels 1 to 64. The messages contained in the input queuing channels are then transferred through an output switch $S_b$ to a delay line switch $S_c$ and the tapped delay line $D_r$, where each message is transferred to its appropriate output channel as will be explained.

The elements employed herein are common in the art and are shown in block diagram form for purposes of simplicity. Their functions, however, will be explained in somewhat greater detail. The switch $S_b$ is simply a time switch which is effective to couple the output terminal of the queuing memory 531 first to the input of the delay switch $S_c$ during the first sixty-four record intervals of the queuing cycle, and then to a record distributor 534 for the remaining record intervals of the queuing cycle. The delay $D_r$ has two hundred and fifty-five coupled taps, each spaced a single record interval apart in time, with the taps being connected through the delay switch $S_c$. From a sample taken at the routing and priority control circuit 533, a record contained in an input channel is transferred through the appropriate tap by the switch $S_c$ to delay the record sufficiently to be placed in the proper output channel. For example, if a record is to be transferred from the input channel 3 to the output channel 68, the record must be given a delay of sixty-five record intervals by the delay $D_r$. Thus, during record interval 3, the output of the gueuing memory 531 is connected through the switch $S_b$ and the switch $S_c$ to the tap 65 of the delay $D_r$. The record then appears at the switch $S_a$ sixty-five record intervals later and enters the output queuing channel 68. Many such transfers can be made during each queuing cycle with no interference occurring in the delay $D_r$ unless an attempt is made to place two records into the same queuing channel during one queuing cycle. This possibility must be prevented by maintaining a list of busy output queuing channels on the input side and making connections through the switches with due regard to the list. This function can easily be carried out by appropriate circuitry contained within the routing and priority control circuit 533.

The routing and control circuit 533 which is used in conjunction with the delay switch $S_c$ to transfer data from input to output channels may take either of two convenient forms. When a message contained in one of the input channels arrives at the output point Q of the queuing memory 531, the heading is sampled by the routing and priority control circuit 533 to determine its destination. The results of the sample may then be used directly (dashed line 535) to control the selection of a tap connection in the delay switch $S_c$ or an appropriate control word may be attached to the beginning of the message through the switch $S_b$ to later be sampled within the switch $S_c$ to determine the proper connection. Both of these methods of message routing are well-known in the data processing art and will not be discussed in detail herein. In both methods the sample used for control is directly related to the difference between the number of the input channel and the number of the desired output channel.

After a record has been placed in the appropriate output channel, it is then passed through the switch $S_b$ to the record distributor 534 and ultimately to one of the outgoing lines $O_1$ to $O_{64}$ when demands for records are received from these lines. The record distributor 534 is essentially a de-multiplexing switch which connects each of the outgoing lines in turn to the output of the switch $S_b$. In accordance with the priority requirements of the system, the record distributor only connects that one of the three channels coupled to each outgoing line having records of the highest priority; thus, for example, the channels 65, 66 and 67 are all connected by the record distributor 534 to the outgoing line $O_1$, but only the channel with the highest priority is connected during any queuing cycle so long as there are records contained therein. Therefore, the priority one channel (such as 65) is connected to the outgoing line $O_1$ if a record is contained therein, and the channels 66 and 67 are not connected in their turn until records do not appear in the channel 65.

In a practical message exchange system, the message will usually be longer than a single record interval, thus requiring many queuing cycles to transfer a complete message. The operation of the time-switching message exchange system in this situation is best explained by way of example. Suppose that a priority two message arrives on the incoming line $L_1$ and is destined for the outgoing line $O_2$. The incoming message (being longer than a single record interval) requires several queuing cycles before it is totally transferred into channel 1 of the queuing memory. When the message has been assembled in the queuing memory, and all prior messages in channel 1 have been transferred out of that channel, the heading of the message is then located at the output position and is transferred to the routing and priority control circuit 533. There it is determined that the message should be transferred to the output channel 69 (priority 2, line $O_2$). Now if the input to the channel 69 is not busy, the control word established by the control circuit 533 causes the record to be transferred from channel 1 to channel 69 during a number of succeeding queuing cycles, until the end of the message is reached. At such time as all prior messages in channel 69 have been transmitted to the outgoing lines, the status of the priority one (channel 68) channel is determined. If channel 68 is empty, the record distributor routes the separate records comprising the message, one on each queuing cycle, from channel 69 to the outgoing line $O_2$ until the entire message has been transmitted. The operation of the record distributor 534 in transmitting a message covering more than a single record interval requires that the system sense the beginning and end of a complete message so that later occurring higher priority messages routed to the same outgoing line will not interrupt. This is accomplished either by attaching a control word at the beginning of a message signifying its length or by attaching control words at both ends of a message so that the outgoing lines are held coupled to a particular priority for the duration of the entire message.

The time domain operated message exchange of FIG. 19 employs a delay structure two hundred and fifty-six record cycles long with two hundred and fifty-five equally spaced taps for transferring records between input channels and output channels. The technique employed therein is conceptually simple, but a long delay with multiple taps is relatively expensive. Therefore, FIGS. 20 and 21 provide two alternative methods of transferring between input and output channels which utilize much shorter delay structures with correspondingly fewer taps.

In FIG. 20, the first alternative transfer delay system employs a static delay B which is one-quarter of a queuing cycle long (sixty-four secord cycles). The records in the input channels 1 to 64 are fed through a first switch $S_b$ into the delay B during the first portion of the queuing cycle long (sixty-four record cycles). The records in the ords obtained from the input channel are circulated from the output of the delay B through the switch S back to the input. Thus, the switch S is a simple time switch connected first to receive records from the input channels for the first quarter of a queuing cycle and then to recirculate the records in the delay B three full times before the end of the queuing cycle. The output of the delay B is also connected to the input of a tap selection switch $S_e$. The selection switch $S_e$ selectively connects signals at its input terminal to one of the sixty-four taps on a sixty-four cycle delay $D_y$. The correct delay may be given to a particular record in an input channel by having the selection switch $S_e$ coupled to a given tap during any predetermined recirculation of the records in the delay B. For example, if a delay of 133 record intervals is desired, the tap 5 will be connected through $S_e$ on the second recirculation ($64+64+5=133$). Thus the transfer operation is carried out with a tapped delay line only one-fourth as long as that required by the system of FIG. 19.

FIG. 21 shows a circuit using a further extension of the features employed in the arrangement of FIG. 20 to lessen the length of the tapped delay line which is required. In FIG. 21, four delays $B_1$, $B_2$, $B_3$ and $B_4$, of only sixteen record intervals long, are connected in sequence to the input channels so that records in channels 1–16 are circulated with $B_1$, records from channels 17–32 are circulated in $B_2$, and so on. Each of the records to be transferred is available every sixteen record intervals when recirculated through their respective switches $S_1$, $S_2$, $S_3$, and $S_4$. Thus, the tap delay $D_z$ need only be sixteen record intervals long. In this case, however, the outputs of each of the delays $B_1$ to $B_4$ are connected to a selection switch $S_f$, which is a four-by-sixteen cross-point array which allows each of the four delay outputs to be connected to any one of the taps on the delay $D_z$. This cross-point array switch $S_f$ is operated in the same manner as the multiple tap switches employed in the preceding exemplifications except that there are four inputs to each tap instead of a single input.

In systems in which the record is short, it is economical to use a magnetic core memory for the channel-to-channel transfers. For example, consider a core memory with one hundred ninety-two addresses (channels 65–256) with space for one record at each address. If a record is to be transferred from channel 3 to channel 182, the record is stored in 182 of the core memory during record interval 3. All records which are to be transferred during a queuing cycle are stored in a similar manner during the record intervals 1–64. During the remainder of the record intervals, each storage location is examined in sequence, address 65 during cycle 65 of the queuing cycle, and so on. If a record is found in the location being examined, the record is then stored in the queuing memory in its correct output channel.

By using message exchange systems operating on a time domain basis, the messages may be switched between input and output lines without using the complicated and bulky space switching systems formerly employed. The only additional elements needed for the time domain switching are the tap delay lines placed in series with the multichannel queuing memory system. Furthermore, in such a system, separate queuing memory structures need not be provided for each input and each output line. All input and output channels are contained within the single multi-channel queuing memory structure thus greatly reducing the number of separate elements required. Since each channel utilizes the same elements for the queuing and switching functions, the necessity for calibrating and matching large numbers of different elements is thereby avoided. A high degree of system compatibility can be gained by using the same type of delay device both for the multichannel queuing memory structure and the tap delay line; such an arrangement would militate against the occurrence of harmful switching transients such as might be caused by relay elements in a space switching message exchange.

*Delay devices*

The main storage elements within the queuing memories, stacking systems and feeding systems are the delay devices. The various delay devices now available in the art are preferably restricted in use to the particular applications for which they are individually best suited.

Electromagnetic delay lines are generally most advantageously used to provide storage and delay for about 1–25 bits of binary information. These electromagnetic delay lines include lumped constant and distributed constant lines and are generally useful in time domain systems where the frequencies encountered are one megacycle per second or higher. In this application, the distributed constant delay lines are generally most economical.

Magnetostrictive delay lines have general application in time domain systems for storing and delaying approximately 25–5000 bits of information. Present magnetostrictive delay lines are both economical and especially useful in handling binary type pulse information. As with the electromagnetic delay line, the magnetostrictive delay operates in real time and may easily be adapted to different delay requirements.

A particularly advantageous means of providing the longer delays needed for the more versatile time domain systems involves the use of magnetic recording tracks. The most common, and possibly the most economical, magnetic track delay device is the cyclic medium or revolver, in which the delay is equal to the time required for the magnetic surface to carry a recorded bit from a "write" head to a "read" head spaced some distance away along the path of the magnetic surface. Although revolvers may be less expensive than comparable magnetostrictive delay lines, the principal operative limitation herein encountered is upon the minimum length, which can only be of the order of 100–200 bits because of the mechanical and electrical limitations on the minimum spacings between the write head and the read head. The most common form of the revolver employs a rigid recording surface, such as a drum or disc, in preference to the use of a flexible magnetic tape; thus the maximum limitation may be extended, however, through the use of spiral recording tracks instead of circular tracks on the magnetic surface.

In magnetic recording, a rotating record member having a spiral or helical recording track is probably the most economical means for providing a synchronous long delay in a minimum of space. In general the delay may either be constructed to accept new information while emitting old information or may be limited to either accepting new information or emitting and recirculating the information at any one time. A novel system for employing these magnetic surface type recorders as long delays will be presented hereinafter in connection with FIGS. 22 through 27.

In FIG. 22, the magnetic surfaces on three separate discs 610, 611 and 612 are employed for purposes of obtaining relatively long delays. The three discs 610, 611, and 612 are center mounted on a common rotating disc shaft 613 which is turned at a constant speed through a power linkage by a constant speed motor 614. Each of the discs 610, 611, and 612 has a separate magnetic recording head 615, 616 and 617 respectively held in recording position adjacent the surface of the disc by a recording arm attached to a common head shaft 618. The magnetic heads 615, 616 and 617 are each of the read-write type. The common head shaft 618 is coupled through an appropriate mechanical connection 619 and a reciprocating arm movement unit 621 in order to synchronize the movement of the heads with the rotation of the common disc rotating shaft 613.

In operation, the magnetic heads 615, 616 and 617 are so synchronized with the rotation of the discs 610, 611 and 612 that they are simultaneously moved inwardly toward the center of their respective discs by a clockwise rotation of the common shaft 618 in such a way as to trace a spiral path (such as 622) for a given number of revolutions of the discs. When the end of the spiral track has been reached, the reciprocating movement unit 621 reverses the direction of rotation of the common shaft 618 thus moving the recording heads outward from the center of the disc to trace another spiral path 622 in the opposite direction. Each of the magnetic heads 615, 616, and 617 has a pair of electrical connections extending along their respective recording arms to external circuitry, one connection carrying signals to be recorded and the other carrying the signals picked up by the head when in its read mode. The switching of the magnetic heads between the write and read modes is controlled by a three stage timing device 623, which may take any convenient form, preferably either a common shift register or counting chain. The output signals from the stages are shifted from one stage to the next upon each reversal of the direction of the common recording head shaft 618, so that an output is obtained from stage one during the time that the heads move inward on the discs, the output is then shifted to stage two as the heads move back out along the spiral track, and then to stage three as the head again moves in.

The output signal from stage one of the counting devices 623 is used to enable a data input AND gate 624 to deliver data to the magnetic head 615 and is also used to enable a data output gate 625 coupled to receive signals read from the next disc 611 by the recording head 616. The next stage two of the counting device 623 enables an input AND gate 626 to the second recording head 616, and an output AND gate 627 from the third head 617; whereas, the third counting stage enables both an input AND gate 628 to the third recording head 617 and an output AND gate 629 from the first head 615. The incoming data to be delayed is applied to an input terminal of each of the input AND gates 624, 626, and 628 so that, when one of these gates is enabled, the data is fed therethrough to be recorded on the spiral track of the associated disc. The outputs from each of the output AND gates 625, 627, and 629, are connected to an OR gate 631 so that the signals recorded on the associated discs are read out through the enabled AND gate to a common output line.

Assuming that the spiral track contains a total of eight revolutions of the discs, termed a revolution cycle, the delay arrangement of FIG. 22 provides a total delay equal to sixteen disc revolutions or two revolution cycles. This may be seen by reference to FIG. 23, which illustrates the operation of the arrangement during two full counts of the counting device 623. A W contained in the horizontal line opposite $H_1$ indicates that during that period of the count the head 615 will be in the write mode, and an R indicates a read mode. The "In" and "Out" labels above each column indicate the direction of movement of the heads on the disc during that cycle of the revolution. Thus, information written during one revolution cycle is not read from that revolution cycle until two revolution cycles later thereby producing a total delay equal to sixteen revolutions of the discs. Note that an odd number of discs must be used in order for the sequence to move the magnetic head in the same direction during the read mode as it moves in the write mode for the same data. The methods employed herein may be extended to produce greater delay times simply by using larger odd numbers of elements; the total delay will be equal to the total number of elements minus one multiplied by the number of disc revolutions in a revolution cycle.

Where a reduction in the number of disc elements is required, a plurality of recording heads may be mounted upon a single reciprocating shaft 641 so that each separate recording head traces out a separate spiral track on separate concentric areas of the disc, as shown in FIG. 24. The dashed lines contained on the single disc 645 illustrate the separation between the separate areas of the three spiral paths traced by each of the recording heads.

In FIG. 25, a magnetic head drum 651 is shown with four magnetic heads 651–654 placed in recording position. Each of the heads 651–654 traces out a single circular recording track (dashed lines) around the drum while being held rigidly in a fixed position in relation to the periphery of the rotating drum surfaces. The magnetic head may in this case be switched between the write and read modes to produce a total delay which is an odd number of cycles long; it is possible to use this arrangement with an even number of recording heads because the tracks are not spiral and the heads are always moving in the correct direction with relation to the circular path. The use of the circular path to obtain a total delay of an odd number of revolution cycles may be equally extended to the disc type recording mechanism, as would be obvious, and conversely the spiral track may also be used on the drum type mechanism. The single circular track arrangements, however, provide more flexible systems in that the total delay obtainable may be varied by simply changing the number of heads employed in the operation; thus, the range of the obtainable delays may be from a one revolution delay using only a pair of heads up to that obtainable by using all heads associated with the drum or disc. The delay of one revolution is produced by simply using a first head for writing while the second head is reading for a full revolution, then reading with the first head while the second head is writing.

It is obvious that either the spiral track or the circular track techniques may be extended to obtain longer delays, but at some point it might become more economical to move the heads from disc to disc according to a fixed mechanical program (as is well-known in the art) so that more than one disc face can be served by each head. The only ultimate limit on the obtainable delay length is imposed by the maximum number of discs that can be usefully mounted on one rotating shaft. Even here the delays may be further expanded by synchronizing the operation of a plurality of shafts.

If it is not necessary to be able to read out old information from the delay at the same time that new information is being delivered for writing, the number of recording heads and tracks may be reduced by one while retaining the necessary delay. In the arrangement of FIG. 26, a delay of two revolution cycles may be obtained by using only a pair of discs 661 and 662 mounted on a common shaft 663. A pair of recording heads 664 and 665 are arranged by appropriate equipment such as, reciprocating recording arms (not shown here) for tracing a spiral recording track on each of the discs 661 and 662. A four stage timing chain 660 controls the operation of four AND gates 666, 667, 668 and 669. When the timing chain 660 is producing an output from its first stage the AND gate 666 is open so that the incoming data is recorded (see the chart of FIG. 27) by the magnetic head 664 as it moves inward on a spiral track. As the heads 664 and 665 begin to move out, the second stage of the timing chain 660 enables the second AND gate 667 so that more incoming data is recorded by the recording head 665 on an outgoing spiral track on the disc 662. On the third revolution cycle the timing chain is stepped to its third stage and enables the AND gate 668 to read out the previously recorded information from the head 664 on the disc 661. When the timing chain is stepped to its fourth stage, the AND gate 669 is enabled to read out the information recorded on the disc 662 in an outgoing spiral through the magnetic head 665. It is to be noted that the information tracks recorded on the two discs are always in oppositely going spirals.

There are other conceivable configurations employing spiral recording tracks and circular recording tracks upon discs and drum type memory surfaces which may be employed to give the required delays. Various savings in the number of elements can be made by using single magnetic heads which are capable of both reading the old information and writing at the same time. Further simplification can be obtained (if it is not necessary for the delays to be active at all times) by using a single head which spirals inwardly for seven revolutions of a revolution cycle. For very long delays a single head can be provided to move from disc to disc, with the time of transit between discs being relatively small compared with the active time on each disc. The various modifications will be apparent to those skilled in the art. In employing the delay structures herein disclosed within a queuing memory, all such delays should be interrelated and synchronized with each other.

Also in generating a spiral track, it is not essential that the recording arm drive mechanism be linear, but the track must be repeatable in both directions within a close tolerance. In most cases the magnetic head will be used to both read and write and thus erasing must be done by writing over the previously recorded information. In this situation it is seen that the head must follow the track within a close tolerance to avoid subsequent interference from unwanted information previously recorded but unerased. Also it is necessary that the movement of the heads be reversed between the in and the out directions, but this change of direction cannot be instantaneous. This problem is most easily solved by slowing or stopping the radial movement of the head across the disc as it reaches the end of the track and then slowly accelerating to radial movement in the other direction, all to be accomplished within a single disc revolution.

*Non-binary systems*

The previously described time domain manipulation devices including the stacking, feeding and queuing devices were based upon binary combinations of delays, that is, each delay differing from the previous and succeeding delays by a factor of two. In these binary feeding systems, the demand for records could be satisfied at any rate up to the full recording rate. However, non-binary systems based upon similar techniques may be used for time domain manipulations of data. These non-binary systems have a maximum speed rating equal to the recording rate in records per second divided by the quantity K−1, where K is the ratio of the length of a delay divided by the length of the next shorter delay. FIG. 28 illustrates by a record interval time diagram which is similar to those previously used, the operation of a feeding system in which K is equal to four (the delays being 1, 4, and 16 record cycles long). The interpretation of the record interval time diagram is the same as for the previous diagrams and shows that the demands from this feeding system can be satisfied as often as every third record interval.

However, considerable simplification of the logical circuitry required for a non-binary system can be obtained if the speed rating is reduced to a value equal to the recording rate divided by the value K. This simplification of circuitry is possible for two reasons. The first reason is that the flow of records toward the shorter delays can be restricted, thus permitting unambiguous determination of the serial numbers of the records in the delays by simple reference to the cycle count (C) and the next record to be demanded (B). In the previous binary systems, it was necessary to add an additional bit with each record to resolve the ambiguities that occurred at the higher rate of speed. Secondly, it is not necessary with the simplified system to read old information from a delay at the same time that a new record is being entered. However, the need for recirculation in the feeding and queuing structures still exists.

Only the logical circuitry for systems which employ the reduced speed rating will be discussed herein, since for any desired speed rating, it is easier to simply reduce the K for the system than employ the more complicated circuitry. Furthermore, the binary systems previously disclosed herein adequately show the more complicated logical circuitry required for a system operating at its maximum speed rating (since for a binary system, K equals two).

Because it is not necessary to read old information from a delay at the same time that new information is entered, it is more natural in illustrating the non-binary systems to have a recording head serving storage locations in a recording track in sequence instead of using the delay line analogy previously employed in connection with the binary systems.

The time diagram of FIG. 29 illustrates the operation of a non-binary feeding system in terms of a recording head serving storage locations on a magnetic recording medium. Each recording head, $H_1$, $H_2$ and $H_3$ serves its assigned locations in sequence, and the location being served is indicated by a square around a number indicating that location. The recording head in each case is capable of both reading and writing at each location, and the reading is always nondestructive of the information contained in that location. A circle around a number already in the square indicates that information is being written in this position and the number contained therein indicates the original number of the record as determined by its original location in the memory track served by $H_3$. A circle in the column B indicates that a record is demanded from the system.

Figure 30:
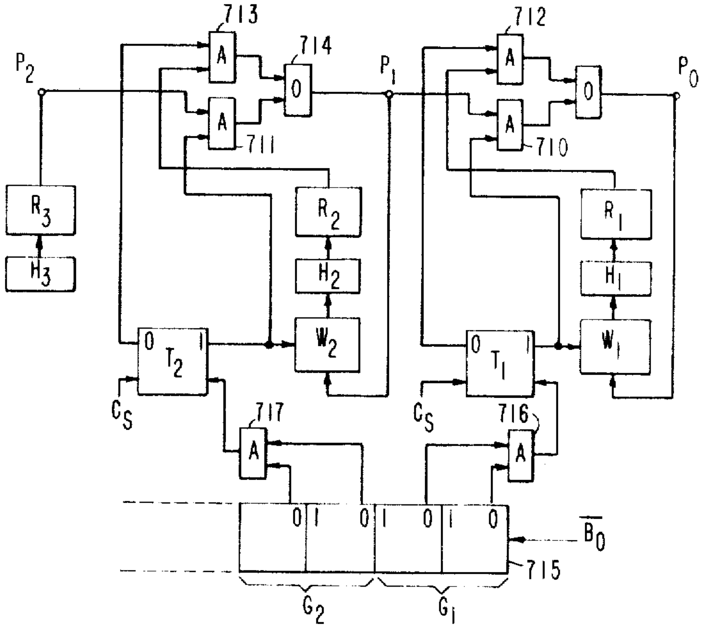
FIG. 30 is a logical circuitry illustration of two stages of a nonbinary feeding system according to the invention.

A more complete understanding of the time diagram of FIG. 29 is gained by a general consideration of the logic employed in this non-binary feeding system, and by further considering the logical circuitry illustrated in FIG. 30.

In FIG. 30, the last two stages of a nonbinary feeding system are illustrated to explain the operation of the non-binary system. The magnetic heads $H_1$ and $H_2$ are coupled between a respective write amplifier ($W_1$ or $W_2$) and a respective read amplifier ($R_1$ or $R_2$). The magnetic heads will operate in the read mode to deliver signals to the read amplifier unless the write amplifier is delivering signals to be recorded to the head. The write amplifiers $W_1$ and $W_2$ are controlled as AND gates in that they are enabled or disabled by external control signals; these external control signals for $W_1$ and $W_2$ are obtained from the one output signals from control bistable circuits $T_1$ and $T_2$ respectively, these one output signals also being employed to enable AND gates 710 and 711 respectively in the two stages so that a record is passed from the output of a preceding stage to the output of that stage. The zero output of each of the bistable circuits $T_1$ and $T_2$ enable AND gates 712 and 713 respectively to route records from the read heads to the output of the stage.

In the second stage, when the control bistable circuit $T_2$ is in the one condition, the AND gate 711 passes the records from the point $P_2$ at the input to the stage through an OR gate 714 to the output point $P_1$ between stages. From the point $P_1$, the record signal is fed in two directions, both to the input of the AND gate 710 in the first stage and to the input of the write amplifier $W_2$ (also enabled by the one condition of $T_2$) to be delivered therethrough to the second stage magnetic head $H_2$ for recording on the recirculating medium. On the other hand, when the bistable circuit $D_2$ is in the zero condition, the records from $P_2$ are blocked and the records from the read amplifier $R_2$ are delivered through AND gate 713 and OR gate 714 to the point $P_1$. In this case, however, the write amplifier $W_2$ is not in the write mode so the record is delivered only to the input of the AND gate 710 of the first stage.

The logical circuitry employed might best be explained by use of logical equations. The operation of any stage may be summarized by considering the equation:

$$P_{i-1}=T_iP_i+\overline{T}_iR_i \qquad (30)$$

where $P_{i-1}$ indicates the arrival of a record at the point at the end of a feeder stage $i$, $P_i$ the arrival of a record at the input of the feeder stage $i$, $R_i$ the occurrence of a record under the head $H_i$ (which will be amplified by the read amplifier $R_i$), and $T_i$ indicates the state of the trigger bistable circuit $T_i$. The state of the bistable circuits is determined by the control number $C-B$, determined as before by adding a count to a serial binary counter 715 when a $\overline{B}_0$ pulse is received (indicating that no record is being demanded during a particular signal cycle). This number may be expressed in multiple digit form having the same radix as the proportion K thus:

$$C-B=G_1+KG_2+K^2G_3\ .\ .\ . \qquad (31)$$

where $G_1$, $G_2$ $G_3$ . . . may have values from zero to three, where K equals four, as here. The control counter 715 is a multistage binary counter having two stages for each digit of the control number. The trigger $T_1$ is switched to the one condition when $G_1$ is zero, and $T_2$ is switched to the one condition when $G_2$ is zero. In the circuitry of FIG. 30, the one outputs from both of the stages which are used to generate the separate digits ($G_1$ or $G_2$) are connected through an AND gate (716 or 717, respectively) to switch their respective bistable circuits ($T_1$ or $T_2$) to their one conditions. Thus, if both stages of the digit are zero, an output will be obtained from the associated AND gate 716 or 717. Beforehand each of the triggers $T_1$ and $T_2$ was set to its zero stage by a sector pulse $C_S$ and these triggers remain in these states unless signals are applied through the respective AND gates 716 and 717. The values of $G_1$ and $G_2$ during a typical operation have been included in the right-hand columns of the record interval diagram of FIG. 29, for purposes of illustration.

It should be noted here that by reducing the speed of the repeater system to the record rate divided by $K+1$ it would be possible even to eliminate the OR gate and the two AND gates in each stage, because it would never be necessary to transfer a record farther than one stage at any time. In this way, $R_{i+1}$ is always fed to $W_i$, and $T_i$ controls the write mode. However, the control of the bistable circuits is slightly more complicated. Note also that binary systems (where K equals two) can also be simplified by the technique described in this section, but the corresponding loss in speed will probably not be acceptable.

Figure 31:
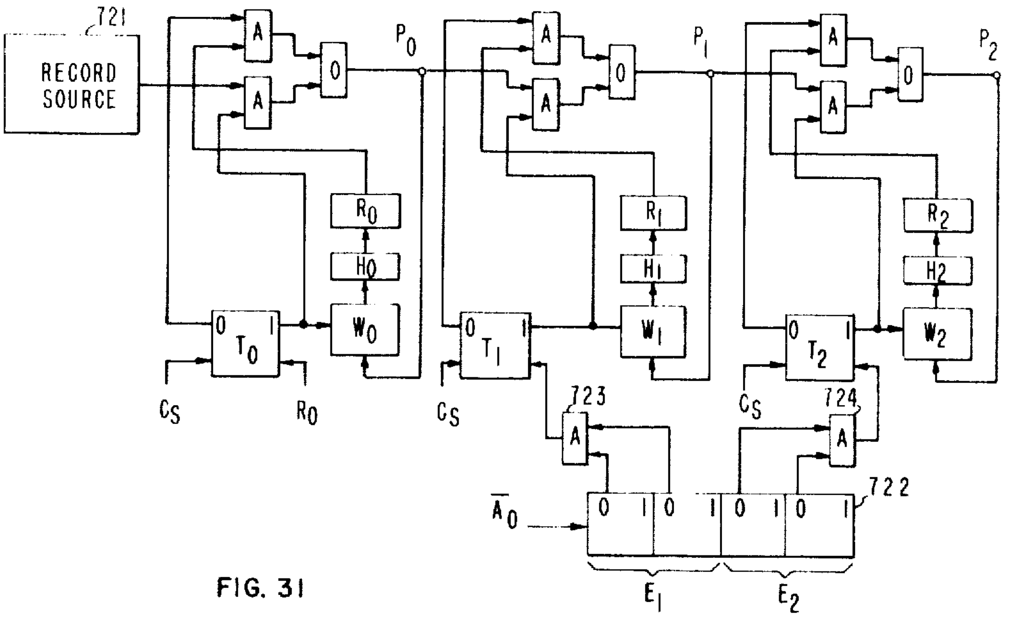
FIG. 31 is a logical circuit diagram illustrating a nonbinary stacking system.

In FIG. 31 is illustrated the first three stages of a nonbinary stacking system. The record handling circuitry controlled by the bistable circuits employed in each of the stages of the stacking system operates in exactly the same manner as the logical circuitry explained in connection with FIG. 30 for the feeding system, and need not again be explained. The first stage arrangement includes a magnetic recording head $H_0$ which produces a delay of a single record interval, whereas the second and third stages produce delays of four intervals and sixteen intervals, respectively. However, the logic employed in switching the control bistable circuits $T_0$, $T_1$ and $T_2$ must necessarily be controlled by the rules applicable to the stacking system. Each of the bistable circuits $T_0$, $T_1$ and $T_2$ is set to its zero condition by a sector pulse $C_s$ at the beginning of each record interval. The first bistable circuit $T_0$ is switched to its one condition whenever a record is being received from record source 721, this being indicated by the pulse $R_0$. Control counter 722 is a reverse binary counter which has a binary one count removed therefrom during each interval that a $\overline{R}_0$ pulse occurs (indicating that a record is not arriving from the record source 721). The binary counter 722 thus maintains the current value of the control quantity given by the equation:

$$A-C=E_1+KE_2 \qquad (32)$$

As before, the counter 722 employs two binary stages per control digit. A zero value registered by the counter for the digit $E_1$ is applied by an AND gate 723 to switch the bistable circuit $T_1$ to its one condition; whereas, a zero value for the digit $E_2$ in the second pair of binary stages in the counter 722 is applied through an AND gate 724 to switch the bistable circuit $T_2$ to its one condition.

Figure 32:
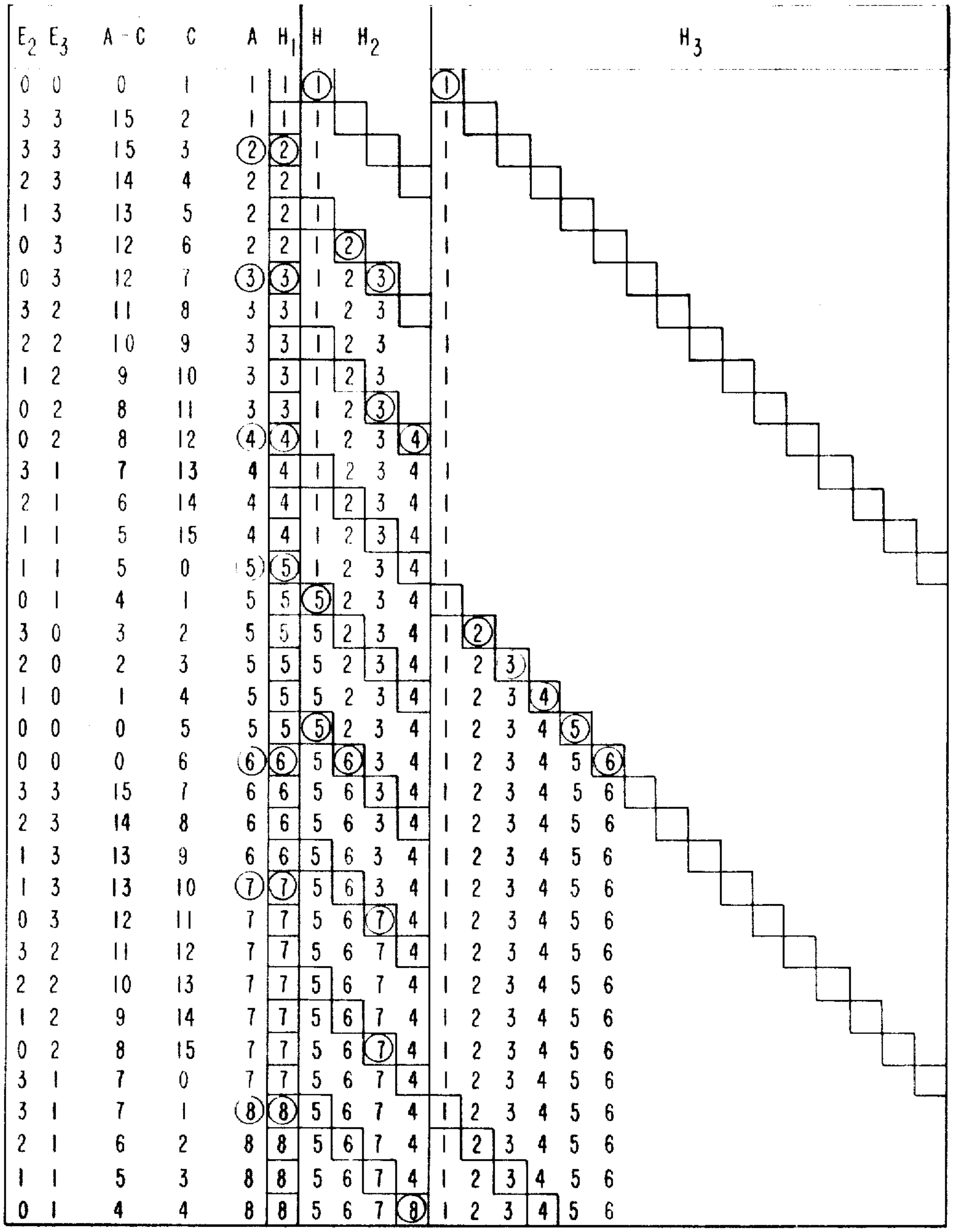
FIG. 32 is a time diagram illustrating the operation of the nonbinary stacking system of FIG. 31.

The operation of the nonbinary stacking system of FIG. 31 is illustrated in a typical sequence of events contained in the record interval diagram of FIG. 32. FIG. 32 shows the current value of $E_1$ and $E_2$ in the two left-hand columns. The interpretation of the record interval diagram is the same as that employed in the interpretation of the diagram of FIG. 29. Thus, circles in column A indicate the arrival of records from a source, the numbers in column A give the serial numbers of the latest record that has arrived, and the circles in the other columns indicate that a record is being written at that point.

In FIG. 33, the feeding system of FIG. 30 and the stacking system of FIG. 31 are combined to form a three stage queuing memory system. In certain cases the elements illustrated in FIG. 33 have been redesignated for the purposes of clarity but the operation of the combined systems in performing the stacking and feeding operations remains essentially the same. The bistable circuits $T_1$ and $T_2$ are controlled by the reverse binary counter 722 according to the principles explained in connection with FIG. 31. The bistable circuits $T_3$ and $T_4$ are controlled by outputs from the forward binary counter 715, as was previously explained in connection with the operation of FIG. 30. Each of the bistable circuits $T_0$ to $T_4$ are set to their zero condition at the beginning of each cycle by a sector pulse $C_s$, as explained above.

However, the control of the bistable circuits is modified from a simple combination on the basis of the number of records in the queuing system in order to prevent undue delay between input and output of a record when the system is relatively empty. An additional counter 731 is provided to maintain a current value of the number of records within the queuing system. The counter 731 may be any type of well-known reversible counter or other arrangement (such as, a pair of counters and a subtraction unit connected to provide a difference output). The reversible counter 731 is originally set to its zero count when the queuing memory structure is empty. Later as the records arrive and depart the count is changed therein accordingly. The count contained within the binary stages is increased by one each time a record is received at the input producing an $A_0$ pulse. The count is decreased by one each time a $B_0$ pulse is delivered thereto indicating that a record has been demanded from the queuing system. When both the $A_0$ and $B_0$ pulses arrive in coincidence during the same record interval the count within the counter 731 remains the same.

The counter 731 consists of a number of bistable counter stages connected in series, the capacity of the counter being at least as large as the total storage capacity of the queuing system. The zero outputs of the first two binary stages (registering the two least significant binary digits) are connected to two of the three input terminals of a single AND gate 732. The remaining stages have their zero outputs connected to the input terminals of another AND gate 733, the output of which is in turn connected to the third input terminal of the AND gate 732. Thus, at any time that the queuing system does not contain a record, the counter 731 registers a zero count in all stages causing the AND gate 732 to produce an output pulse. This pulse is then delivered through respective OR gates (734 and 737) to switch each of the bistable circuits $T_1$ and $T_4$ to the one condition irrespective of the values of $E_1$ and $G_1$. Thus a record appearing at a point $P_0$ or $P_3$ goes directly through the enabled AND gate 738 of each of these stages to the point $P_1$ or $P_4$ without delay.

Additionally, the output from the AND gate 733 is connected through the OR gates 735 and 736 to the bistable circuits $T_2$ and $T_3$. Thus, the bistable circuits $T_2$ and $T_3$ switch to their one conditions at any time that the count within the counter 731 is either zero, one, two or three (that is, all stages beyond the first two are in their zero state). In this manner the incoming records are passed to the later stages of the queuing memory without undue delay when very few records are contained therein. However, if the quantity of stored records (A—B) is larger than three, the control bistable circuits are operated in their normal stacking and feeding fashion by the E and G counters 722 and 715 respectively. FIG. 34 illustrates by means of a record interval time diagram the operation of the queuing memory system of FIG. 33. The squares, as before, indicate the location of the recording head, and a circle indicates the write mode. A study of the record interval time diagram shows the system to be operated in the desired manner.

It should be obvious that by using time multiplexing techniques, the nonbinary queuing memory can be extended to multiple-channel systems in much the same way as the multichannel binary queuing memory heretofore described. Also the system may be easily extended to more stages and to other values of K. The design of the logic for setting the control bistable circuits ($T_i$) is dependent upon the requirements of the system, particularly in regard to record length, number of stages, and the value of K.

The exemplification of the queuing memory shown in FIG. 33 utilizes a number of static binary counters for controlling the switching of the bistable circuits. As the number of stages is increased or the system is adapted to multiple-channel operation, it is in general more economical to use serial logic to generate a control word for switching the triggers.

In FIG. 35, status information containing current values of A, B and C (or combinations of these variables) is circulated through a status delay and a serial control logic circuit 742, the total delay in the recirculation path being equal to a single record interval in the case of single channel operation or a full queuing cycle in the case of multiple-channel operation. This status information is then used by the control logic circuit 742 to generate a control word consisting of a separate bit of information for each bistable circuit $T_i$, once each circulation. The serial control logic circuitry 742 receives the record arrival and demand informttion ($A_0$ and $B_0$) so that the circulating status information can be modified in accordance therewith on each recirculation. The serial control logic circuitry 742 sends the generated control word to a tapped control word delay line 743, each of the taps thereon corresponding to a particular bistable circuit to be controlled. At such time that the control word has reached the point in the delay line 743 that the proper bits aligned with the proper taps, a sector pulse $C_s$ is delivered to a set gate 744 to read out the value of the bits to their respective bistable circuits. These bistable circuits, it will be understood, are reset to their zero states at the end of each record interval. The detailed logical circuitry of the serial control logic element 742 is essentially similar to the arrangement of serial control elements illustrated by FIG. 15, and the modifications necessary for this particular application will be obvious to those skilled in the art. Therefore, these details will not form a portion of this disclosure.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A signal routing circuit for transferring data provided in separate groupings, comprising: a first data station including supply means providing data groupings in a predetermined order; a second data station including demand means for requesting data groupings in said predetermined order but at random times relative to the data groupings which are provided; delay means having a controllably variable delay time and coupling the first data station to the second data station; and control means responsive to provided and requested data groupings for maintaining a continuous computation of the time difference between the times of supply and demand for controlling the delay time of the delay means.

2. A signal routing circuit for transferring digital information signals comprising: a pair of signal stations; delay means connecting said pair of signal stations; one of said stations including supply means for supplying in a predetermined order information signals at first discrete times to said delay means; the other of said stations including demand means for demanding in a predetermined order from said delay means the same information signals supplied by said one station, said demand means demanding said information signals at second discrete times, the first and second discrete times being in the same order but at random times with respect to each other, said delay means having a controllably variable delay time; and control means for maintaining a continuous computation for measuring the time relation of the time of supply and the time of demand for each information signal and for controlling the variable delay time of said delay means in accordance with the measured time relation to provide each information signal supplied by said supply means to said demand means at the time that such information signals are demanded.

3. A routing device for delaying a digital signal between the time of input to the routing device and a time of output, the times of input and output being randomly related comprising: means for maintaining a continuous computation of the difference between time of input and time of output; a plurality of different signal delay devices; and a plurality of gating means for routing a digital signal to bypass selected signal delay devices, said gating means being coupled to said counting means and being controlled in response to the difference between the input and output times, whereby the digital signal is selectively routed through said delay devices to emerge at a time coincident with the output time.

4. A memory system for processing incoming data in the time domain between an input and an output comprising: input means for serially providing data signals at first discrete time intervals; output means for serially demanding said data signals at second discrete time intervals; controllable routing means connected between said input and output means including a plurality of passive delay devices coupled between said input and output means and selectively intercoupled to provide a plurality of separate signal paths; and means for comparing said first discrete time intervals with said second discrete time intervals to maintain a continuous computation of the difference between the time at which said data signals are provided and the time at which said data signals are demanded and for controlling said routing means in accordance with said computation, whereby each of the data signals is available to said output means during said second discrete time intervals in the serial order in which it was provided.

5. A binary data information processing system for manipulating records of equal length between an input terminal receiving the records at random record intervals and a circulating memory with an input station for storing the received records in the order received, comprising: a plurality of passive delay devices connected in series between the input terminal and the circulating memory, each of said plurality of delay devices having a total delay time equal to an integral number of the delay interval of the previous delay device, a plurality of gating circuits, each of said gating circuits being connected to the input of an individual one of said delay devices, said gating circuits having means for selectively routing a record to bypass the respective delay device or introducing a record to the input of said delay device, and logic circuit means for individually controlling each of said gating circuits, said logic circuit means including means for maintaining a continuous computation of the time difference between the sequential position of the next record to be received at said input and the sequential position of the record storage location on the circulating memory at said input station and means for supplying output signals to each of said gating means individually during the arrival of a record thereat, said signals being in accordance with the position of the circulating memory at the time a record is delivered to said input terminal.

6. A stacking system for entering randomly occurring records in continuous serial order of their occurrence through a input means into a circulating memory comprising: a plurality of delay stages connected in series between a receiving terminal of the system and the input means terminal to the circulating memory; each of said stages including an input terminal and an output terminal, a passive delay device and a bypass connection connected in parallel between said input and said output terminals, and gating means responsive to control signals for selectively delivering a record either to said passive delay device or to said bypass connection; comparing means for comparing the instantaneous position of said circulating memory relative to said input means with the time of occurrence of a record at said receiving terminal and for producing output signals indicative of said comparison; the passive delay means in each of said delay stages being an integral number of times longer than the preceding passive delay; said comparison means being coupled selectively to each of the gating means to deliver the signals indicative of said comparison thereto to control said gating means, whereby records randomly received at said receiving terminal are correctly entered into said circulating memory.

7. A digital record handling device for transferring records between a receiving terminal and a circulating memory, said circulating memory having discrete portions thereon for the storage of incoming records in the order of their arrival, comprising: a variable delay device controllable by the external control signals; said delay device including a plurality of passive delays connected in series relation and means responsive to control signals for selectively bypassing any of said delays; each of said delays being equal to an integral number of record intervals and each said delay being unequal to any of the other delays; and control means for comparing the time position of a record at said receiving terminal with the time position of the discrete positions on said circulating memory and for producing control signals indicative of said comparison, whereby the records received are correctly positioned on said circulating memory.

8. A data processing device for receiving randomly occurring records at a receiving terminal and reproducing said records at an output terminal in a continuous series of records arranged in the order of their receipt with the series commencing at a specific desired time, comprising: a plurality of delay stages connected in series between said receiving terminal and said output terminal; each of said delay stages including a single passive delay means and a bypass connection connected in parallel fashion; each of said passive delay means having a total delay interval equal to an integral number of record intervals and each of said delay means having twice the delay interval of the preceding delay means, controllable electronic switch means for selectively delivering a particular record either to said delay means or to said bypass connection; and control circuit means connected to deliver control signals to each of said electronic switches selectively, said control circuit means being responsive to the arrival of a record at said receiving terminal and to the specific desired time for reproducing said continuous series at said output terminal for computing the difference in the number of record intervals between the arrival of a record and the desired time of its reproduction at said output terminal, whereby a continuous series of records arranged in the order of their receipt are produced at the output terminal commencing at said desired time.

9. A digital record handling system for providing an orderly arrangement of randomly occurring records from a source comprising: a circulating memory means having discrete record positions thereon for the recording of incoming records in the order of their receipt; a plurality of delay stages connected in series between said circulating memory and the source of said randomly occurring records, each of said delay stages containing a passive delay and a bypass line connected in parallel relation and a controllable switch means for selectively delivering a record either to said bypass connection or into said passive delay; each of said passive delays having a total delay interval equal to twice the delay interval in integral record intervals of the preceding delay device; a single recording station operatively associated with the circulating memory for recording said records thereon; a reverse counting means for registering a binary count therein, the binary count in said reverse counter being reduced by a binary one each time that one of said discrete record positions is adjacent said record station when no record is being received from said source; and means coupled to said binary counter and each of said switch means for selectively controlling said switch means in accordance with the binary count registered, whereby the records are recorded in an orderly fashion in said circulating memory.

10. The digital record handling system of claim 9 in which the passive delay of each of said delay stages is equal to an integral number of record intervals and each passive delay has twice the delay interval of the previous passive delay; and wherein said reverse counting means is a binary counter composed of a plurality of separate stages for registering a binary count therein and producing an output indicative thereof, each of said separate stages having the output thereof coupled to a respective controllable switch means for selectively controlling said switch means in accordance with said binary count.

11. A record handling system for providing an orderly arrangement of randomly occurring records of equal length provided from a source comprising a circulating memory means having discrete record positions thereon for the recording of incoming records in the order of their receipt; a plurality of delay stages connected in series between said circulating memory means and the source of randomly occurring records, each of said delay stages containing a passive delay and a bypass line connected in parallel relation and a controllable switch means for selectively delivering a record either to said bypass connection or into said passive delay; a single recording station operatively associated with the circulating memory for recording said records thereon; a recirculating delay loop having a total delay interval equal to one record interval for circulating a control word having a separate digit for each controllable switch means, the total value of said control word being equal to the number of records received by the record handling system and the instantaneous relative position of the recording station and relation to the discrete record positions on said circulating memory means; means connected in the circulating delay loop for modifying the value of the control word on each recirculation by subtracting a binary "one" when no record occurs during a record interval; and tap means connected to the recirculating delay loop to deliver each digit of the control word individually to the controllable switch means of a respective stage in order to control the flow of the record through the stages.

12. In a data processing system wherein information in the form of records of equal length is passed through a series connection of a number of different stages, each of the stages having switching means therein for selectively switching the record to one of a plurality of paths within the stage according to the information contained in a control word, a control system comprising a recirculating delay loop for circulating 'a control word composed of separate binary digits, the interval of recirculation of the recirculation delay loop being equal to one record interval, means for modifying the digits and the control word according to the desired path of a record through the stages, and a sampling means for sampling the value of the control word once each recirculation interval and for delivering the value of the control word to the switching means of the stages for selectively switching the records to one of the plurality of paths within the stage.

13. In a data processing system wherein a plurality of records are contained in separate passive delay stages, said stages being connected in series and having controllable switching means therein, a switching control comprising a recirculating delay means for circulating a control word once each record interval, said recirculating delay means including gate means for modifying the value of the control word, and separate tap means for sampling the control word once each recirculation interval, said tap means being connected to the control switch means of each of the respective passive delay stages in order to control all stages of the system simultaneously with the sample values of said control word.

14. In a data processing system for providing an ordered record output sequence by selective delay from records occurring during random input record intervals at the input, a delay control device comprising: reverse digital counter means for subtracting a single binary count from the binary count contained therein upon the receipt of a pulse; a source of regularly occurring pulses for providing a single pulse during each record interval; a record arrival sensing means for producing a negating signal during each record interval during which a record is received at the input; and gate means for passing said regularly occurring pulses except when disabled by a negating pulse from said record sensing means, the regularly occurring pulses being coupled to the reverse digital counter to reduce the total count contained therein for each pulse received.

15. A data processing system for delivering records from a source in a predetermined sequence to an output station making random demands for such records comprising: a plurality of separate recirculating delay memories arranged in series between said source and said output station; gate means interconnecting said recirculating delay memories for transferring records between said plurality of memories; and logic means coupled to control said gate means and being responsive to the number of records contained in said plurality of memories and each demand from said output station for providing a control signal for producing an orderly flow of the records in the sequence of their delivery from said source to said output station on demand.

16. A binary data information processing system for manipulating records of equal length between an input terminal and an output station demanding the records at random time intervals comprising: a plurality of passive recirculating delay devices connected in series between the input terminal and the output station, each of said plurality of delay devices having a total delay time equal to an integral number of the delay intervals of the previous delay device in the series; a plurality of gating circuits, each of said gating circuits being connected to the input of a respective one of said recirculating delay devices, said gating circuits having means for selectively routing a record to bypass a respective delay device, to be introduced into the recirculating delay device to be recirculated therein; and logic circuit means for individually controlling each of said gating circuits, said logic circuit means producing output signals to each of said gating means individually in accordance with the number and position of the individual records within said plurality of delay devices.

17. A data processing system for transferring records from a source in the serial order of their occurrence to an output station making random demands for such records comprising: a plurality of delay stages connected in series between the source and the output station; each of said stages including an input terminal, an output terminal, a passive delay device, a bypass connection in parallel between said input and said output terminals for passing records without delay from the input to the output terminal, a recirculation connection for passing records from the output terminal back to the input terminal of the passive delay device, and gating means responsive to control signals for selectively delivering a record either from the input terminal or the recirculation connection to said passive delay device or from the input terminal to said bypass connection; and logic means responsive to demands from said output station to maintain a prescribed order of the records within the different circulating memories whereby the random demands from the output station will be satisfied by records in their predetermined serial order.

18. A circuit for providing records to an output upon demand in the order of their reception at the input of the circuit comprising recirculating memory means providing a series of independent record recirculating paths each having a period of recirculation which is an integral number of times longer than another; means for selectively transferring the records between said paths in accordance with their order of reception by the circuit, said means for transferring being responsive to control signals; said memory means coupled to said means for producing said control signals to transfer said records for recording to said output in order of reception.

19. The circuit of claim 18 in which said recirculating memory means provides a number of independent record recirculating paths having periods of recirculation twice the period of recirculation of an adjacent recirculating path in the series.

20. A recirculating memory system to provide records in a predetermined order to an output station making random demands for such records comprising: a series of passive recirculating delay devices, each having a different recirculation period, the recirculating delay device having the smallest recirculating period being connected to the output station, with the other delay devices being connected in series in the ascending order of their recirculation periods; gate means for transferring selected records from one recirculating delay device to another having a smaller recirculation period and for operating in response to a control signal; and means for determining a desired order of the records within the recirculating delay devices in accordance with the prescribed order and the demands made by the output station and for generating control signals based upon such determination, the control signals being coupled to the gate means.

21. A data processing system for making records available in a predetermined order to an output station which demands individual records at random times comprising: a series of recirculating delay devices adapted for connection to said output station, each of said delay devices having a period of recirculation half as long as the preceding delay device, each of said delay devices including a passive delay having an input and an output, gating means responsive to control signals for gating records from a preceding delay device either to bypass the passive delay or to be introduced at the input of the respective passive delay and for delivering records appearing at the output of the respective passive delay either to the next succeeding delay device or back to the input of the respective passive delay; first control logic means responsive to the total number of records contained within the data processing system for developing control signals for selectively delivering the records from a preceding delay device to be bypassed or to be introduced into the input of the respective passive delay; and second control logic means responsive to a control signal of said first logic control means and the emergence of a record at the output of a passive delay device for producing control signals for delivering the records at the output of the passive delay device either to be recirculated or delivered to succeeding recirculating delay devices.

22. The data processing system of claim 21 wherein said first control logic means consists of a series of counter stages connected in serial counter fashion to register a count therein, said count being increased by one during each record interval in which the output station does not demand a record.

23. A recirculating memory system for containing a number of binary data information records for delivery to a demanding station comprising: a plurality of separate recirculating delay means each including a passive delay device having a delay interval twice that of a succeeding delay device, and gate means selectively controlled by binary signals for bypassing said passive delay, for recirculating a record in said passive delay, or for introducing a record from a preceding recirculating delay means into said passive delay; control logic means including a binary counter having a plurality of stages, each of said stages being connected to a corresponding one of said recirculating means to deliver binary control signals to the respective gate means, said binary counter being effective to count each record interval in which a record is not demanded by the demanding station, said logic control means further including comparing means for comparing the count contained in a respective stage at the time a record is emitted from a corresponding passive delay device with the count contained in that binary stage when the record was introduced into the passive delay device, said binary control signals being obtained both directly from the stages of the binary counter and from said comparing means by connection to the gate means.

24. In the data processing system for feeding records to a demanding station in a predetermined order, separate delay stages comprising: recirculating passive delay means having an input and an output for storing different numbers of records, gating means associated with each recirculating delay means for transferring records from the input to the recirculating delay means, said gating means being responsive to binary logic control signals; second gating means for removing the records contained in the recirculating delay means and delivering them to the output of the stage, said second gating means being responsive to second binary logic control signals, and third gating means for gating records from said input to said output without being introduced to said recirculating delay means, said third gating means being responsive to third binary control logic signals and only being operative when said first gating means is inoperative.

25. A data processing system for transferring records received at random times from a source to a demanding station demanding the records at random times comprising: a first plurality of delay devices arranged in a series order of ascending total delay intervals connected to the source; a second plurality of delay devices connected in a series order of descending total delay intervals; first transfer means for gating records contained in said first plurality to succeeding ones of said first plurality; second transfer means for either gating records contained in said second plurality of devices to succeeding ones of said second plurality of devices or recirculating the record in one of said second plurality of devices; third transfer means for transferring records between said first and said second plurality; each of said transfer means being responsive to control signals, and logic control means responsive to the order of records contained in both said first and said second plurality for delivering control signals to said first, second and third transfer means.

26. A queuing memory structure for storing incoming records having definite intervals on a first-in, first-out basis in the time domain, said records being supplied and demanded from the queuing memory system during random record intervals, comprising: stacking means connected to the input of the system including a plurality of passive delay devices of unequal delay intervals connected in series in ascending order of delay intervals, first gating means for transferring records to succeeding ones of said plurality of passive delay devices from the preceding ones or the input to thereby give a variable delay, and first control means for generating control signals in response to the number of records received at the input and to the total interval count; feeding means including a plurality of recirculating delay means of unequal delay intervals connected in series in ascending order of their delay intervals, second gating means for transferring records to succeeding ones of said plurality of recirculating delay means, and second control means for generating control signals in response to the interval count and to the number of records demanded from the queuing memory system; and a plurality of cross-connections between corresponding ones of said plurality of passive delay means and said plurality of recirculating delay means to transfer records between the stacking and the feeding means, said connections including third gating means responsive to the control signals from the first and second control means to introduce said records to said cross-connections.

27. A data processing system for receiving records of equal length randomly from the source, storing the records in the time domain, and delivering the records in the predetermined order of their reception to a demanding station demanding said records at random record interval times comprising: a first series of recirculating delay devices each having a different recirculation period, the recirculating delay device having the smallest recirculating period being connected to the demanding station with the others being connected in series in the ascending order of their recirculation periods; first gate means responsive to control signals for transferring selected records from selected ones of said recirculating delay devices to others having a smaller recirculation period; first control means for determining a desired order of the records within the recirculating delay devices in accordance with both the predetermined order of reception and the demands made by the demanding station and for generating a first set of control signals based upon such determination to establish discrete record positions in said first series; a variable delay device having an input and an output with the input connected to the source and the output connected to the last recirculating delay device of said first series, said variable delay device including a plurality of passive delays connected in series relation, and means responsive to control signals for selectively bypassing any of said delays, each of said passive delays having a total delay interval equal to an integral number of record intervals and each said passive delay being unequal to any of the other passive delays; and second control means for comparing the time position of a record at the input of the variable delay device with the time position of discrete positions in the first series of said recirculating delay devices and for producing second control signals indicative of said comparison to thereby transfer the records contained in said variable delay device to said first series by correctly positioning them in the discrete positions.

28. A message exchange system for transferring records received during a number of random record intervals on a plurality of input lines to selected ones of a plurality of output lines on which demands are made at random times for the records received comprising: a space exchange means for selectively connecting any one of said input lines to any one of said output lines to transfer records therebetween; first and second pluralities of memory means each consisting of a series of passive delay means for storing a plurality of intermittently received records in the time domain on a first-in, first-out basis and delivering said records on demand in the order received, one of said plurality of memory means being connected in series with each input line for storing the randomly received messages for later transfer by said space exchange means and one each of said second plurality of memory means being connected in series with each of said output lines for storing transferred messages for later demand by said output lines so that an incoming message is first stored in a memory means in series with the input line until transferred through the space exchange to a memory means in series with the output line where it remains until demanded.

29. The message exchange system of claim 28 further comprising: a plurality of priority switches to which groups of the output lines are connected, said priority switches including means for preventing passage of records from the memory means of selected lower priority output lines of the group until all records are demanded from the output lines having a higher priority.

30. A message exchange system for transferring records received during a number of random record intervals on a plurality of input lines to selected ones of a plurality of output lines on which demands are made at random times for the records received comprising: exchange means responsive to control signals for selectively transferring a record from any of said input lines to any one of said output lines; memory means including passive delay means for storing a plurality of intermittently received records in the time domain on a first-in, first-out basis and delivering said records on demand in the order received, connected in series with the input and output lines for providing storage of records randomly received from the input lines for later transfer by the exchange means and also for providing storage of records already transferred to said output lines until demanded from said output lines; and control means for generating said control signals for selectively controlling said exchange means.

31. A message exchange system comprising: a plurality of input lines for receiving messages at random times; a plurality of output lines to which the received records are to be transferred; a multiple channel memory means having a number of separate channels equal to the total number of input and output lines, each channel having passive delay means for storing a plurality of intermittently received records in said channels on a first-in, first-out basis; first multiplexing means connecting said input lines to said multichannel memory means for transferring the records recieved on different input lines to respective ones of said channels within the multichannel memory means; second multiplexing means for connecting the output lines to separate respective ones of said channels; and delay means connected to the output of the multichannel memory means for selectively delaying records contained in the input channels to introduce them into selected ones of said output channels so that records received on the input lines may be transferred to particular output lines to be available when demanded.

32. A message exchange system comprising: a plurality of input lines for receiving records thereon; a plurality of output lines to which the records received are to be transferred; multichannel memory means for storing records in the time domain on a first-in, first-out basis in each channel having a total number of channels equal to the total number of input and output lines and having an input and an output terminal; first multiplexing means for connecting each of said input lines in turn to a corresponding number of input channels; second multiplexing means for connecting each of said output lines in turn to a corresponding separate number of output channels; said multichannel memory means including a first plurality of delay devices arranged in series order of ascending total delay intervals connected to the input terminal of the multichannel memory means, a second plurality of delay devices connected in series order of descending total delay intervals connected to an output terminal of the multichannel memory means, first transfer means for coupling records contained in said first plurality of delay devices to succeeding ones in the series, second transfer means for gating the records contained in said second plurality of delay devices selectively into succeeding ones in the series of said second plurality of delay devices or to be recirculated in the same one of said second plurality of delay devices, third transfer means responsive to control signals for transferring records between said first and said second plurality of delay devices, each of said transfer means being responsive to control signals, logic control means responsive to the order of records contained in both said first and said second plurality of delay means for delivering control signals to said first, second and third transfer means, and delay means for selectively delaying the records contained in the input channels of said multichannel queuing memory means to transfer the records between said input and output channels.

33. A message exchange system for transferring records to a demanding station from a sending station comprising: record assembling means responsive to incoming records at the sending station, memory means coupled to the record assembling means and including passive delay means for storing a plurality of intermittently received records on a first-in, first-out basis and delivering said records on demand in the order received, record distributing means coupled to the memory means for connecting the memory means to demanding stations, and means including priority control means for controlling the coupling of records to and from the memory means.

34. A record handling system for receiving records of equal interval length at random times from a source having a plurality of separate channels storing the records in the time domain, and feeding said records in the order of their receipt to an output station which demands the records at random times on an equal plurality of associated output channels comprising: a first plurality of delay devices arranged in series order of ascending total delay intervals connected to an input terminal; a second plurality of delay devices connected in series order of descending total delay intervals connected to an output terminal; first transfer means for gating records contained in said first plurality to succeeding ones in the series; second transfer means for gating the records contained in said second plurality either to succeeding ones of said second plurality or to be recirculated in the same one of said second plurality; third transfer means responsive to control signals for transferring records between said first and said second plurality, each of said transfer means being responsive to control signals; logic control means responsive to the order of records contained in both said first and said second plurality for delivering control signals to said first, second and third transfer means; and multiplexing means connecting said input and said output terminals respectively to the source and the output station to corresponding input and output channels once each record interval.

35. The system of claim 34 wherein each of said first and second plurality of delay devices has a total delay interval which is an integral number of record intervals long times the number of channels.

36. In a data processing system wherein a series of passive delay devices are employed for transferring records of equal length from an input source to an output station both having separate channels, each of said delay devices having a total delay equal to an integral number of recording intervals times the number of separate channels, said records being introduced into the delay devices from the separate channels in a time multiplexing fashion, and being switched by gating circuits between the input and output of separate delay devices within the series in accordance with binary information bits supplied to the gating circuits, a logic control means comprising: a recirculating memory having a period of recirculation equal to a record interval times the number of input channels, said recirculating memory including a tapped delay line, each tap being spaced one binary information bit apart; means for introducing control words consisting of separate binary bits of information into the recirculating delay, a separate control word being provided for each separate channel; and means connected to said taps for sampling the binary information bits of each control word in turn from the taps, the sampling of a control word for a given channel being made to correspond to the emergence of records of that channel from the passive delay devices.

37. Logic control means for providing a multibit control signal to control the transfer of records from a passive delay containing a number of records from separate channels arranged in a multiplex fashion comprising: a recirculating delay line having a total period of recirculation equal to the time interval of a record times the number of separate channels; means for introducing a control word for each channel into said recirculating delay in time relation with the position of records of that channel in the passive delay; modifying means contained within the recirculating delay loop for modifying the control words in accordance with a desired method of transfer; and readout means for sampling the separate bits of a control word for a particular channel once each period of recirculation to control the transfer of the records of a channel both from the output and to the input of each passive delay.

38. A delay device for providing a delay interval for electrically represented information comprising: a plurality of recording surfaces; a recording and reading means associated with each of said recording surfaces for both recording information thereon and reading out the information previously recorded; driving means for moving each of said recording and reading means in identical repeating cycles relative to the respective recording surfaces to describe recording tracks thereon; switching means for delivering information to be recorded by each said recording and reading means on its respective track during alternate cycles and for causing said recording and reading means to read on successive cycles the information recorded during the preceeding cycle on that track; and means for transferring the information read by one recording and reading means to another recording and reading means to be recorded simultaneously on another track on a separate recording surface.

39. The delay device of claim 38 in which each said recording and reading means is a magnetic head, said recording surface is a magnetic recording disc, and said driving means includes means for causing said magnetic head to describe a spiral recording track on said magnetic disc.

40. A revolver for delaying information for a distinct delay interval comprising: first and second recording tracks; first means for recording information upon the first recording track; second means for reading out the information recorded on said first recording track and simultaneously recording it upon the second recording track; and third means for reading out the information contained on said second recording track, said second means only operating after said first means has completed recording and said third means only operating after said second means has completed recording.

41. The delay device of claim 40 further including a third recording track; and wherein said third means further includes means for simultaneously recording the information read out by the third means on the third recording track; still further including separate means for reading out the information recorded on said third recording track only after it has been recorded; and timing means for recording information on said first recording track and simultaneously reading out information from said second recording track during a first time interval, for recording information on said second recording track as information is being read from said third recording track during a second succeeding interval, and for recording information on said third track as information is being read from said first recording track.

42. The delay device of claim 40 wherein said recording tracks are spiral recording tracks, and further including means for producing said spiral recording tracks including a movable magnetic head and a circular recording disc.

43. The delay device of claim 40 in which said recording tracks are circular and further including means for producing said circular recording tracks including stationary magnetic heads and a rotating magnetic drum.

44. A data processing system having a number of separate stages connected in series for providing variable delays to information records introduced to the system, each of said stages comprising: recording track; head means disposed adjacent said track for making repeated tracings of said recording track; input and output terminals for the stage; recording means for receiving information contained in a record appearing at the output terminal and connected to said head means for recording this information on said track only when enabled by a first control signal; reading means connected to said head means for reading out recorded information on the track whenever said recording means is disabled; first gating means for receiving information records from the input terminal of the stage and for passing said information to the output terminal when enabled by the first control signal; second gating means for receiving information read out by said reading means and for passing said information to the output terminal when enabled by a second control signal; and selectively controllable bistable means for producing said first and second control signals in mutually exclusive fashion so that the information in record form may be selectively delayed by the stage before being recorded in a succeeding stage of the system.

References Cited by the Examiner

UNITED STATES PATENTS

| | | | |
|---|---|---|---|
| 2,674,732 | 4/1954 | Robbins | 340—347 |
| 2,957,163 | 10/1960 | Kodis | 340—172.5 |
| 3,013,254 | 12/1961 | Walker | 340—174.1 |
| 3,122,726 | 2/1964 | King | 340—174.1 |
| 3,212,060 | 10/1965 | Freedman | 340—172.5 |
| 3,212,064 | 10/1965 | Krieger | 340—172.5 |

ROBERT C. BAILEY, *Primary Examiner.*

R. B. ZACHE, *Assistant Examiner.*